US012544094B2

United States Patent
Downey et al.

(10) Patent No.: US 12,544,094 B2
(45) Date of Patent: Feb. 10, 2026

(54) PULSE CONTROL FOR ULTRASONIC TOOL SYSTEMS

(71) Applicant: Stryker Corporation, Kalamazoo, MI (US)

(72) Inventors: Adam D. Downey, Kalamazoo, MI (US); Guillaume Gras, Bienne (CH); Conor McCarthy, Cork (IE)

(73) Assignee: Stryker Corporation, Portage, MI (US)

( * ) Notice: Subject to any disclaimer, the term of this patent is extended or adjusted under 35 U.S.C. 154(b) by 511 days.

(21) Appl. No.: 18/012,361

(22) PCT Filed: Oct. 1, 2021

(86) PCT No.: PCT/US2021/053265
§ 371 (c)(1),
(2) Date: Dec. 22, 2022

(87) PCT Pub. No.: WO2022/072903
PCT Pub. Date: Apr. 7, 2022

(65) Prior Publication Data
US 2023/0346414 A1    Nov. 2, 2023

Related U.S. Application Data

(60) Provisional application No. 63/086,460, filed on Oct. 1, 2020.

(51) Int. Cl.
*A61B 17/32* (2006.01)
(52) U.S. Cl.
CPC ............... *A61B 17/320068* (2013.01); *A61B 2017/32007* (2017.08); *A61B 2017/320084* (2013.01)

(58) Field of Classification Search
CPC .. A61B 17/320068; A61B 2017/32007; A61B 2017/320084; A61B 2017/00022;
(Continued)

(56) References Cited

U.S. PATENT DOCUMENTS

| 4,827,911 A | 5/1989 | Broadwin et al. |
| 6,027,515 A | 2/2000 | Cimino |

(Continued)

FOREIGN PATENT DOCUMENTS

| EP | 2190362 B1 | 9/2017 |
| JP | 2017527349 A | 9/2017 |

(Continued)

OTHER PUBLICATIONS

English language abstract for JP 2017-527349 A extracted from espacenet.com database on Jul. 17, 2025, 2 pages.

(Continued)

*Primary Examiner* — Anh T Dang
(74) *Attorney, Agent, or Firm* — Howard & Howard Attorneys PLLC

(57) ABSTRACT

Systems and methods for controlling vibrations of a tip of an ultrasonic instrument. A maximum ultrasonic energy level for the ultrasonic instrument is determined, and a minimum ultrasonic energy level for the ultrasonic instrument is determined based on the maximum ultrasonic energy level. An AC drive signal is then sourced to the ultrasonic instrument that induces ultrasonic energy in the tip of the ultrasonic instrument including several ultrasonic energy pulses. The ultrasonic energy pulses peak at the determined maximum ultrasonic energy level and are interspaced by significant periods at the determined minimum ultrasonic energy level.

19 Claims, 13 Drawing Sheets

(58) Field of Classification Search
CPC .......... A61B 2017/00017; A61B 2017/00026;
A61B 2017/00141; A61B 2017/00172;
A61B 2017/00185; A61B 2017/320069;
A61B 90/98; A61B 2217/005; A61B 2217/007

See application file for complete search history.

(56) References Cited

U.S. PATENT DOCUMENTS

| | | |
|---|---|---|
| 6,391,042 B1 | 5/2002 | Cimino |
| 6,695,847 B2 | 2/2004 | Bianchetti et al. |
| 7,077,820 B1 | 7/2006 | Kadziauskas et al. |
| 7,252,648 B2 | 8/2007 | Honda et al. |
| 7,316,664 B2 | 1/2008 | Kadziauskas et al. |
| 7,335,997 B2 | 2/2008 | Wiener |
| 7,655,003 B2 | 2/2010 | Lorang et al. |
| 7,821,143 B2 | 10/2010 | Wiener |
| 7,938,120 B2 | 5/2011 | Kadziauskas et al. |
| 8,002,783 B2 | 8/2011 | Vercellotti et al. |
| 8,020,565 B2 | 9/2011 | Kadziauskas et al. |
| 8,231,564 B2 | 7/2012 | Kadziauskas et al. |
| 8,252,012 B2 | 8/2012 | Stulen |
| 8,253,303 B2 | 8/2012 | Giordano et al. |
| 8,257,307 B2 | 9/2012 | Boukhny et al. |
| 8,512,325 B2 | 8/2013 | Mathonnet |
| 8,545,528 B2 | 10/2013 | Rob et al. |
| 8,603,082 B2 | 12/2013 | Lorang et al. |
| 8,709,031 B2 | 4/2014 | Stulen |
| 8,779,648 B2 | 7/2014 | Giordano et al. |
| 8,852,138 B2 | 10/2014 | Kadzlauskas et al. |
| 8,887,735 B2 | 11/2014 | Kadzlauskas et al. |
| 8,945,162 B2 | 2/2015 | Kadziauskas et al. |
| 9,060,776 B2 | 6/2015 | Yates et al. |
| 9,089,360 B2 | 7/2015 | Messerly et al. |
| 9,504,855 B2 | 11/2016 | Messerly et al. |
| 9,572,711 B2 | 2/2017 | Raney et al. |
| 9,603,609 B2 | 3/2017 | Kawashima et al. |
| 9,642,745 B2 | 5/2017 | Kadziauskas et al. |
| 9,707,127 B2 | 7/2017 | Kadziauskas et al. |
| 9,795,808 B2 | 10/2017 | Messerly et al. |
| 9,943,326 B2 | 4/2018 | Ross et al. |
| 10,016,209 B2 | 7/2018 | Downey et al. |
| 10,194,972 B2 | 2/2019 | Yates et al. |
| 10,335,614 B2 | 7/2019 | Messerly et al. |
| 10,376,305 B2 | 8/2019 | Yates et al. |
| 10,449,570 B2 | 10/2019 | Downey et al. |
| 10,687,840 B1 | 6/2020 | Cotter et al. |
| 10,755,598 B2 | 8/2020 | Simon |
| 10,765,557 B2 | 9/2020 | Kadziauskas et al. |
| 10,939,935 B2 | 3/2021 | Tanigami et al. |
| 11,468,792 B2 | 10/2022 | Simon |
| 11,617,598 B2 | 4/2023 | Downey et al. |
| 2002/0107446 A1 | 8/2002 | Rabiner et al. |
| 2007/0016235 A1* | 1/2007 | Tanaka ........... A61B 17/320092 606/169 |
| 2012/0323265 A1 | 12/2012 | Stulen |
| 2018/0056328 A1 | 3/2018 | Downey et al. |
| 2018/0368877 A1* | 12/2018 | Downey ........ A61B 17/320068 |
| 2018/0368878 A1 | 12/2018 | Tanigami et al. |
| 2019/0038297 A1 | 2/2019 | Briscoe |
| 2019/0059977 A1 | 2/2019 | Shah et al. |
| 2019/0175208 A1 | 6/2019 | Ross et al. |
| 2019/0201047 A1 | 7/2019 | Yates et al. |
| 2019/0274706 A1 | 9/2019 | Nott et al. |
| 2019/0274707 A1 | 9/2019 | Sawhney et al. |
| 2019/0274710 A1 | 9/2019 | Black |
| 2019/0274718 A1 | 9/2019 | Denzinger et al. |
| 2019/0274752 A1 | 9/2019 | Denzinger et al. |
| 2019/0321066 A1 | 10/2019 | Voic et al. |
| 2020/0078609 A1 | 3/2020 | Messerly et al. |
| 2020/0093507 A1 | 3/2020 | James et al. |

FOREIGN PATENT DOCUMENTS

| | | |
|---|---|---|
| WO | 2017106235 A1 | 6/2017 |
| WO | 2017149613 A1 | 9/2017 |
| WO | 2019173137 A1 | 9/2019 |
| WO | 2019173145 A1 | 9/2019 |
| WO | 2019173191 A1 | 9/2019 |
| WO | 2019204641 A1 | 10/2019 |

OTHER PUBLICATIONS

English language abstract for WO 2017/149613 A1 extracted from espacenet.com database on Mar. 16, 2023, 2 pages.

International Search Report for Application No. PCT/US2021/053265 dated Feb. 23, 2022, 3 pages.

Johnson & Johnson, "Ethicon Surgical Technologies Webpage", 2021-2022, 15 pages.

Piezosurgery Inc., A Mectron Company, "Surgical Applications Webpage", 2021, 3 pages.

Piezosurgery Inc., A Mectron Company, "Webpage", 2021, 2 pages.

* cited by examiner

PULSE CONTROL FOR ULTRASONIC TOOL SYSTEMS

RELATED APPLICATIONS

This application is a National Stage Entry of International Patent Application No. PCT/US2021/053265, filed Oct. 1, 2021, which claims priority to and all the benefits of U.S. Provisional Patent Application No. 63/086,460, filed Oct. 1, 2020, the entire disclosures of which are hereby incorporated herein by reference.

BACKGROUND

Conventional ultrasonic instruments remove target tissue by vibrating against the target tissue at a high velocity. The high velocity vibrations produced by the conventional ultrasonic instrument can generate high temperatures that affect operation of the instrument and increase trauma to surrounding tissues desired to remain intact.

SUMMARY

This Summary introduces a selection of concepts in a simplified form that are further described below in the Detailed Description below. This Summary is not intended to limit the scope of the claimed subject matter nor identify key features or essential features of the claimed subject matter.

In one aspect, a system for controlling vibrations of a tip of an ultrasonic instrument is provided. The system includes a control console for generating an AC drive signal supplied to a driver of the ultrasonic instrument. The control console is configured to determine a maximum ultrasonic energy level for the ultrasonic instrument; determine a minimum ultrasonic energy level for the ultrasonic instrument based on the maximum ultrasonic energy level; and generate an AC drive signal sourced to the ultrasonic instrument that induces ultrasonic energy in the tip of the ultrasonic instrument that comprises a plurality of ultrasonic energy pulses interspaced by significant periods at the determined minimum ultrasonic energy level. Each of the ultrasonic energy pulses is defined by a hann wave and peaking at the maximum ultrasonic energy level.

In a second aspect, a system for controlling vibrations of a tip of an ultrasonic instrument is provided. The system includes a control console for generating an AC drive signal supplied to a driver of the ultrasonic instrument. The control console is configured to determine a maximum ultrasonic energy level for the ultrasonic instrument, and determine whether the system is set to operate in a soft tissue ablation mode or a hard tissue ablation mode. Responsive to determining that the system is set to operate in the soft tissue ablation mode, the control console is configured to generate a first AC drive signal that induces first ultrasonic energy in the ultrasonic instrument. The first ultrasonic energy comprises a plurality of first ultrasonic energy pulses interspaced by first periods of ultrasonic energy at a first minimum ultrasonic energy level set for the ultrasonic instrument and corresponding to the soft tissue ablation mode. Each of the first ultrasonic energy pulses peak at the maximum ultrasonic energy level for a second period that is less than each of the first periods. Responsive to determining that the system is set to operate in the hard tissue ablation mode, the control console is configured to generate a second AC drive signal that induces second ultrasonic energy in the ultrasonic instrument. The second ultrasonic energy comprises a plurality of second ultrasonic energy pulses interspaced by third periods of ultrasonic energy at a second minimum ultrasonic energy level set for the ultrasonic instrument and corresponding to the hard tissue ablation mode. Each of the second ultrasonic energy pulses peak at the maximum ultrasonic energy level for a fourth period that is greater than or equal to each of the third periods.

In a third aspect, a sleeve is provided, the sleeve being for an ultrasonic instrument comprising a tip and a handpiece including a driver to which the tip is coupled and to which an AC drive signal is sourced from a control console to induce ultrasonic energy in the tip including a plurality of ultrasonic energy pulses. The sleeve includes a sleeve body having open proximal and distal ends and defining a lumen extending between the open proximal and distal ends. The sleeve body is adapted to be removably coupled to the handpiece such that the tip extends through the lumen and out the open distal end of the sleeve body. The sleeve further includes an irrigation conduit in fluid communication with the lumen for supplying irrigating fluid to the tip, and a tip memory disposed in the sleeve body. The tip memory stores data specific to the tip for being read by the control console when the ultrasonic instrument is coupled to the control console. The data indicates at least one pulsing parameter for regulating the ultrasonic energy pulses induced in the tip of the ultrasonic instrument.

In a fourth aspect, a system for controlling vibrations of a tip of an ultrasonic instrument is provided. The system includes a control console for generating the AC drive signal supplied to the driver of the ultrasonic instrument. The control console is configured to determine a type of the tip; determine one or more pulsing parameters for the ultrasonic instrument based on the determined type of the tip; and generate an AC drive signal sourced to the ultrasonic instrument that induces ultrasonic energy in the tip of the ultrasonic instrument that comprises a plurality of ultrasonic energy pulses corresponding to the determined pulsing parameters.

Any of the above aspects may be combined in-whole or in part, and any of the aspects above may be utilized with any one or more of the following implementations, whether utilized individually or in combination.

In some implementations, the system includes the ultrasonic instrument comprising a tip. In some implementations, the ultrasonic instrument further includes a handpiece including a driver configured to vibrate the tip responsive to receiving an AC drive signal, and a sleeve disposed around the tip and coupled to the handpiece, sleeve defining a first pathway for supplying irrigating fluid to a distal region of the tip. In some implementations, the tip defines a second pathway for providing suction at the distal region of the tip.

In some implementations, each of the significant periods is greater than or equal to two milliseconds. In some implementations, each of the significant periods is greater than or equal to five milliseconds.

In some implementations, the determinized minimum ultrasonic energy level corresponds to vibrations in the tip having a magnitude that are insufficient to ablate patient tissue and sufficient for the control console to track a resonant frequency of the ultrasonic instrument. In some implementations, the determined minimum ultrasonic energy level corresponds to vibrations induced the tip having a peak-to-peak displacement greater than zero and less than 20 microns. In some implementations, the determined minimum ultrasonic energy level corresponds to a mechanical current induced in in the ultrasonic instrument that is greater than zero and less than 10 milliamps.

In some implementations, the system further comprises a memory device storing a modulation waveform including a constant period at zero and a hann wave extending between zero and one, wherein the control console is configured to generate the AC drive signal from the modulation waveform, the determined maximum ultrasonic energy level, and the determined minimum ultrasonic energy level. In some implementations, the control console is configured to generate the AC drive signal from the modulation waveform, the determined maximum ultrasonic energy level, and the determined minimum ultrasonic energy level by being configured to: determine a scalar based on the determined maximum ultrasonic energy level and the determined minimum ultrasonic energy level; multiply the modulation waveform by the scalar to generate a second waveform; add the determined minimum ultrasonic energy level to the second waveform to generate a third waveform; and generate the AC drive signal based on the third waveform.

In some implementations, the control console is configured to receive a user-selected power setting indicative of an ultrasonic energy level for the ultrasonic instrument; and determine the maximum ultrasonic energy level such that the maximum ultrasonic energy level is greater than the ultrasonic energy level indicated by the user-selected power setting and an average of the ultrasonic energy induced in the ultrasonic instrument by the AC drive signal substantially equals the ultrasonic energy level indicated by the user-selected power setting.

In some implementations, the sleeve comprises a tip memory storing data specific to the tip that indicates a factor for determining the minimum ultrasonic energy level for the ultrasonic instrument, and the control console is configured to read the data from the tip memory when the ultrasonic instrument is coupled to the control console; and determine the minimum ultrasonic energy level for the ultrasonic instrument by applying the factor indicated in the read data to the determined maximum ultrasonic energy level.

In some implementations, the data specific to the tip that is stored in the tip memory and read by the control console indicates a duty cycle, and the control console is configured to generate the AC drive signal such that a duration of each of the ultrasonic energy pulses relative to a duration of each cycle of the induced ultrasonic energy corresponds to the duty cycle indicated in the read data. In some implementations, the data specific to the tip that is stored in the tip memory and read by the control console indicates a pulsing frequency, and the control console is configured to generate the AC drive signal such that a frequency of the ultrasonic energy pulses induced in the ultrasonic instrument corresponds to the pulsing frequency indicated in the read data. In some implementations, the data specific to the tip that is stored in the tip memory and read by the control console indicates a hann pulse shape, and the control console is configured to generate the AC drive signal based on the hann pulse shape indicated in the read data.

In some implementations, the AC drive signal is defined as a first AC drive signal, the data specific to the tip that is stored in the tip memory and read by the control console indicates whether the tip is pulsing enabled, and the control console is configured to determine whether the tip is pulsing enabled based on the read data; responsive to determining that the tip is pulsing enabled, generate and source the first AC drive signal to the ultrasonic instrument; and responsive to determining that the tip is not pulsing enabled, generate and source a second AC drive signal to the ultrasonic instrument that induces ultrasonic energy in the ultrasonic instrument that is maintained at the determined maximum ultrasonic energy level.

In some implementations, the control console is configured to generate the AC drive signal such that the ultrasonic energy pulses induced in the ultrasonic instrument occur at a first frequency determine whether a load applied to the ultrasonic instrument is greater than a first predefined load threshold; and responsive to determining that the applied load is greater than the first predefined load threshold, generate the AC drive signal such that the ultrasonic energy pulses induced in the ultrasonic instrument occur at a second frequency that differs from the first frequency. In some implementations, the second frequency is less than the first frequency.

In some implementations, the control console is configured to determine whether the applied load is greater than a second predefined load threshold greater than the first predefined load threshold; and responsive to determining that the applied load is greater than the second predefined load threshold, generate the AC drive signal such that the ultrasonic energy pulses induced in the ultrasonic instrument occur at a third frequency until the applied load is less than the second predefined load threshold.

In some implementations, the AC drive signal is defined as a first AC drive signal, and the control console is configured to generate a second AC drive signal sourced to the ultrasonic instrument that induces ultrasonic energy in the ultrasonic instrument that is maintained at the determined maximum ultrasonic energy level; determine whether a load applied to the ultrasonic instrument is greater than a first predefined load threshold while the second AC drive signal is being sourced to the ultrasonic instrument; and responsive to determining that the applied load is greater than the first predefined load threshold, generate and source the first AC drive signal to the ultrasonic instrument. In some implementations, the control console is configured to determine whether the applied load is greater than a second predefined load threshold while the first AC drive signal is being sourced to the ultrasonic instrument, the second predefined load threshold being greater than the first predefined load threshold; and responsive to determining that the applied load is greater than a second predefined load threshold, generate and source the second AC drive signal to the ultrasonic instrument.

In some implementations, the AC drive signal is defined as a first AC drive signal, and the control console is configured to determine whether a load applied to the ultrasonic instrument is greater than a first predefined load threshold while the first AC drive signal is being sourced to the ultrasonic instrument; and responsive to determining that the applied load is greater than the first predefined load threshold, generate and source a second AC drive signal to the ultrasonic instrument that induces ultrasonic energy in the ultrasonic instrument that is maintained at the determined maximum ultrasonic energy level.

In some implementations, the control console is configured to determine whether the applied load is greater than a second predefined load threshold while the second AC drive signal is being sourced to the ultrasonic instrument, the second predefined load threshold being greater than the first predefined load threshold; and responsive to determining that the applied load is greater than a second predefined load threshold, generate and source the first AC drive signal to the ultrasonic instrument.

In some implementations, the control console is configured to determine whether a load applied to the ultrasonic instrument is greater than a first predefined load threshold by being configured to calculate a mechanical resistance of the ultrasonic instrument; compare the mechanical resistance of the ultrasonic instrument to a predefined resistance threshold; and determine that the load applied to the ultrasonic instrument is greater than the first predefined load threshold responsive to the mechanical resistance of the ultrasonic instrument being greater than the predefined resistance threshold.

In some implementations, the control console is configured to determine whether a load applied to the ultrasonic instrument is greater than a first predefined load threshold by being configured to measure a voltage of the AC drive signal sourced to the ultrasonic instrument; compare the voltage to a predefined voltage threshold; and determine that the load applied to the ultrasonic instrument is greater than the first predefined load threshold responsive to the measured voltage being greater than the predefined voltage threshold.

In some implementations, the control console is configured to determine a type of the tip; and set the first predefined load threshold based on the determined type of the tip. In some implementations, the sleeve comprises a tip memory storing data specific to the tip that indicates the type of the tip, and the control console is configured to read the data from the tip memory when the ultrasonic instrument is coupled to the control console; and determine the type of the tip based on the read data.

In some implementations, the sleeve comprises a tip memory storing data specific to the tip that indicates the first predefined load threshold, and the control console is configured to: read the data from the tip memory when the ultrasonic instrument is coupled to the control console; and determine the first predefined load threshold from the read data.

In some implementations, the control console is configured to receive a user-selection of a first pulse control level and a second pulse control level, the first pulse control level for ablating firmer tissue than the second pulse control level; responsive to receiving the user-selection of the first pulse control level, set the minimum ultrasonic energy level for the ultrasonic instrument to a first value corresponding to the first pulse control level; and responsive to receiving the user-selection of the second pulse control level, set the minimum ultrasonic energy level for the ultrasonic instrument to a second value corresponding to the second pulse control level that is less than the first value.

In some implementations, the second value corresponds to vibrations in the tip having a magnitude that are insufficient to ablate patient tissue and sufficient for the control console to track a resonant frequency of the ultrasonic instrument. In some implementations, the second value corresponds to vibrations induced the tip having a peak-to-peak displacement greater than zero and less than 20 microns. In some implementations, the second value corresponds to a mechanical current induced in in the ultrasonic instrument that is greater than zero and less than 10 milliamps.

In some implementations, the control console is configured to, responsive to receiving the user-selection of the first pulse control level, generate the AC drive signal such that the ultrasonic energy pulses induced in the ultrasonic instrument occur at a first frequency; and responsive to receiving the user-selection of the second pulse control level, generate the AC drive signal such that the ultrasonic energy pulses induced in the ultrasonic instrument occur at a second frequency greater than the first frequency.

In some implementations, the control console is configured to, responsive to receiving the user-selection of the first pulse control level, generate the AC drive signal such that a duration of each of the ultrasonic energy pulses induced in the ultrasonic instrument relative to a duration of each cycle of the induced ultrasonic energy corresponds to a first duty cycle; and responsive to receiving the user-selection of the second pulse control level, generate the AC drive signal such that the duration of each of the ultrasonic energy pulses induced in the ultrasonic instrument relative to the duration of each cycle of the induced ultrasonic energy corresponds to a second duty cycle less than the first duty cycle.

In some implementations, the control console is configured to, responsive to receiving the user-selection of the first pulse control level, generate a first modulation waveform including a constant period at zero and a hann wave extending from the constant period and peaking at one such that a duration of the hann wave relative to a duration of the constant period corresponds to the first duty cycle, and generate the AC drive signal based on the first modulation waveform. In some implementations, the control console is configured to, responsive to receiving the user-selection of the first pulse control level, generate a second modulation waveform including a constant period at zero and a hann wave extending from the constant period and peaking at one such that a duration of the hann wave relative to a duration of the constant period corresponds to the second duty cycle, and generate the AC drive signal based on the second modulation waveform.

In some implementations, the sleeve comprises a tip memory storing data specific to the tip that indicates a first factor for determining the minimum ultrasonic energy level that is associated with the first pulse control level and a second factor for determining the minimum ultrasonic energy level that is associated with the second pulse control level, and the control console is configured to read the data from the tip memory when the ultrasonic instrument is coupled to the control console; responsive to receiving the user-selection of the first pulse control level, determine the minimum ultrasonic energy level by applying the first factor indicated in the read data to the determined maximum ultrasonic energy level; and responsive to receiving the user-selection of the second pulse control level, determine the minimum ultrasonic energy level by applying the second factor indicated in the read data to the determined maximum ultrasonic energy level.

In some implementations, the data specific to the tip that is stored in the tip memory and read by the control console indicates a first pulsing frequency associated with the first pulse control level and a second pulsing frequency greater than the first pulsing frequency associated with the second pulse control level, and the control console is configured to responsive to receiving the user-selection of the first pulse control level, generate the AC drive signal such that the ultrasonic energy pulses induced in the ultrasonic instrument occur at the first pulsing frequency based on the read data; and responsive to receiving the user-selection of the second pulse control level, generate the AC drive signal such that the ultrasonic energy pulses induced in the ultrasonic instrument occur at the second pulsing frequency based on the read data.

In some implementations, the data specific to the tip that is stored in the tip memory and read by the control console indicates a first duty cycle associated with the first pulse control level and a second duty cycle less than the first duty cycle associated with the second pulse control level, and the control console is configured to: responsive to receiving the user-selection of the first pulse control level, generate the AC drive signal such that a duration of each of the ultrasonic energy pulses induced in the ultrasonic instrument relative to a duration of each cycle of the induced ultrasonic energy corresponds to a first duty cycle based on the read data; and responsive to receiving the user-selection of the second pulse control level, generate the AC drive signal such that the duration of each of the ultrasonic energy pulses induced in the ultrasonic instrument relative to the duration of each cycle of the induced ultrasonic energy corresponds to a second duty cycle less than the first duty cycle based on the read data.

In some implementations, the second period of each of the first ultrasonic energy pulses is less than one millisecond. In some implementations, each of the first ultrasonic energy pulses are defined by a hann wave. In some implementations, each of the first periods is greater than or equal to two milliseconds. In some implementations, each of the first periods is greater than or equal to five milliseconds. In some implementations, each of the third periods is substantially equal to the fourth period of each of the second ultrasonic energy pulses. In some implementations, each of the third periods is less than one millisecond.

In some implementations, the first minimum ultrasonic energy level corresponding to the soft tissue ablation mode differs from the second minimum ultrasonic energy level corresponding to the hard tissue ablation mode.

In some implementations, the control console is configured to, responsive to determining that the system is set to operate in the soft tissue ablation mode, determine the first minimum ultrasonic energy level based on the maximum ultrasonic energy level; and responsive to determining that the system is set to operate in the hard tissue ablation mode, determine the second minimum ultrasonic energy level based on the maximum ultrasonic energy level.

In some implementations, the control console is configured to, responsive to determining that the system is set to operate in the soft tissue ablation mode, generate a first modulation waveform including a hann wave extending between zero and one, and generate the first AC drive signal from the first modulation waveform. In some implementations, the control console is configured to, responsive to determining that the system is set to operate in the hard tissue ablation mode, generate a second modulation waveform including an inverse hann wave that extends between zero and one, and generate the second AC drive signal from the second modulation waveform.

In some implementations, the first modulation waveform comprises a constant period at zero and with a duration corresponding to a duration of each of the first periods. In some implementations, the second modulation waveform comprises a constant period at a value of one a duration corresponding to a duration of the fourth period of each of the second ultrasonic energy pulses.

In some implementations, the control console is configured to, responsive to determining that the system is set to operate in the soft tissue ablation mode, determine selection of a first pulse control level and a second pulse control level, the first pulse control level for ablating firmer tissue than the second pulse control level. In some implementations, the control console is configured to, responsive to determining selection of the first pulse control level, set the first minimum ultrasonic energy level to a first value corresponding to the first pulse control level; and responsive to determining selection of the second pulse control level, set the first minimum ultrasonic energy level to a second value corresponding to the second pulse control level that is less than the first value.

In some implementations, the control console is configured to, responsive to determining that the system is set to operate in the hard tissue ablation mode, determine selection of a first pulse control level and a second pulse control level; responsive to determining selection of the first pulse control level, set the second minimum ultrasonic energy level to a third value corresponding to the first pulse control level; and responsive to determining selection of the second pulse control level, set the first minimum ultrasonic energy level to a fourth value corresponding to the second pulse control level that is less than the first value.

In some implementations, control console is configured to, responsive to determining selection of the first pulse control level, generate the second AC drive signal such that the second ultrasonic energy pulses induced in the ultrasonic instrument occur at a first frequency; and responsive to determining selection of the second pulse control level, generate the second AC drive signal such that the second ultrasonic energy pulses induced in the ultrasonic instrument occur at a second frequency greater than the first frequency.

In some implementations, the control console is configured to, responsive to determining that the system is set to operate in the soft tissue ablation mode, set a voltage limit for the ultrasonic instrument to a first voltage; and responsive to determining that the system is set to operate in the hard tissue ablation mode, set a voltage limit for the ultrasonic instrument to a second voltage greater than the first voltage.

In some implementations, the control console is configured to, determine a type of the tip; and determine whether the system is set to operate in the soft tissue ablation mode of the hard tissue ablation mode based on the determined type of the tip. In some implementations, the sleeve comprises a tip memory storing data specific to the tip that indicates the type of the tip, and the control console is configured to read the data from the tip memory when the ultrasonic instrument is coupled to the control console; and determine the type of the tip based on the read data.

In some implementations, the sleeve comprises a tip memory storing data specific to the tip that indicates whether the tip is configured for soft tissue ablation or hard tissue ablation, the control console is configured to read the data from the tip memory when the ultrasonic instrument is coupled to the control console; and determine whether the system is set to operate in the soft tissue ablation mode or the hard tissue ablation mode based on the indication of whether the tip is configured for soft tissue ablation or hard tissue ablation in the read data.

In some implementations, the at least one pulsing parameter indicated by the data stored in the tip memory includes a factor for determining a minimum ultrasonic energy level for each of the ultrasonic energy pulses as a function of a maximum ultrasonic energy level determined for each of the ultrasonic energy pulses. In some implementations, the at least one pulsing parameter indicated by the data stored in the tip memory includes a duty cycle defining a duration for each of the ultrasonic energy pulses relative to a duration for each cycle of the induced ultrasonic energy. In some implementations, the at least one pulsing parameter indicated by the data stored in the tip memory includes a pulsing frequency for the ultrasonic energy pulses of the induced ultrasonic energy.

In some implementations, the at least one pulsing parameter indicated by the data stored in the tip memory includes a pulse shape for the ultrasonic energy pulses of the induced ultrasonic energy. In some implementations, the at least one pulsing parameter indicated by the data stored in the tip memory includes a voltage limit for the handpiece when the ultrasonic energy pulses are being induced in the handpicce.

In some implementations, the at least one pulsing parameter indicated by the data stored in the tip memory includes a parameter indicating whether the tip is pulsing enabled. In some implementations, the at least one pulsing parameter indicated by the data stored in the tip memory includes a parameter indicating whether the tip is a hard tissue ablation tip or a soft tissue ablation tip.

In some implementations, the at least one pulsing parameter indicated by the data stored in the tip memory includes a first predefined load threshold for controlling activation of a pulsing mode in which the ultrasonic energy pulses are induced in the handpiece. In some implementations, the at least one pulsing parameter indicated by the data stored in the tip memory includes a parameter indicating whether the tip is enabled to operate in a first pulsing activation mode in which the pulsing mode is active when a load applied to the ultrasonic instrument is greater than the first predefined load threshold and inactive when the load applied to the ultrasonic instrument is less than the first predefined load threshold, or a second pulsing activation mode in which the pulsing mode is active when the load applied to the ultrasonic instrument is less than the first predefined load threshold and inactive when the load applied to the ultrasonic instrument is greater than the first predefined load threshold.

In some implementations, the at least one pulsing parameter indicated by the data stored in the tip memory includes a second predefined load threshold greater than the first predefined load threshold for controlling activation of the pulsing mode. In some implementations, the at least one pulsing parameter indicated by the data stored in the tip memory includes a parameter indicating whether the tip is enabled to operate in a first pulsing activation mode in which the pulsing mode is active when a load applied to the ultrasonic instrument is between the first and second predefined load thresholds and inactive when the load applied to the ultrasonic instrument is less than the first predefined load threshold and greater than the second predefined load threshold, or a second pulsing activation mode in which the pulsing mode is active when the load applied to the ultrasonic instrument is less than the first predefined load threshold and greater than the second predefined load threshold and is inactive when the load applied to the ultrasonic instrument is between the first and second predefined load thresholds.

In some implementations, the data stored in the tip memory indicates a plurality of pulsing parameters for regulating the ultrasonic energy pulses induced in the ultrasonic instrument, each of the pulsing parameters being associated with a different user-selectable pulse control level. In some implementations, the plurality of pulsing parameters include a plurality of factors for determining a minimum ultrasonic energy level for each of the ultrasonic energy pulses as a function of a maximum ultrasonic energy level determined for each of the ultrasonic energy pulses, each of the factors being associated with a different one of the user-selectable pulse control levels.

In some implementations, the plurality of pulsing parameters include a plurality of pulsing frequencies for the ultrasonic energy pulses induced in the tip of the handpiece, each of the pulsing frequencies being associated with a different one of the user-selectable pulse control levels.

In some implementations, the plurality of pulsing parameters include a plurality of duty cycles for the ultrasonic energy induced in the tip of the handpiece, each of the duty cycles defining a duration of each of the ultrasonic energy pulses relative to a duration of each cycle of the induced ultrasonic energy and being associated with a different one of the user-selectable pulse control levels.

In some implementations, the sleeve comprises a tip memory storing data specific to the tip that indicates the type of the type, and the control console is configured to read the data from the tip memory when the ultrasonic instrument is coupled to the control console; and determine the type of the tip based on the read data.

In some implementations, the control console is configured to determine a minimum ultrasonic energy level for the ultrasonic energy pulses induced in the ultrasonic instrument based on the determined type of the tip; and generate the AC drive signal sourced to the ultrasonic instrument such that the ultrasonic energy pulses each extend from the minimum ultrasonic energy level.

In some implementations, the control console is configured to determine a duty cycle for the induced ultrasonic energy that defines a duration of each of the ultrasonic energy pulses relative to a duration of each cycle of the induced ultrasonic energy based on the determined type of the tip; and generate the AC drive signal such that the duration of each of the ultrasonic energy pulses relative to the duration of each cycle of the induced ultrasonic energy corresponds to the determined duty cycle.

In some implementations, the control console is configured to determine a pulsing frequency for the induced ultrasonic energy pulses based on the determined type of the tip; and generate the AC drive signal such that a frequency of the ultrasonic energy pulses induced in the ultrasonic instrument corresponds to the determined pulsing frequency.

In a further aspect, a method is provided that includes performing any one or more of the features set forth in any one or more of the aspects and implementations.

DETAILED DESCRIPTION

Figure 1:
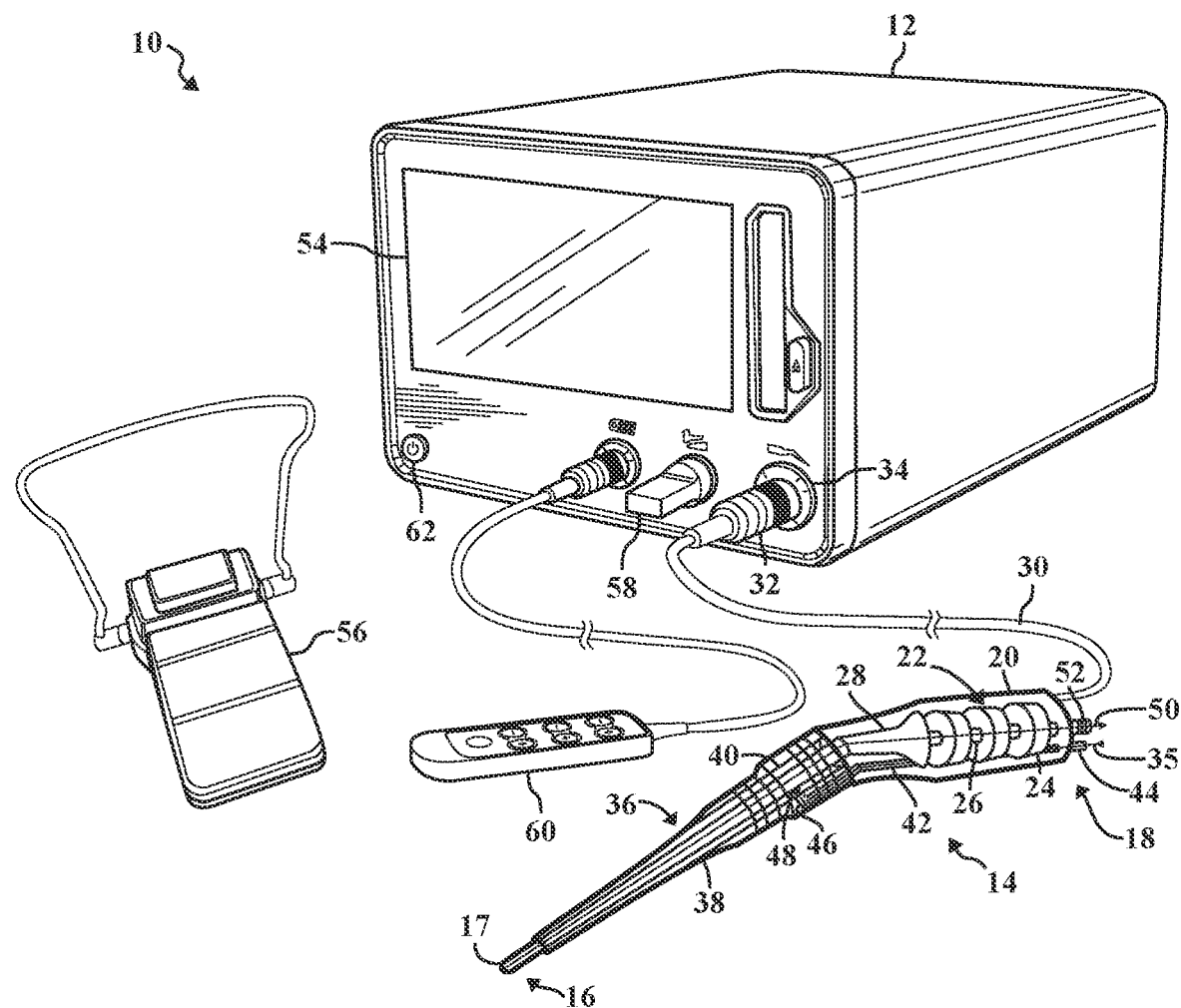
FIG. 1 illustrates an ultrasonic tool system including an ultrasonic instrument and a control console for inducing pulsed ultrasonic energy in the ultrasonic instrument.

FIG. 1 illustrates an ultrasonic tool system 10 for ablating patient tissue using pulsed ultrasonic energy, such as during a surgical procedure. The ultrasonic tool system 10 may include a control console 12 and an ultrasonic instrument 14. The ultrasonic instrument 14 may include a tip 16 with a tip head 17 configured for contacting patient tissue. During operation, the control console 12 may generate and source an AC drive signal to the ultrasonic instrument 14 that induces ultrasonic energy in ultrasonic instrument 14, which in turn causes the tip head 17 to rapidly vibrate. A practitioner may then position the vibrating tip head 17 against patient tissue to ablate the contacted tissue.

To ablate tissue effectively, the control console 12 may cause the tip 16 of the ultrasonic instrument 14 to vibrate at a relatively high velocity. For instance, at full power, the control console 12 may cause vibrations of the tip 16 with a frequency between 20 and 40 kHz and peak-to-peak displacement of about 300 microns. While vibrating the tip 16 at this velocity may enable the ultrasonic instrument 14 to emulsify hard tissues such as fibrous tissues and bone, maintaining this velocity over the large number of vibratory cycles that the tip 16 undergoes during an operation may also generate a large amount of heat in the ultrasonic instrument 14 and at the surgical site. Such heat may affect operation of the ultrasonic instrument 14 and increase trauma to surrounding tissues desired to remain intact.

However, when the tip 16 is vibrated at a constant velocity to resect hard tissue, each vibratory cycle of the tip 16 may not cause an equivalent amount of resection. Rather, a large number of the vibratory cycles may merely add to the heat generation at the surgical site and not actually resect any tissue. It may thus be possible to reduce heat generation while maintaining an effective resection rate of hard tissue by periodically reducing the ultrasonic energy induced in the ultrasonic instrument 14, such as according to one of a plurality of predetermined pulsing profiles stored by the ultrasonic tool system 10.

Each predefined pulsing profile may define a pattern of ultrasonic energy to be induced in the ultrasonic instrument 14, with the ultrasonic energy pattern including several ultrasonic energy pulses peaking at a maximum ultrasonic energy level set for the ultrasonic instrument 14 and interspaced by periods of ultrasonic energy at a minimum ultrasonic energy level set for the ultrasonic instrument 14. In some examples, the maximum ultrasonic energy level may be set by the practitioner, and the minimum ultrasonic energy level may be defined by the pulsing profile relative to the maximum ultrasonic energy level.

The ultrasonic energy induced in the ultrasonic instrument 14 may cause the tip 16 to vibrate. The frequency, amplitude, and velocity of the vibrations of the tip 16 may correspond to that of the induced ultrasonic energy, which in turn may correspond to that of the AC drive signal. For a given pulsing profile, a peak vibration amplitude and velocity may occur in the tip 16 when the maximum ultrasonic energy level is induced in the ultrasonic instrument 14, which may be set to a level sufficient for resecting the type of target tissue. The periodic reductions of ultrasonic energy induced in the ultrasonic instrument 14 according to the pulsing profile may cause periodic reductions of the vibration amplitude and velocity of the tip 16 from the peak amplitude and velocity, which may reduce heat generation in the ultrasonic instrument 14 and at the surgical site while maintaining an acceptable resection rate. In other words, implementation of a given pulsing profile may reduce the number of vibratory cycles that the tip 16 moves at a peak velocity relative to inducing ultrasonic energy in the ultrasonic instrument 14 that is maintained at the set maximum ultrasonic energy level, leading to a reduction in frictional heat generation.

In addition to reducing heat generation when cutting hard tissue, periodically reducing ultrasonic energy induced in the ultrasonic instrument 14 according to a predetermined pulsing profile may enable finer resection control when applying the tip 16 to certain tissues, such as soft tissues, by causing vibrations of the tip 16 that slow resection rates of firmer tissues while substantially maintaining resection rates of softer tissues. In other words, the predefined pulsing profiles may provide improved tissue selectivity. These and other aspects of the present disclosure are described in more detail below.

The ultrasonic instrument 14 may include a handpiece 18. The tip 16 may be removably coupled to the handpiece 18 so as to enable the handpiece 18 to be used with different interchangeable tips 16. Different tips 16 removably coupleable to the handpiece 18 may be configured for different types of procedures. For instance, some tips 16 removably coupleable to the handpiece 18 may be configured for ablating soft tissue. A tip 16 configured for ablating soft tissue may define a lumen for providing suction at the surgical site through the tip 16. Some tips 16 removably coupleable to the handpiece may be configured for ablating hard tissue such as fibrous tissue and bone. A tip 16 configured for ablating hard tissue may feature a tip head 17 formed with teeth or flutes dimensioned to remove tissue via a cutting action. Tips 16 removably coupleable to the handpiece 18 may also be of different lengths for providing access to patient anatomy at different depths. Some tips 16 removably coupleable to the handpiece 18 may be designed to only vibrate longitudinally at their tip heads 17, while other tips 16 removably coupleable to the handpiece 18 may be designed to vibrate both longitudinally and torsionally and/or substantially torsionally at their tip heads 17. As described in more detail below, the ultrasonic tool system 10 may be configured to implement different pulsing profiles for different tips 16 so as to optimize the pulsed ultrasonic energy to the specific tip 16 being used and the specific procedure being performed.

The handpiece 18 may form a proximal end of the ultrasonic instrument 14, and the tip 16 coupled to the handpiece 18 may form a distal end of the ultrasonic instrument 14. "Proximal" may be understood as towards a practitioner holding the ultrasonic instrument 14 and away from the tissue to which the tip 16 is being applied, and "distal" may be understood as away from the practitioner and towards the tissue to which the tip 16 of the ultrasonic instrument 14 is being applied.

The handpiece 18 may include a housing 20 that defines a handle for the practitioner to grasp and maneuver the ultrasonic instrument 14. The handpiece 18 may also include a transducer 22 disposed in a void defined by the housing 20.

The transducer 22 may include one or more drivers 24, such as piezoelectric crystals. The drivers 24 may be disc shaped, and may be arranged within the housing 20 end to end in a stack. Each driver 24 may be formed from a material that, upon application of an alternating electrical current, undergoes momentary expansions and contractions along the longitudinal axis of the driver 24, namely, the axis that extends between the proximally and distally directed faces of the driver 24. Insulating discs may be disposed between and tightly abut adjacent drivers 24. It is further contemplated that the transducer 22 may alternatively include a plurality of magnetostrictive elements. The transducer 22 may further include a tube 26, which may extend through the collinear longitudinal axes of the drivers 24.

The handpiece 18 may also include a horn 28 at least partially disposed within the void defined by housing 20. The horn 28 may be coupled to the distal end of the transducer 22. The horn 28 may be constructed from a rigid steel alloy, titanium or similar material. In operation, as the transducer 22 expands and contracts, the horn 28 may oscillate. The horn 28 may be removably coupled to the transducer 22. For example, the proximal end of the horn 28 may include a threaded male coupler and the distal end of the transducer 22 may include a corresponding female threaded coupler. Alternatively, the transducer 22 and the horn 28 may be permanently coupled via a weld, adhesive, or similar bonding process.

The tip 16 may be removably couplable to the horn 28. More specifically, the distal end of the horn 28 may include a threaded coupler configured to engage corresponding threads on the proximal end of the tip 16. It is further contemplated that other coupling methods may be utilized to removably couple the tip 16 to the horn 28. For example, the distal end of the horn 28 may comprise features that allow snap fit engagement with the tip 16.

The ultrasonic instrument 14 may be removably couplable to the control console 12 via an electrical cable 30. One end the electrical cable 30 may be permanently connected to the proximal end of the housing 20 of the ultrasonic instrument 14, and the other end of the electrical cable 30 may include an adapter 32 corresponding to a socket 34 of the control console 12. The socket 34 may be shaped to receive the adapter 32, and may include electrical contacts corresponding to electrical contacts of the adapter 32 such that when the adapter 32 is fully seated in the socket 34, an electrical connection is formed between the ultrasonic instrument 14 and the control console 12.

Upon actuation of the ultrasonic instrument 14, the control console 12 may generate and source an AC drive signal to the ultrasonic instrument 14 over the electrical cable 30. Application of the AC drive signal to the ultrasonic instrument 14 may induce ultrasonic energy in the ultrasonic instrument 14, and correspondingly may cause the tip 16 of the ultrasonic instrument 14 to vibrate.

More particularly, the ultrasonic instrument 14 may be designed so that the AC drive signal from the control console 12 is applied to each of the drivers 24 of the transducer 22 in parallel, which may cause the drivers 24 to simultaneously expand and contract along a longitudinal axis of the transducer 22 in accordance with the AC drive signal. The stack of drivers 24 may be between 1 and 5 cm in length. The distance, or amplitude, of movement over a single expansion/contraction cycle of the drivers 24 may be between 1 and 10 microns.

The horn 28 may be configured to amplify this movement. Consequently, the distal end of the horn 28 and, by extension, the tip 16, may each move back and forth along its longitudinal axis between a fully contracted position to a fully extended position, thereby producing a longitudinal vibrating motion. As some examples, the maximum peak-to-peak vibration of the tip head 17, representing a single movement from the fully contracted position to the fully extended position, may be 1000 microns, or 500 microns, or 300 microns. As previously described, some tips 16 removably coupleable to the handpiece 18 may be configured to vibrate both longitudinally and torsionally and/or substantially torsionally at their tip heads 17. Such a tip 16 may include a feature along its length, such as helical grooves, that is configured to convert the longitudinal vibrations applied to the proximal end of the tip 16 into vibrations at the tip head 17 having both a longitudinal component and a torsional component and/or having substantially only a torsional component.

To assist in reducing heat generation during an operation, the ultrasonic instrument 14 may define an irrigation pathway 35 for supplying irrigating fluid to a distal region of the tip 16 (e.g., the tip head 17) and the surgical site. More specifically, the ultrasonic instrument 14 may include an irrigation sleeve 36 adapted to be disposed around the tip 16 and removably coupled to the handpiece 18, such as the housing 20 of the handpiece 18, for supplying irrigating fluid to at least a distal region of tip 16 and the surgical site.

The irrigation sleeve 36 may include a sleeve body 38 having open proximal and distal ends and defining a lumen 40 extending between the open proximal and distal ends. The sleeve body 38 may be adapted to be coupled to the handpiece 18, such as the housing 20 of the handpiece 18, so that the tip 16 extends through the lumen 40 and out the open distal end of the sleeve body 38. For instance, the proximal end of the sleeve body 38 may be formed with a coupling feature for releasably coupling of the sleeve body 38 to the distal end of the housing 20. When disposed over the tip 16 and coupled to the housing 20, the irrigation sleeve 36 may be radially spaced from the tip 16, and may be spaced longitudinally away from the tip head 17 as described above. The components of the ultrasonic instrument 14 may be dimensioned so that during normal operation, the tip 16 does not contact the irrigation sleeve 36.

During operation of the ultrasonic instrument 14, irrigating fluid may be flowed from the handpiece 18, into the gap between the tip 16 and the sleeve body 38, and then out the open distal end of the sleeve body 38. More specifically, the handpiece 18 may include an irrigation conduit 42 running through the housing 20 from the proximal end to the distal end of the handpiece 18. The proximal end of the irrigation conduit 42 may be coupled to a fitting 44 of the ultrasonic instrument 14 that extends from a proximal end of the handpiece 18 for receiving an irrigation line.

The irrigation sleeve 36 may similarly include an irrigation conduit 46 in fluid communication with the lumen 40 defined by the sleeve body 38. The irrigation conduit 46 may extend from the proximal region of the sleeve body 38 and run adjacent the lumen 40 to an aperture 48 formed in a wall of the lumen 40. The aperture 48 may be positioned at an intermediary portion of the lumen 40 between the proximal and distal ends of the lumen 40, and may be configured to supply irrigating fluid from the irrigation conduit 46 into the gap between the tip 16 and the sleeve body 38. The proximal end of the irrigation conduit 46 of the irrigation sleeve 36 may be adapted to fluidly engage the distal end of the irrigation conduit 42 of the handpiece 18.

Accordingly, during operation of the ultrasonic instrument 14, irrigating fluid may flow from a fluid source through the fitting 44 and conduits 42, 46 and out the aperture 48 into the lumen 40. Such irrigating fluid may then run distally down the lumen 40 and out the open distal end of the sleeve body 38. In alternative examples, rather than being configured to receive irrigating fluid from the handpiece 18, the irrigation sleeve 36 may include a fitting in fluid communication with the irrigation conduit 46 and disposed on an outer surface of the sleeve body 38 for receiving an irrigation line running outside of the handpiece 18. During operation of the ultrasonic instrument 14, irrigating fluid may be similarly flowed through the gap between the tip 16 and the sleeve body 38 via the fitting and out the open distal end of the sleeve body 38.

The pulsing techniques described herein may enable a reduction in the size and complexity of the irrigation sleeve 36 relative to the absence of pulsing. In particular, as irrigating fluid moves through the irrigation sleeve 36 towards the surgical site, the interaction between the irrigating fluid and the vibrating tip 16 may place a load on the tip 16, which in turn may cause the control console 12 increase power supplied to the ultrasonic instrument 14 to overcome the load and maintain vibrations of the tip 16 at a desired level. As a result, more power may be dissipated through the irrigating fluid, which may cause increased heating of the irrigating fluid. Contact with the irrigation sleeve 36 by a practitioner or by adjacent tissue may also place an increased load on the tip 16, and may similarly cause increased heating of the irrigating fluid.

Absent the pulsing techniques described herein, the width of the irrigation sleeve 36 may be selected so the gap between the tip 16 and the irrigation sleeve 36 is relatively large, and the distal end of the irrigation sleeve 36 may incorporate a relatively complex geometry, to prevent the irrigating fluid from heating to a temperature that increases potential trauma to tissue surrounding the target tissue as it moves through the irrigation sleeve 36 to the distal region of the tip 16. The practitioner may also be prohibited from holding the ultrasonic instrument 14 upwards while the irrigation sleeve 36 fills with irrigating fluid, and from holding the ultrasonic instrument 14 by the irrigation sleeve 36, to reduce the load that the irrigating fluid and irrigation sleeve 36 place on the tip 16. Because the pulsing techniques described herein may lessen the heat generating interaction between the irrigating fluid and the tip 16, the width of the irrigation sleeve 36 may be made smaller and the practitioner may possibly engage in the above practices. In some examples, implementation of the pulsing techniques described herein may also enable irrigating fluid to be routed through rather than around the tip 16 (e.g., through the fluid pathway 50 described below), and the irrigation sleeve 36 may be omitted from the ultrasonic instrument 14 entirely.

The ultrasonic instrument 14 may also define a fluid pathway 50 for providing suction at the distal region of the tip 16 (e.g., the tip head 17). Specifically, the tube 26 of the transducer 22 may define a lumen extending from the proximal end to the distal end of the transducer 22 to create a fluid passageway through the transducer 22. The horn 28 may similarly define a lumen extending from the proximal end to the distal end of the horn 28 to create a fluid passageway through the transducer 22, and the tip 16 may also define a lumen extending from the proximal end to the distal end of the tip 16 to create a fluid passageway through the tip 16. Collectively, these lumens may form at least a portion of the fluid pathway 50 that extends from the distal region of the tip 16 to the proximal region of the handpiece 18.

The ultrasonic instrument 14 may further include a fitting 52 coupled to the tube 26 and extending proximally from the proximal region of the handpiece 18. During a procedure, suction may be applied to the fluid pathway 50 via the fitting 52 to draw the irrigating fluid applied to the surgical site and debris formed by a procedure that is entrained in the fluid towards and out of the proximal end of the handpiece 18. The suction may also draw tissue towards the tip head 17, which may enhance the effectiveness of the tip 16 in treating patient tissue.

In some instances, the fluid pathway 50 for providing suction at the distal region of the tip 16 may only be present when the tip 16 is configured for ablating soft tissue. In other words, tips 16 configured for ablating hard tissue may not define a lumen extending therethrough that completes the fluid pathway 50.

The control console 12 may include a display 54 for presenting information to the practitioner. Non-limiting examples of presented information may include an identification of the ultrasonic instrument 14, or more particularly of the handpiece 18 and/or tip 16, currently connected to the control console 12, and an operating state of the ultrasonic tool system 10. The display 54 may be a touch screen display that enables the practitioner to provide input to the control console 12, such as via on-screen control elements. A practitioner may interact with the on-screen control elements to set operational parameters of the ultrasonic tool system 10, such as a maximum ultrasonic energy level, a suction level, an irrigation level, an ablation mode, and a pulse control level for the ultrasonic instrument 14.

The ultrasonic tool system 10 may also include one or more actuation devices coupled to the control console 12. Upon activation by the practitioner, each of the actuation devices may cause the control console 12 to generate and source the AC drive signal to the ultrasonic instrument 14 that induces ultrasonic energy in the ultrasonic instrument 14, and correspondingly causes the tip 16 of the ultrasonic instrument 14 to vibrate according to the set operational parameters.

For instance, the one or more actuation devices may include a foot pedal 56. The foot pedal 56 may be wirelessly connected to the control console 12, such as via an adapter 58 connected to the control console 12. Upon being depressed, the foot pedal 56 may communicate an actuation signal to the control console 12 that indicates the depression. In some instances, the communicated actuation signal may vary with the extent to which the foot pedal 56 is depressed, such as to enable the practitioner to vary the maximum ultrasonic energy level induced in the ultrasonic instrument 14 via the foot pedal 56. Responsive to receiving the actuation signal, the control console 12 may generate and source an AC drive signal to the ultrasonic instrument 14 that causes the tip 16 to vibrate according to the current settings of the control console 12 and/or the extent of the depression indicated by the actuation signal.

The ultrasonic tool system 10 may also include a remote control 60 coupled to the control console 12. Similar to the touch screen display 54, the remote control 60 may include practitioner-selectable elements for providing practitioner input to the control console 12. For instance, the remote control 60 may include buttons for setting the operational parameters of the ultrasonic tool system 10, such as the maximum ultrasonic energy level, suction level, irrigation level, ablation mode, and pulse control level for the ultrasonic instrument 14. The remote control 60 may also include a power button for turning on and off the control console 12. Additionally, or alternatively, the control console 12 may include an integrated power button 62 for turning on and off the control console 12.

Figure 2:
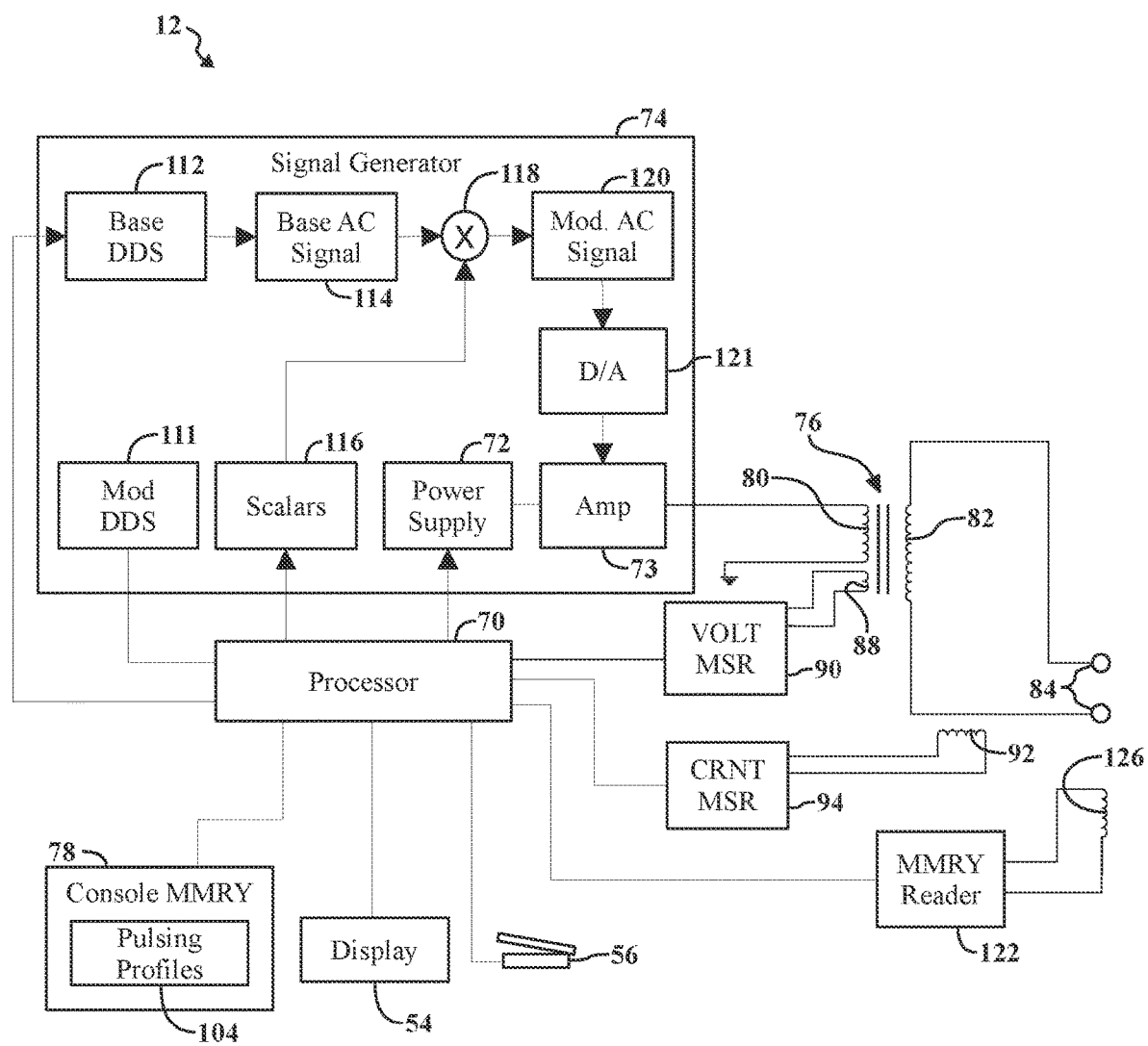
FIG. 2 illustrates components of the control console of FIG. 1.

FIG. 2 illustrates components that may be integral with the control console 12. The control console 12 may include a processor 70, a signal generator 74, a transformer 76, and console memory 78. The processor 70 may include one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog or digital) based on operational instructions stored in the console memory 78. The console memory 78 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or any other device capable of storing information. The console memory 78 may also include one or more persistent data storage devices such as a hard drive, optical drive, tape drive, non-volatile solid state device, and/or any other device capable of persistently storing information.

The processor 70 may be configured to implement the functions, features, processes, and methods of the control console 12 described herein. In particular, the processor 70 may operate under control of software embodied by computer-executable instructions residing in the console memory 78. The computer-executable instructions may be compiled or interpreted from a variety of programming languages and/or technologies, including, without limitation, and either alone or in combination, Java, C, C++, C#, Objective C, Fortran, Pascal, Java Script, Python, Perl, and PL/SQL. The computer-executable instructions may be configured, upon execution of the processor 70, to cause the processor 70 to implement the functions, features, processes, and methods of the control console 12 described herein.

For instance, the processor 70 may be configured to control the level of ultrasonic energy induced in the ultrasonic instrument 14, and correspondingly control the vibrations of the tip 16, by regulating the AC drive signal sourced to the ultrasonic instrument 14 from the control console 12. More particularly, during operation of the ultrasonic tool system 10, the processor 70 may be configured to output one or more control signals to the signal generator 74 indicating a target AC drive signal to be sourced from the control console 12 to the ultrasonic instrument 14. The signal generator 74 may be configured to responsively generate an AC signal, such as using direct digital synthesis (DDS) and one or more amplifiers, across a primary winding 80 of a transformer 76. The AC signal may be proportional to the target AC drive signal indicated by the control signal, and may induce the target AC drive signal across a secondary winding 82 of the transformer 76, which may be coupled to the ultrasonic instrument 14, such as through electrical contacts 84.

Figure 3:
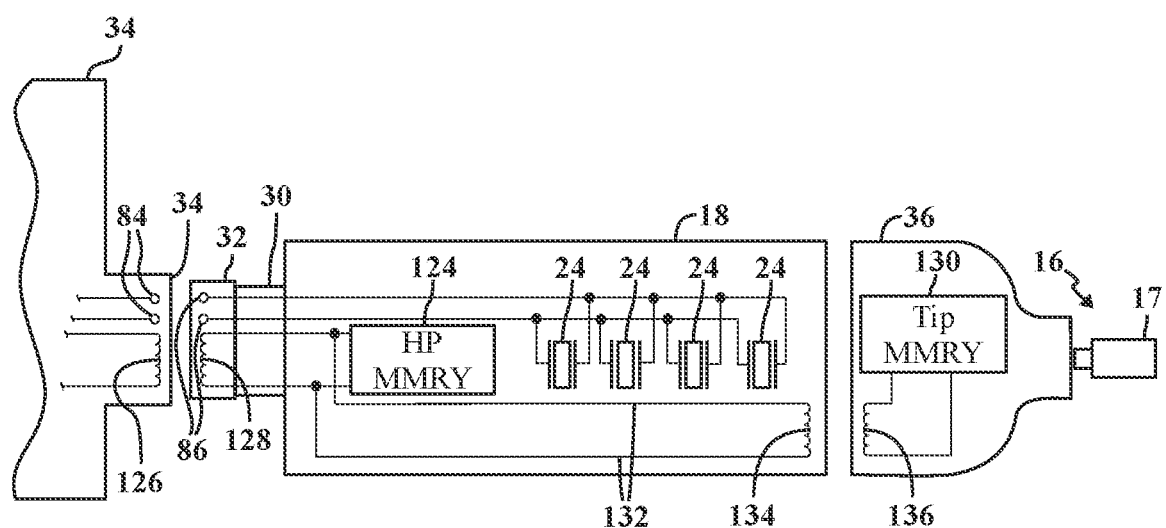
FIG. 3 illustrates components of the ultrasonic instrument of FIG. 1.

Referring to FIG. 3, the electrical contacts 84 may be integral with the socket 34 of the control console 12. Corresponding electrical contacts 86 may be integral with the adapter 32 of the electrical cable 30. The electrical contacts 86 may also be electrically connected to opposing ends of each driver 24 of the ultrasonic instrument 14. When the adapter 32 is fully seated in the socket 34, the electrical contacts 84, 86 may become aligned and form an electrical connection, and may thereby apply the AC drive signal developed across the secondary winding 82 of the transformer 76 to each driver 24 to induce ultrasonic energy in the ultrasonic instrument 14 and correspondingly cause vibrations of the tip 16.

Figure 4A:
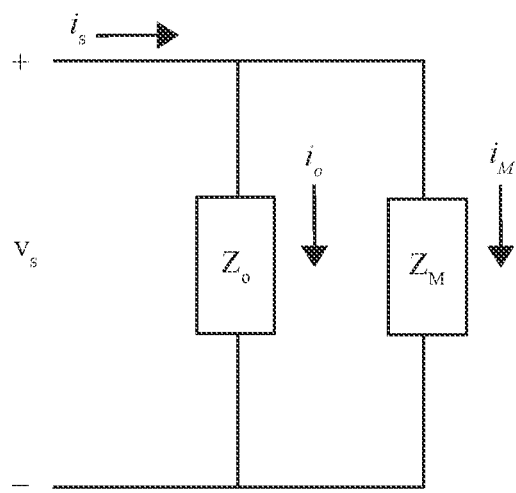
FIGS. 4A and 4B illustrate circuits representing current flow through the ultrasonic instrument of FIG. 1.
Figure 4B:
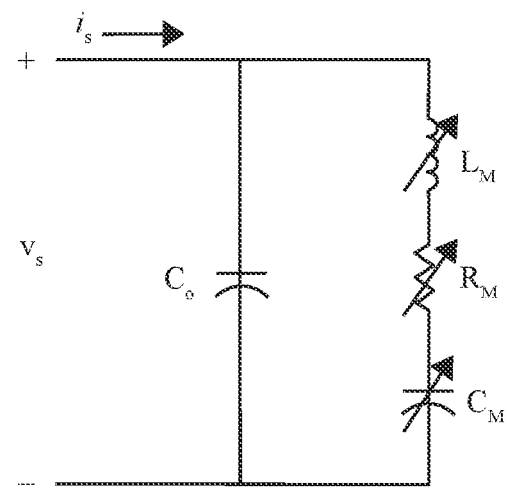

FIGS. 4A and 4B show circuits illustrating the flow of current through the ultrasonic instrument 14 when an AC drive signal is sourced to the ultrasonic instrument 14 from the control console 12. As shown in the illustrated examples, the current $i_S$ of the sourced AC drive signal may be broken down into two components: a current $i_O$ applied to the drivers 24 of the ultrasonic instrument 14 and an equivalent of current $i_M$ applied to the mechanical components of the ultrasonic instrument 14 (also referred to herein as "mechanical current $i_M$"). The mechanical components of the ultrasonic instrument 14 may include those components that vibrate in response to the sourced AC drive signal to treat patient tissue, such as the drivers 24, tube 26, horn 28, and tip 16.

The impedance $Z_O$ provided by the drivers 24 may be primarily capacitive. Accordingly, the drivers 24 may be represented by a capacitor with capacitance $C_O$. The capacitance $C_O$ of the drivers 24 may remain substantially constant during operation of the ultrasonic instrument 14, and may thus be determined and provided to the control console 12 in advance of an operation, such as upon connection of the ultrasonic instrument 14 to the control console 12. Additionally or alternatively, the control console 12 may be configured to periodically measure the capacitance $C_O$ of the driver 24 during operation of the ultrasonic instrument 14 to enable even further precision.

The equivalent of impedance $Z_M$ provided by the mechanical components of the ultrasonic instrument 14 (also referred to herein as "mechanical impedance $Z_M$") may include an inductive component, a resistive component, and a capacitive component. Accordingly, the mechanical components may be represented by an inductor with inductance $L_M$, a resistor with resistance $R_M$, and a capacitor with capacitance $C_M$. The inductance $L_M$, resistance $R_M$, and capacitance $C_M$ may vary with operation of the ultrasonic instrument 14, and at least the resistance $R_M$ (also referred to herein as "mechanical resistance $R_M$") may vary as a function of the load applied to the tip 16, such as by contacted patient tissue. In other words, the mechanical impedance $Z_M$, or more particularly mechanical resistance $R_M$, may vary based on the firmness of the tissue to which the tip 16 is applied and based on the force in which the practitioner applies the ultrasonic instrument 14 to the tissue.

The ultrasonic energy induced in the ultrasonic instrument 14, and correspondingly the vibrations of the tip 16, may be proportional to the mechanical current $i_M$. For instance, the frequency of the vibrations at the tip head 17 may be equal to the frequency of the mechanical current $i_M$, and when the ultrasonic instrument 14 is operating at resonance, the peak-to-peak displacement of the tip head 17 in microns may be approximately double the amplitude of the mechanical current $i_M$ in milliamps. As an example, a mechanical current $i_M$ at the resonant frequency of the ultrasonic instrument 14 and with an amplitude of 150 milliamps may induce the tip head 17 to vibrate back and forth along a path of travel that is approximately 300 microns.

The processor 70 may thus cause vibrations in the tip 16 with a target frequency and displacement level by generating a control signal to the signal generator 74 that causes the signal generator 74 source an AC drive signal to the ultrasonic instrument 14 that induces a mechanical current $i_M$ in the ultrasonic instrument 14 with the target frequency and an amplitude corresponding to the target displacement level. To this end, the processor 70 may be configured to implement two control loops to induce target vibrations in the tip 16, namely, a control loop for regulating the frequency of the mechanical current $i_M$ induced in the ultrasonic instrument 14 by the AC drive signal, and a control loop for regulating the level or amplitude of the mechanical current $i_M$ induced in the handpiece by the AC drive signal. Each control loop may incorporate a PID controller for efficiently adjusting the AC drive signal to achieve the desired values, and may have a loop time of approximately 400 microseconds.

Using Ohm's law, the processor 70 may be configured to calculate the level of mechanical current $i_M$ induced in the ultrasonic instrument 14 using the following Equation:

$$i_M = i_S - j2\pi f C_o v_s \qquad (1)$$

where $i_S$ is the current of the AC drive signal sourced to the ultrasonic instrument 14, f is the frequency of the AC drive signal, $C_o$ is the capacitance of the drivers 28, and $v_s$ is the voltage of the AC drive signal. An explanation for Equation (1) is provided in Applicant's U.S. Pat. No. 10,016,209, the contents of which are hereby incorporated by reference herein in their entirety. Assuming the frequency f of the AC drive signal has been previously set to acheive a desired vibratory characteristic of the ultrasonic instrument 14 (e.g., resonance), the processor 70 may induce a target mechanical current $i_M$ level, and correspondingly target vibrations of the tip 16, by setting the voltage $v_s$ of the AC drive signal so that Equation (1) results in the target mechanical current $i_M$ level.

As mentioned above, a characteristic integral with the ultrasonic instrument 14 is the mechanical resonant frequency of the ultrasonic instrument 14. The mechanical resonant frequency is the frequency at which the distal end of the tip 16 undergoes vibratory motions of a peak range. In other words, assuming other electrical characteristics remain constant, at the resonant frequency, the tip 16 undergoes a motion that is larger in magnitude than a motion that would occur if the drivers 24 were vibrated at a frequency less than or greater than the resonant frequency. For a tip 16 that vibrates longitudinally, the peak range may be understood as the largest back and forth distance of the distal end of the tip 16.

The Applicant's U.S. Pat. No. 10,016,209 also discloses a means for tracking the resonant frequency of the ultrasonic instrument 14, which may vary during operation of the ultrasonic instrument 14. In particular, the ultrasonic instrument 14 may be operating at resonance when the real part of the ratio of the current $i_O$ through the drivers 28 to the mechanical current $i_M$ is substantially equal to zero. The processor 70 may thus be configured to determine the resonant frequency of the ultrasonic instrument 14 by determining a value for the frequency f of the AC drive signal such that the following Equation is true:

$$\operatorname{Re}\left\{\frac{j2\pi f C_o}{i_s - j2\pi f C_o}\right\} \approx 0 \qquad (2)$$

where $i_s$ is the current of the AC drive signal sourced to the ultrasonic instrument 14 and $C_o$ is the capacitance of the drivers 24. Responsive to determining the resonant frequency of the ultrasonic instrument 14, such as using Equation (2), the processor 70 may be configured to set the frequency of the AC drive signal to the determined resonant frequency, thereby causing the ultrasonic instrument 14 to operate at resonance.

The processor 70 may also be configured to track and set the frequency of the AC drive signal according to other vibratory characteristics inherent in the ultrasonic instrument 14, such as the anti-resonant frequency of the ultrasonic instrument 14. In this case, the processor 70 may be configured to determine a value for the frequency f such that left side of Equation (2) substantially equals one.

As the frequency of the AC drive signal is adjusted to follow a target vibratory characteristic of the ultrasonic instrument 14 such as resonance, the mechanical current $i_M$ of the ultrasonic instrument 14 may vary. Accordingly, to induce target ultrasonic energy in the ultrasonic instrument 14, the processor 70 may be configured to repeatably alternate between or perform in parallel the operations of regulating the frequency of the AC drive signal based on Equation (2) and setting the voltage vs of the AC drive signal so that the mechanical current $i_M$, calculated according to Equation (1), corresponds to the target ultrasonic energy.

To this end, referring again to FIG. 2, the processor 70 may be configured to receive feedback data corresponding to the AC drive signal being sourced to the ultrasonic instrument 14, such as via one or more sensors integral with the control console 12. The processor 70 may then be configured to induce target ultrasonic energy in the ultrasonic instrument 14, and correspondingly target vibrations of the tip 16, based on the received data, such as by feeding the received data into the loops that regulate the frequency and voltage vs of the AC drive signal using Equations (1) and (2) respectively.

More particularly, the control console 12 may include a sensor for measuring the voltage $v_s$ of the AC drive signal sourced to the ultrasonic instrument 14, which may include a tickler coil 88 adjacent to or integral with the transformer 76. The tickler coil 88 may be connected to a voltage measuring circuit 90 of the control console 12, which in turn may be connected to the processor 70. The signal across tickler coil 88 may have a known relationship to the voltage $v_s$ of the AC drive signal being sourced to the ultrasonic instrument 14. Based on the signal across the tickler coil 88, the voltage measuring circuit 90 may generate and communicate a signal to the processor 70 representative of the magnitude and phase of the voltage $v_s$ of the AC drive signal being sourced to the ultrasonic instrument 14. The processor 70 may thus be configured to measure the voltage $v_s$ of the AC drive signal via the voltage measuring circuit 90 and tickler coil 88, and to generate control signals for regulating the AC drive signal based thereon.

The control console 12 may also include a sensor for measuring the current $i_s$ of the AC drive signal being sourced to the ultrasonic instrument 14, which may include a coil 92 located in close proximity to one of the conductors that extends from the secondary winding 82 of the transformer 76 to the ultrasonic instrument 14. The coil 92 may be connected to a current measuring circuit 94 of the control console 12, which in turn may be connected to the processor 70. The signal across the coil 92 may have a known relationship to the current $i_s$ of the AC drive signal being sourced the ultrasonic instrument 14. Based on the signal across coil 92, the current measuring circuit 94 may produce and communicate to the processor 70 a signal representative of the magnitude and phase of the current $i_s$ of the AC drive signal being sourced to the ultrasonic instrument 14. The processor 70 may thus be configured to measure the current $i_s$ of the AC drive signal via the current measuring circuit 94 and coil 92, and to generate control signals for regulating the AC drive signal based thereon.

In addition to software programs embodied by computer-executable instructions, the console memory 78 may store data supporting the functions, features, processes, and methods of the control console 12 described herein. For instance, the console memory 78 may include data defining one or more pulsing profiles 104 for inducing pulsed ultrasonic energy in the ultrasonic instrument 14 as described above. Different pulsing profiles 104 may be designed for different situations, such as targeting certain types of tissue for ablation and/or providing increased haptic feedback to the practitioner when cutting hard tissue such as bone. In some examples, a practitioner may select a desired pulsing profile 104 for operating the ultrasonic instrument 14, such as by interacting with the display 54 of the control console 12. Responsive to receiving selection of a given pulsing profile 104, the processor 70 may be configured to retrieve the pulsing profile 104 from the console memory 78, and then generate and source an AC drive signal to the ultrasonic instrument 14 that induces ultrasonic energy in the tip 16 according to the retrieved pulsing profile 104.

Each pulsing profile 104 stored in the console memory 78 may be configured to induce ultrasonic energy in the ultrasonic instrument 14 that includes a series of ultrasonic energy pulses. More particularly, each pulsing profile 108 may indicate varying target levels for the ultrasonic energy induced in the ultrasonic instrument 14 as a function of time so as to form a series of ultrasonic energy pulses peaking at a maximum ultrasonic energy level determined for the ultrasonic instrument 14 and interspaced by ultrasonic energy at a minimum ultrasonic energy level determined for the ultrasonic instrument 14. For instance, each pulsing profile 104 may indicate varying target levels for an upper envelope of the induced ultrasonic energy as a function of time, or may indicate target RMS values for the induced ultrasonic energy as a function of time. To implement a given pulsing profile 104, the processor 70 may thus be configured to generate and source an AC drive signal to the ultrasonic instrument 14 that induces ultrasonic energy in the ultrasonic instrument 14 according to the varying target levels indicated by the given pulsing profile 104.

Each pulsing profile 104 stored in the console memory 78 may include one or more pulsing parameter settings specific to the pulsing profile 104. The pulsing parameters may be for regulating the ultrasonic energy pulses induced in the ultrasonic instrument 14, and may include, without limitation, one or more of a factor for determining a minimum ultrasonic energy level for the induced pulsed ultrasonic energy, a pulse shape, a duty cycle, and a pulsing frequency.

The factor of each pulsing profile 104 may define a minimum ultrasonic energy level for the pulsed ultrasonic energy induced in the ultrasonic instrument 14 as a function of the maximum ultrasonic energy level set for the ultrasonic instrument 14. More specifically, each pulsing profile 104 may be configured to induce ultrasonic energy in the ultrasonic instrument 14 that includes a series of ultrasonic energy pulses peaking at the maximum ultrasonic energy level set for the ultrasonic instrument 14 and interspaced by ultrasonic energy at a minimum ultrasonic energy level set for the ultrasonic instrument 14. The maximum ultrasonic energy level of each ultrasonic energy pulse may correspond to vibrations in the tip 16 of a maximum amplitude and velocity, and the minimum ultrasonic energy level of each pulse may correspond to vibrations in the tip 16 of minimum amplitude and velocity. The maximum ultrasonic energy level may be set by the practitioner, such as to a level sufficient for ablating target tissue, and the minimum ultrasonic energy level may be specific to the pulsing profile 104 being implemented. The factor may indicate a ratio of the maximum ultrasonic energy level set for the ultrasonic instrument 14 to use as the minimum ultrasonic energy level, and may differ among the pulsing profiles 104. Hence, given a set maximum ultrasonic energy level, each pulsing profile 104 may be configured to induce ultrasonic energy pulses in the ultrasonic instrument 14 that peak at the maximum ultrasonic energy level and are interspaced by ultrasonic energy at a different minimum ultrasonic energy level that is specific to the pulsing profile 104.

The pulse shape of each pulsing profile 104 may define the shape for a dynamic portion (also referred to as "transitional ultrasonic energy period") of each cycle of the pulsed ultrasonic energy induced according to the pulsing profile 104. In particular, each ultrasonic energy pulse induced in the ultrasonic instrument 14 may be defined by a transition of ultrasonic energy from a minimum ultrasonic energy level set for the ultrasonic instrument 14 to a maximum ultrasonic energy level set for the ultrasonic instrument 14, and thereafter a transition from the maximum ultrasonic energy level back to the minimum ultrasonic energy level. The period of each cycle of the induced ultrasonic energy in which the ultrasonic energy is transitioning between the minimum and maximum ultrasonic energy levels may be referred to as the dynamic portion of the cycle, and may be defined by the pulse shape of the currently selected pulsing profile 104. In other words, rather than the transitions between the maximum and minimum ultrasonic energy levels being arbitrarily shaped by the inherent electrical characteristics of the ultrasonic tool system 10, such transitions may be particularly controlled to follow a predefined transition function corresponding to the pulse shape of the applied pulsing profile 104. As examples, the pulse shape of a given pulsing profile 104 may be a hann shape corresponding to a hann wave transition function, a square shape corresponding to a square wave transition function, a triangle shape corresponding to a triangle wave transition function, a ramp up sawtooth shape corresponding to a ramp up sawtooth wave transition function, a ramp down sawtooth shape corresponding to a ramp down sawtooth shape transition function, or an inverse version of any of these pulse shapes.

The duty cycle for each pulsing profile 104 may indicate, for each cycle of pulsed ultrasonic energy induced in the ultrasonic instrument 14 according to the pulsing profile 104, a duration of the dynamic portion of the cycle relative to the total duration of the cycle. For a pulsing profile 104 with an 100% duty cycle, the dynamic portion of each cycle of the induced ultrasonic energy may extend the entire duration of the cycle. In this case, the ultrasonic energy level induced by the pulsing profile 104 may be considered as constantly transitioning. In other words, the ultrasonic energy induced by a pulsing profile 104 with an 100% duty cycle may reach the maximum and minimum ultrasonic energy levels for merely an instant (e.g., less than 1 millisecond) before transitioning to the other of the maximum and minimum ultrasonic energy levels, such as according to the pulse shape of the pulsing profile 104. Conversely, for pulsing profiles 104 associated with a duty cycle of less than 100%, the duration of the dynamic portion of each cycle of the induced ultrasonic energy may be a portion of the duration of the entire cycle that corresponds to the duty cycle. The remaining portion of each cycle, referred to as the constant portion of the cycle, may be occupied by a period of ultrasonic energy maintained at a constant level, such as the maximum or minimum ultrasonic energy levels.

The pulsing frequency for each pulsing profile 104 may indicate a frequency for the ultrasonic energy pulses induced in the ultrasonic instrument 14. While the resonant frequency of the ultrasonic instrument 14 may be between 10 and 40 kHz, the pulsing frequency may be much lower, such as less than 100 Hz. For instance, a pulsing frequency of 50 Hz for a given pulsing profile 104 would function to induce ultrasonic energy in the ultrasonic instrument 14 that includes an ultrasonic energy pulse occurring every 20 milliseconds.

As previously described, the ultrasonic energy induced in the ultrasonic instrument 14, and correspondingly the vibrations of the tip 16 of the ultrasonic instrument 14, may be proportional to the mechanical current $i_M$ induced in the ultrasonic instrument 14. Each pulsing profile 104 may thus be defined in reference to a pulsing pattern for the ultrasonic energy induced in the ultrasonic instrument 14, or for the mechanical current $i_M$ induced in the ultrasonic instrument 14. In other words, the maximum ultrasonic energy level set for the ultrasonic instrument 14 may be represented by a corresponding maximum mechanical current $i_M$ set for the ultrasonic instrument 14, and the minimum ultrasonic energy level set for the ultrasonic instrument 14 may be represented by a corresponding minimum mechanical current $i_M$ set for the ultrasonic instrument 14.

In some implementations, the control console 12 may be configured to operate the ultrasonic instrument 14 in multiple ablation modes, such as a soft tissue ablation mode for ablating soft tissue, and a hard tissue ablation mode for ablating hard tissue such as fibrous tissue and bone. In this case, the console memory 78 may be configured to store one or more distinct pulsing profiles 104 for each mode, with the pulsing parameters for each pulsing profile 104 including a parameter indicating whether the pulsing profile 104 is associated with the soft tissue ablation mode or the hard tissue ablation mode.

Figure 5A:
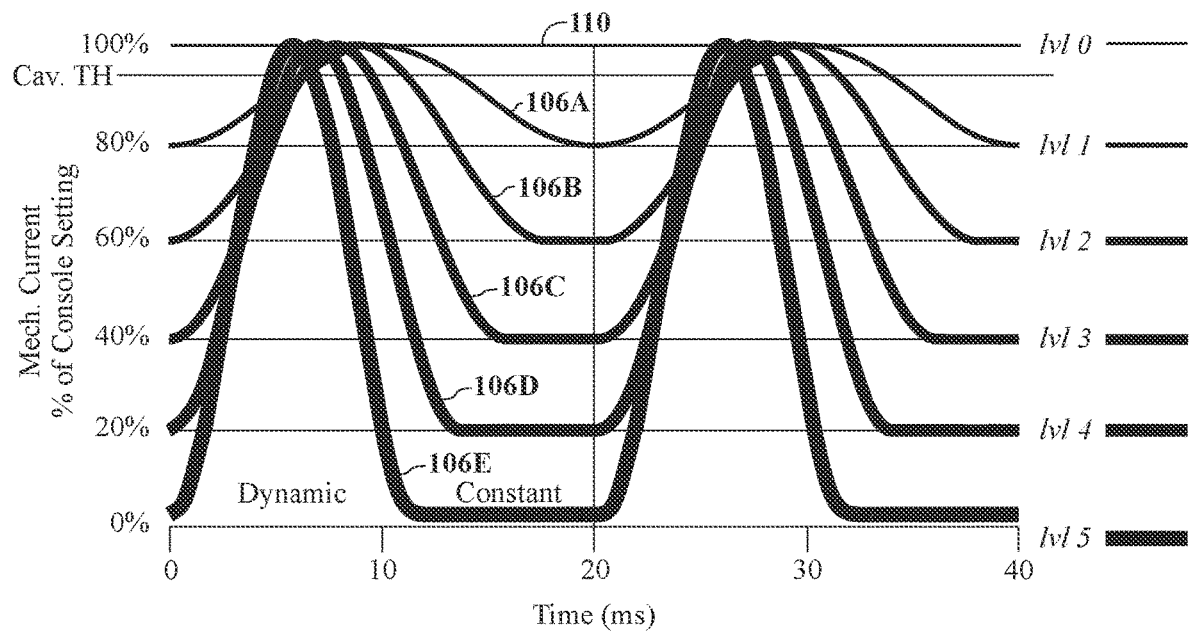
FIGS. 5A and 5B illustrate pulsing profiles that may be induced in the ultrasonic instrument of FIG. 1.
Figure 5B:
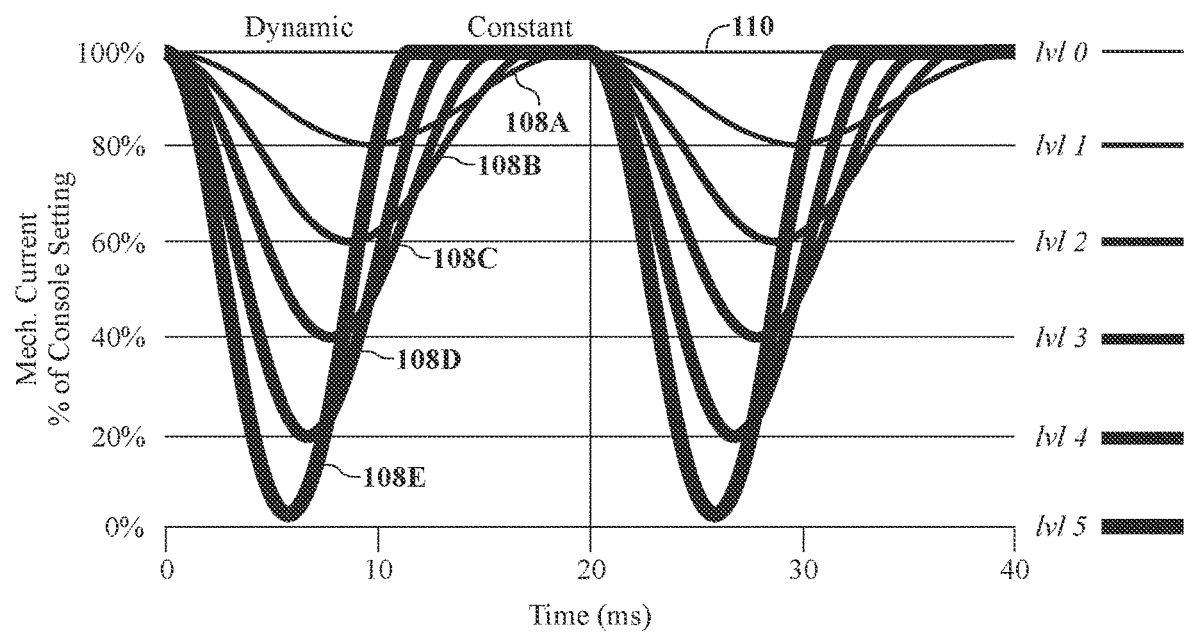

FIG. 5A illustrates pulsing patterns of soft tissue pulsing profiles 106 that may be stored by the control console 12 in association with the soft tissue ablation mode, and FIG. 5B illustrates pulsing patterns of hard tissue pulsing profiles 108 that may be stored by the control console 12 in association with the hard tissue ablation mode. In other words, responsive to determining the ultrasonic instrument 14 is set to be operated in the soft tissue ablation mode, the control console 12 may be configured to make the soft tissue pulsing profiles 106 available for user selection, and responsive to determining the ultrasonic instrument 14 is set to be operated in the soft tissue ablation mode, the control console 12 may be configured to make the hard tissue pulsing profiles 108 available for user selection. The control console 12 may be configured to determine whether the ultrasonic tool system 10 is set to operate in the soft tissue ablation mode or hard tissue ablation mode responsive to corresponding user input and/or based on data read from the ultrasonic instrument 14, which is described in more detail below.

Each of FIGS. 5A and 5B also illustrates a constant energy profile 110 that may be induced in the ultrasonic instrument 14, such as when pulsing mode is disabled by the practitioner via the display 54 of the control console 12, or when the control console 12 determines that the tip 16 presently coupled to the control console 12 is not pulsing enabled.

The constant energy profile 110 illustrated in FIGS. 5A and 5B may be configured to induce ultrasonic energy in the ultrasonic instrument 14 that is maintained at a constant ultrasonic energy level, such as the maximum ultrasonic energy level set for the ultrasonic instrument 14. In other words, when the constant energy profile 110 is applied, the processor 70 may be configured to generate and source an AC drive signal to the ultrasonic instrument 14 that maintains the mechanical current $i_M$ induced in the ultrasonic instrument 14 at a constant level, such as a constant level corresponding to the maximum ultrasonic energy level set for the ultrasonic instrument 14.

The maximum ultrasonic energy level for the ultrasonic instrument 14 may be set based on a power setting selected by the practitioner that indicates a percentage of a global ultrasonic energy limit for the ultrasonic instrument 14. The maximum ultrasonic energy level may further be adjusted down from the ultrasonic energy level indicated by the user power setting as a function of the position of the foot pedal 56. Specifically, the control console 12 may be configured to linearly increase the maximum ultrasonic energy level from a minimum value (e.g., zero) to the level indicated by the power setting as the foot pedal 56 is moved from a fully non-depressed position to a fully depressed position. The maximum ultrasonic energy level set for the ultrasonic instrument 14 may thus vary during a procedure as a function of changes to the practitioner's power setting selection and/or the depression level of the foot pedal 56.

The 100% line illustrated in FIGS. 5A and 5B may correspond to the set maximum ultrasonic energy level. As described above, continuous operation of the ultrasonic instrument 14 at the maximum ultrasonic energy level may cause unwanted heating of the ultrasonic instrument 14 and the surgical site, and may increase potential trauma to surrounding tissue desired to remain intact.

In reference to FIG. 5A, each of the soft tissue pulsing profiles 106 may be configured to induce ultrasonic energy in the ultrasonic instrument 14 that includes a plurality of ultrasonic energy pulses interspaced by periods of ultrasonic energy at the minimum ultrasonic energy level for the ultrasonic instrument 14 determined according to the soft tissue pulsing profile 106, with each of the ultrasonic energy pulses being defined by a hann wave and peaking at the maximum ultrasonic energy level.

The dynamic periods of the pulsed ultrasonic energy induced by each soft tissue pulsing profile 106 may correspond to the periods in which the induced ultrasonic energy transitions from the minimum ultrasonic energy level to the maximum ultrasonic energy level and then back to the minimum ultrasonic energy level set according the soft tissue pulsing profile 106. In other words, the dynamic portions for the soft tissue pulsing profiles 106 may correspond to the ultrasonic energy pulses of the induced ultrasonic energy. Accordingly, the pulse shape parameter for each of the soft tissue pulsing profiles 106 illustrated in FIG. 5A, which defines the shape of the dynamic portions of ultrasonic energy induced by the soft tissue pulsing profile 106, may be set to the hann pulse shape.

As shown in the illustrated example, the soft tissue pulsing profile 106A may have a duty cycle of 100%, and accordingly, the dynamic portion of each cycle of the ultrasonic energy induced according to the soft tissue pulsing profile 106A may extended the entirety of the cycle. Conversely, the soft tissue pulsing profiles 106B to 106E may each have a duty cycle of less than 100%. Accordingly, the dynamic portion of each cycle of the ultrasonic energy induced according to the soft tissue pulsing profiles 106B to 106E may extend only a portion of the cycle, with the remaining portion of the cycle being a constant ultrasonic energy portion in which the ultrasonic energy is maintained at the minimum ultrasonic energy level for a significant period. The duration of the constant ultrasonic energy portion may vary depending on the soft tissue pulsing profile 106 selected. For instance, the duration may be greater than or equal to two milliseconds for some soft tissue pulsing profiles 106, and greater than or equal to five milliseconds for others.

As an example, the duty cycle associated with the soft tissue pulsing profile 106B may be 90%. Assuming each soft tissue pulsing profile 106 has a pulsing frequency of 50 Hz as shown in FIG. 5A, the soft tissue pulsing profile 106B may thus be configured to induce ultrasonic energy pulses that are each 18 milliseconds in duration and interspaced by constant ultrasonic energy periods at the minimum ultrasonic energy level that are each 2 milliseconds in duration. As a further example, the duty cycle associated with the soft tissue pulsing profile 106C may be 80%. Assuming a pulsing frequency of 50 Hz, the soft tissue pulsing profile 106C may thus be configured to induce ultrasonic energy pulses in the ultrasonic instrument 14 that are each 16 milliseconds in duration and interspaced by constant ultrasonic energy periods at the minimum ultrasonic energy level that are each 4 milliseconds in duration. As another example, the duty cycle associated with the soft tissue pulsing profile 106E may be 50%. Assuming a pulsing frequency of 50 Hz, the soft tissue pulsing profile 106E may thus be configured to induce ultrasonic energy pulses in the ultrasonic instrument 14 that are each 10 milliseconds in duration and interspaced by constant ultrasonic energy periods at the minimum ultrasonic energy level that are each 10 milliseconds in duration. Thus, in the examples illustrated in FIG. 5A, the duration of each significant period of ultrasonic energy maintained at the minimum ultrasonic energy level may be greater than or equal 2 milliseconds (e.g., greater than or equal to 4 milliseconds, greater than or equal to 10 milliseconds).

As illustrated in FIG. 5A, each soft tissue pulsing profile 106 may also include a varying factor for determining the minimum ultrasonic energy level for the ultrasonic instrument 14 relative to the maximum ultrasonic energy level set for the ultrasonic instrument 14. For instance, the factor for the soft tissue pulsing profile 106A may be 80%, indicating that when the soft tissue pulsing profile 106A is selected, the minimum ultrasonic level for the ultrasonic instrument 14 should be set to a value that is 80% of the maximum ultrasonic energy level. Conversely, the factor for the soft tissue pulsing profile 106C may be 40%, indicating that when the soft tissue pulsing profile 106C is selected, the minimum ultrasonic level for the ultrasonic instrument 14 should be set to 40% of the maximum ultrasonic energy level.

In reference to FIG. 5B, each of the hard tissue pulsing profiles 108 may be configured to induce ultrasonic energy in the ultrasonic instrument 14 that includes a plurality of ultrasonic energy pulses interspaced by ultrasonic energy at the minimum ultrasonic energy level for the ultrasonic instrument 14 determined according to the hard tissue pulsing profile 108, with each of the ultrasonic energy pulses peaking at the maximum ultrasonic energy level set for the ultrasonic instrument 14.

Conversely to the soft tissue pulsing profiles 106, the dynamic periods of the pulsed ultrasonic energy induced by each hard tissue pulsing profile 108 may correspond to the periods in which the induced ultrasonic energy transitions from the maximum ultrasonic energy level set for the ultrasonic instrument 14 to the minimum ultrasonic energy level set according the hard tissue pulsing profile 108 and back to the maximum ultrasonic energy back to the maximum ultrasonic energy level. In other words, the dynamic portions for the hard tissue pulsing profiles 108 may correspond to the adjoining edges of each pair of adjacent ultrasonic energy pulses of the induced ultrasonic energy. Accordingly, the pulse shape parameter for each of the hard tissue pulsing profiles 108 illustrated in FIG. 5B, which defines the shape of the dynamic portions of ultrasonic energy induced by the hard tissue pulsing profile 108, may be set to the inverse hann pulse shape, corresponding to an inverse hann wave for the dynamic portions. Alternatively, because the hard tissue pulsing profiles 108 are each associated with the hard tissue ablation mode, the pulse shape for each of the hard tissue pulsing profiles may indicate a non-inverted version of the desired shape (e.g., hann shape), and the processor 70 may be configured to inverse the shape when inducing the pulsed ultrasonic energy based on the control console 12 being set to operate in the hard tissue ablation mode.

As shown in the illustrated example, the hard tissue pulsing profile 108A may have a duty cycle of 100%, and accordingly, the dynamic portion of each cycle of the ultrasonic energy induced according to the hard tissue pulsing profile 108A may extend the entirety of the cycle. Conversely, the hard tissue pulsing profiles 108A to 108E may each have a duty cycle of less than 100%. Accordingly, the dynamic portion of each cycle of the ultrasonic energy induced according to the hard tissue pulsing profiles 108B to 108E may extend only a portion of the cycle, with the remaining portion of the cycle being a constant ultrasonic energy portion in which the ultrasonic energy is maintained at the set maximum ultrasonic energy level for a significant period. In other words, the constant ultrasonic energy periods induced by each hard tissue pulsing profile 108 associated with a duty cycle of less than 100% (e.g., pulsing profiles 108B to 108E) may correspond to the periods in which the ultrasonic energy is maintained at the maximum ultrasonic energy level at the peak of each pulse. The duration of the constant ultrasonic energy portions may vary depending on the hard tissue pulsing profile 108 selected. For instance, the duration may be greater than or equal to two milliseconds for some hard tissue pulsing profiles 108, and greater than or equal to five milliseconds for others.

As an example, the duty cycle associated with the hard tissue pulsing profile 108B may be 90%. Assuming each hard tissue pulsing profile 108 has a pulsing frequency of 50 Hz as shown in FIG. 5B, the pulsing profile 108B may thus be configured to induce ultrasonic energy in which the adjoining edges of each pair adjacent pulses are 18 milliseconds in duration, and each ultrasonic energy pulse peaks at the maximum ultrasonic energy level for 2 milliseconds in duration. As a further example, the duty cycle for the pulsing profile 108C may be 80%. Assuming a pulsing frequency of 50 Hz, the pulsing profile 108C may thus be configured to induce ultrasonic energy in the ultrasonic instrument 14 including ultrasonic energy pulses each peaking and including a period of ultrasonic energy maintained at the maximum ultrasonic energy level set for the ultrasonic instrument 14 that is 4 milliseconds in duration, with the constant ultrasonic energy periods being interspaced by dynamic ultrasonic energy periods that are each 16 milliseconds in duration. As another example, the duty cycle for the pulsing profile 108E may be 50%. Assuming a pulsing frequency of 50 Hz, the pulsing profile 108 may thus be configured to induce ultrasonic energy in the ultrasonic instrument 14 including ultrasonic energy pulses each peaking and including a constant ultrasonic energy period at the maximum ultrasonic energy level set for the ultrasonic instrument 14 that is 10 milliseconds in duration, with the constant ultrasonic energy periods being interspaced by dynamic ultrasonic energy periods that are each 10 milliseconds in duration. Thus, in the examples illustrated in FIG. 5B, the duration of each significant period of ultrasonic energy maintained at the maximum ultrasonic energy level may be greater than or equal 2 milliseconds (e.g., 4 milliseconds, 10 milliseconds).

As illustrated in FIG. 5B, each hard tissue pulsing profile 106 may also include a varying factor for determining the minimum ultrasonic energy level for the ultrasonic instrument 14 relative to the maximum ultrasonic energy level set for the ultrasonic instrument 14. For instance, the factor for the hard tissue pulsing profile 108A may be 80%, indicating that when the hard tissue pulsing profile 108A is selected, the minimum ultrasonic level for the ultrasonic instrument 14 should be set to a value that is 80% of the maximum ultrasonic energy level. Conversely, the factor for the hard tissue pulsing profile 108C may be 40%, indicating that when the pulsing profile 108C is selected, the minimum ultrasonic level for the ultrasonic instrument 14 should be set to a value that is 40% of the maximum ultrasonic energy level.

The varying pulsing profiles 106, 108 may provide varying operating characteristics, such as varying levels of tissue selectivity, temperature control, and haptic feedback. The preferred level of such operating characteristics may depend on the personal preferences of the practitioner and on the type of tissue being targeted for ablation. The level of such operating characteristics provided by each pulsing profile 106, 108 may be a function of the duty cycle, minimum ultrasonic energy level, and pulsing frequency of the pulsing profile 106, 108.

For instance, each of the soft tissue pulsing profiles 106 illustrated in FIG. 5A has a different factor for determining a minimum ultrasonic energy level and a different duty cycle. However, assuming the duty cycles were to remain constant among the soft tissue pulsing profiles 106, the lower the minimum ultrasonic energy level defined by a given soft tissue pulsing profile 106 relative to another soft tissue pulsing profile 106, the lower the average amplitude and velocity of the vibrations of the tip 16 that may be induced by the given soft tissue pulsing profile 106. Similarly, assuming the minimum energy factors were to remain constant among the soft tissue pulsing profiles 106, the lower the duty cycle of a given soft tissue pulsing profile 106 relative to another soft tissue pulsing profile 106, the lower the average amplitude and velocity of the vibrations of the tip 16 that may be induced by the given pulsing profile 106. The lower the average amplitude and velocity of the vibrations of the tip 16 that are induced by a given soft tissue pulsing profile 106, the less effective the vibrations of the tip 16 may be at resecting firmer tissues, thereby providing increased tissue selectivity, and the less heat that may be generated by the ultrasonic instrument 14 when resecting tissue. In other words, the lower the average amplitude and velocity of the vibrations of the tip 16 that are induced by a given soft tissue pulsing profile 106, the greater the ratio of tissue preservation of non-targeted firmer tissue verses the resection rate of softer target tissue.

As illustrated in FIG. 5A, each of the soft tissue pulsing profiles 106 may be associated with a different user-selectable pulse control level (e.g., lvl 1 to lvl 5) that may be selected by the practitioner, such as using the display 54 of the control console 12, to cause the control console 12 to induce ultrasonic energy in the ultrasonic instrument 14 according to the soft tissue pulsing profile 106. In some examples, the pulse control levels may be assigned to the soft tissue pulsing profiles 106 such that each incremental pulse control level is associated with a soft tissue pulsing profile 106 that offers increased tissue selectivity and temperature control. More particularly, each selectable pulse control level may be associated with a soft tissue pulsing profile 106 defining a lower minimum ultrasonic energy level and/or duty cycle than the soft tissue pulsing profile 106 associated with the preceding selectable pulse control level. Selectable pulse control levels lower in the order may thus be associated with soft tissue pulsing profiles 106 configured for ablating more tissue types, or more particularly firmer tissues, than those associated with pulse control levels higher in the order.

Ordering the soft tissue pulsing profiles 106 in this manner may offer an intuitive means by which a practitioner may select a soft tissue pulsing profile 106 that corresponds to the practitioner's desired operation characteristics. Specifically, a practitioner may request increased tissue selectivity and temperature control of the ultrasonic instrument 14 by selecting a relatively higher pulse control level, and may request decreased tissue selectivity and temperature control by selecting a relatively lower pulse control level.

Each of the hard tissue pulsing profiles 108 illustrated in FIG. 5B likewise define a different minimum energy factor and duty cycle. However, assuming the duty cycles were to remain constant among the hard tissue pulsing profiles 108, the lower the minimum ultrasonic energy level defined by a given hard tissue pulsing profile 108 relative to another hard tissue pulsing profile 108, the lower the average amplitude and velocity of the vibrations of the tip 16 that may be induced by the given hard tissue pulsing profile 108, and the lower the minimum amplitude and velocity of the tip 16 that may be induced by the given hard tissue pulsing profile 108. In this way, the lower the minimum ultrasonic energy level defined by a given hard tissue pulsing profile 108 relative to another hard tissue pulsing profile 108, the more temperature control that may be provided by the given pulsing profile 104.

Furthermore, the lower the minimum ultrasonic energy level defined by a given hard tissue pulsing profile 108 relative to another hard tissue pulsing profile 108, the more haptic feedback that may be provided to a practitioner upon placing the vibrating tip 16 against different tissues. Specifically, the lower the minimum ultrasonic energy level defined by a given hard tissue pulsing profile 108 relative to another hard tissue pulsing profile 108, the more the practitioner may be able to feel the ultrasonic energy pulses, which may encourage the practitioner to make back and forth motions with the ultrasonic instrument 14 that are often desirable when cutting hard tissue, and the more likely the tip 16 may be to stall as the load placed on the tip 16 increases, which may help reduce undesired ablation and/or necrosis of non-targeted tissue. In addition, because certain tissues, such as soft tissues, may dampen the vibrations felt by the practitioner, the lower the minimum ultrasonic energy level defined by a given hard tissue pulsing profile 108 relative to another pulsing profile 108, the more noticeable it may be to the practitioner when the tip 16 breaks through hard tissue or inadvertently contacts soft tissue during a procedure.

As illustrated in FIG. 5B, each of the hard tissue pulsing profiles 108 may be associated with a different user-selectable pulse control level (e.g., lvl 1 to lvl 5) that may be selected by the practitioner, such as using the display 54 of the control console 12, to cause the control console 12 to induce ultrasonic energy in the ultrasonic instrument 14 according to the hard tissue pulsing profile 108. In some examples, the pulse control levels may be assigned to the hard tissue pulsing profiles 108 such that each incremental pulse control level is associated with a hard tissue pulsing profile 108 that offers increased haptic feedback. More particularly, each selectable pulse control level may be associated with a hard tissue pulsing profile 108 defining a lower minimum ultrasonic energy level than the hard tissue pulsing profile 108 associated with the preceding selectable pulse control level. Selectable pulse control levels lower in the order may thus be associated with hard tissue pulsing profiles 108 configured to provide less haptic feedback than those associated with the pulse control levels higher in the order.

Ordering the hard tissue pulsing profiles 108 in this manner may offer an intuitive means by which a practitioner may select a hard tissue pulsing profile 108 that corresponds to the practitioner's desired operation characteristics. Specifically, a practitioner may request greater levels of haptic feedback by selecting a higher pulse control level in the order, and may request decreased levels of haptic feedback by selecting a lower pulse control level in the order.

Further referring to the hard tissue pulsing profiles 108 illustrated in FIG. 5B, the lower the minimum ultrasonic energy level defined by a given hard tissue pulsing profile 108 relative to another hard tissue pulsing profile 108, the lower the average displacement and velocity of the tip 16 that may be induced by the given hard tissue pulsing profile 108. Such lower displacements and velocity may reduce the resection rate of the ultrasonic instrument 14 when operating against hard tissue. To help maintain a desired resection rate, as further illustrated in FIG. 5B, in addition to each incremental pulse control level being associated with a hard tissue pulsing profile 108 that defines a decreased minimum ultrasonic energy level relative to the hard tissue pulsing profile 108 associated with the preceding pulse control level, each incremental pulse control level may also include a decreased duty cycle relative to the hard tissue pulsing profile 108 associated with the preceding pulse control level so as to increase the period in which the hard tissue pulsing profile 108 induces ultrasonic energy maintained at the maximum ultrasonic energy level set for the ultrasonic instrument 14.

Each of the pulsing profiles 106, 108 illustrated in FIGS. 5A and 5B have a similar pulsing frequency, namely 50 Hz. In alternative examples, two or more of the soft tissue pulsing profiles 106 defined by the ultrasonic tool system 10 may have varying pulsing frequencies, and two or more of the hard tissue pulsing profiles 108 defined by the ultrasonic tool system 10 may likewise have varying pulsing frequencies.

Figure 6A:
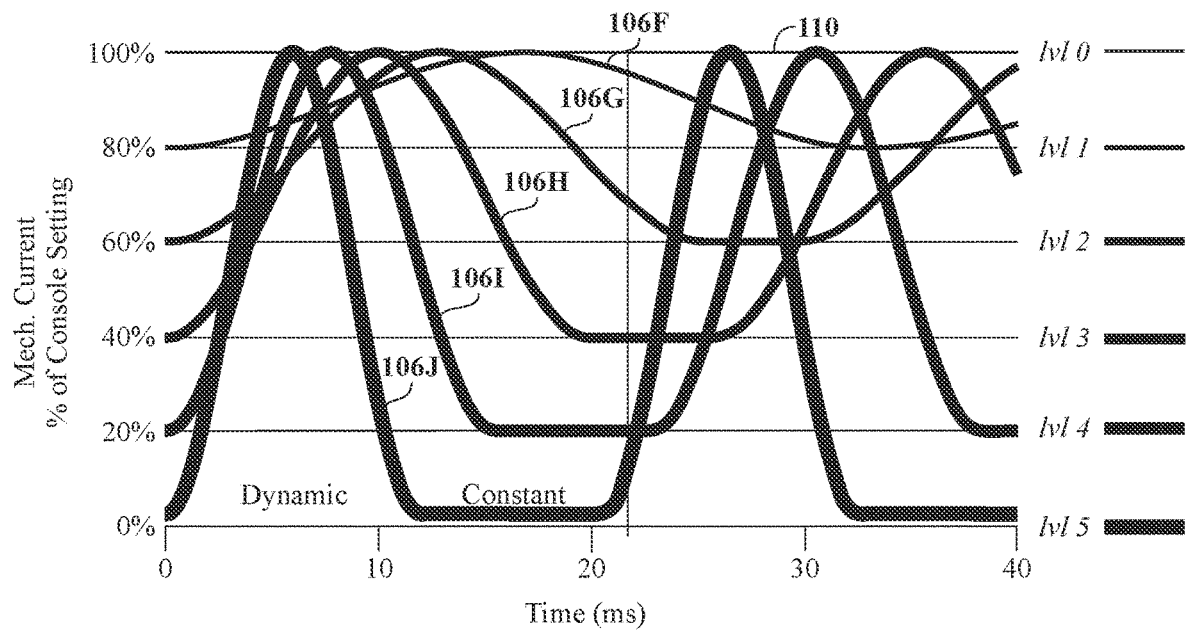
FIGS. 6A and 6B illustrate additional pulsing profiles that may be induced in the ultrasonic instrument of FIG. 1.

As an example, FIG. 6A illustrates soft tissue pulsing profiles 106F to 106J each associated with a different selectable pulse control level (lvl 1 to lvl 5) such that the soft tissue pulsing profile 106 associated with each incremental pulse control level provides a lower minimum ultrasonic energy level, lower duty cycle, and greater pulsing frequency than the soft tissue pulsing profile 106 associated with the preceding pulse control level. For instance, the soft tissue pulsing profiles 106F to 106J may have pulsing frequencies of 30 Hz, 35 Hz, 45 Hz, 50 Hz, and 55 Hz respectively.

Figure 6B:
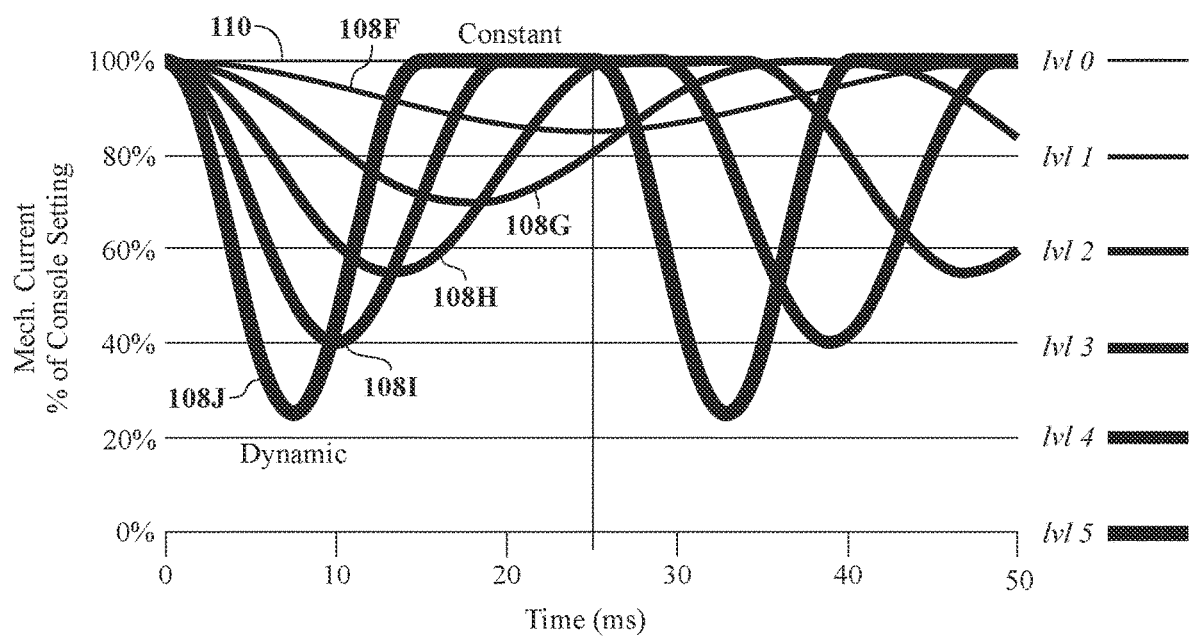

As a further example, FIG. 6B illustrates hard tissue pulsing profiles 108F to 108J each associated with a different selectable pulse control level (lvl 1 to lvl 5) such that the hard tissue pulsing profile 108 associated with each incremental pulse control level has a lower minimum ultrasonic energy level, lower duty cycle, and greater pulsing frequency than the hard tissue pulsing profile 108 associated with the preceding pulse control level. For instance, the hard tissue pulsing profiles 108F to 108J may have pulsing frequencies of 20 Hz, 25 Hz, 30 Hz, 35 Hz, and 40 Hz respectively.

Figure 7A:
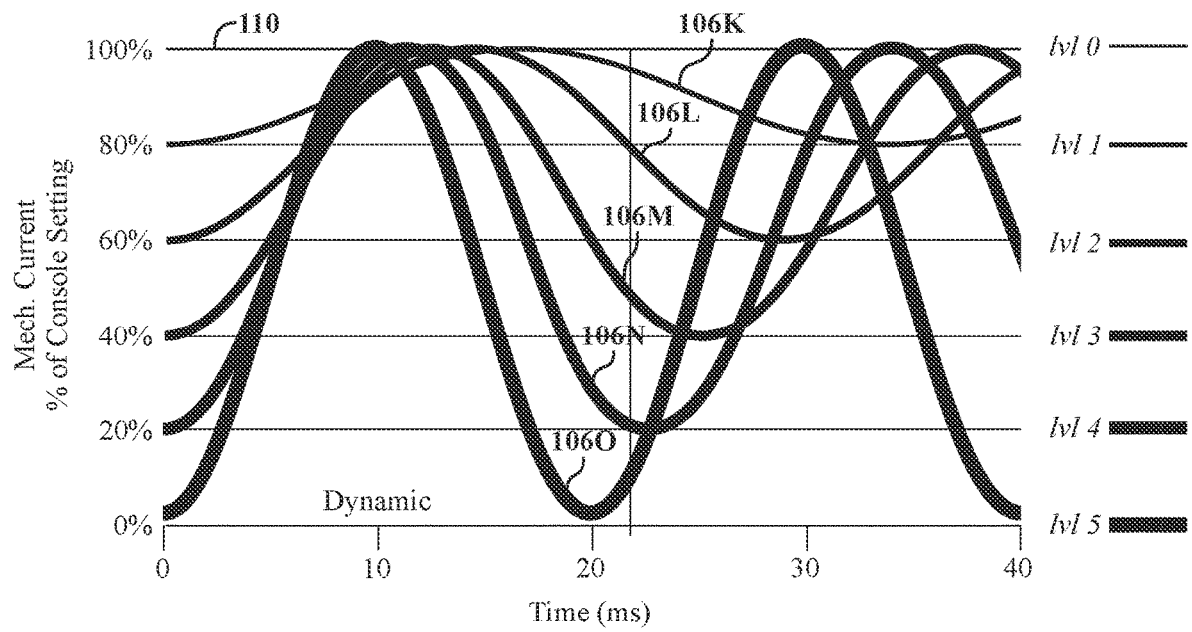
FIGS. 7A and 7B illustrate further pulsing profiles that may be induced in the ultrasonic instrument of FIG. 1.
Figure 7B:
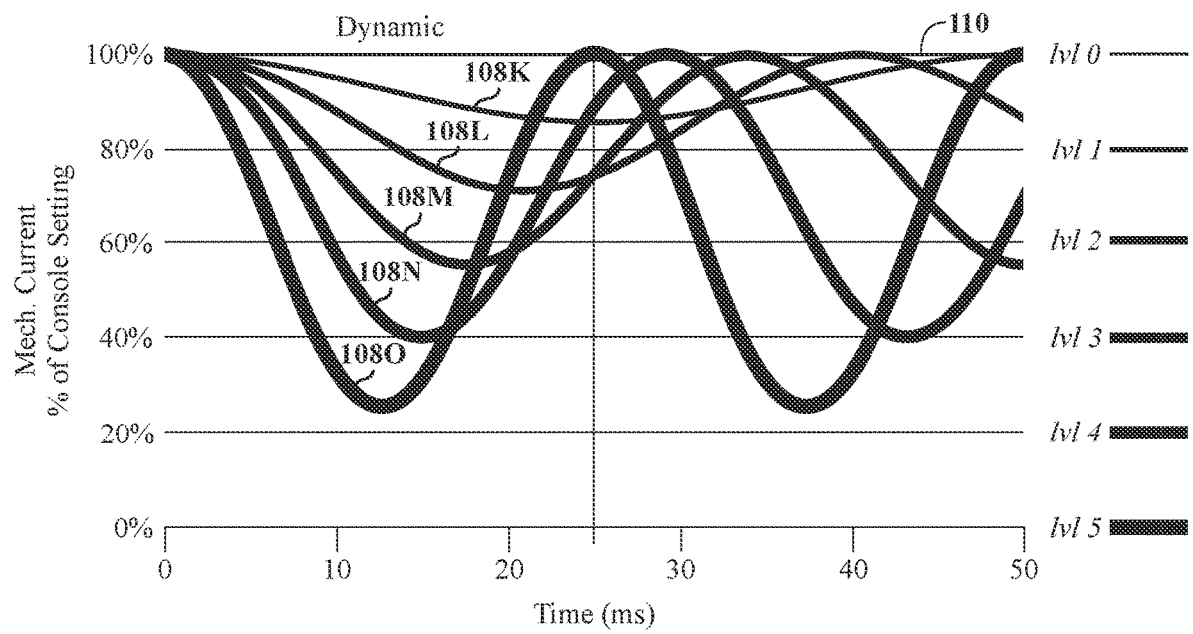

As shown in the previous examples, the varying pulsing profiles 106, 108 defined by the ultrasonic tool system 10 may include varying duty cycles. In alternative examples, however, the ultrasonic tool system 10 may be configured to implement pulsing profiles 106, 108 having a same duty cycle. For instance, FIG. 7A illustrates soft tissue pulsing profiles 106K-106O ordered according to the assigned pulse control levels such that each incremental soft tissue pulsing profile 106 has a lower minimum ultrasonic energy level, a greater pulsing frequency, and a same duty cycle (e.g., 100%) as the preceding soft tissue pulsing profile 106. Similarly, FIG. 7B illustrates hard tissue pulsing profiles 108K-108O ordered according to the assigned pulse control levels such that each incremental hard tissue pulsing profile 108 has a lower minimum ultrasonic energy level, a greater pulsing frequency, and a same duty cycle (e.g., 100%) as the preceding pulsing profile 108.

In some implementations, the ultrasonic tool system may store a set of soft tissue pulsing profiles 106 and a set of hard tissue pulsing profiles 108, with the pulsing profiles of both sets varying by the same pulsing parameters with respect to each other. For instance, the stored soft tissue pulsing profiles 106 may vary in minimum energy factor, duty cycle, and pulsing frequency (e.g., FIG. 6A), and the stored hard tissue pulsing profiles 108 may similarly vary by the same pulsing parameters (FIG. 6B). Alternatively, the pulsing parameters by which the set of soft tissue pulsing profiles 106 may differ from the pulsing parameters by which the set of hard tissue pulsing profiles 108 vary. As an example, the soft tissue pulsing profiles 106 may vary by minimum energy factor, duty cycle, and pulsing frequency (e.g., FIG. 6A), and the hard tissue pulsing profiles 108 may vary by minimum energy factor and pulsing frequency but not duty cycle (e.g., FIG. 7B). In other words, the set of soft tissue pulsing profiles 106 of any one of FIGS. 5A, 6A, and 7A may be paired within the ultrasonic tool system 10 with the hard tissue pulsing profiles 108 of any one of FIGS. 5B, 6B, and 7B.

Some of the above exemplary pulsing profiles 106, 108 have a minimum energy factor that corresponds to a minimum ultrasonic energy level close to zero, such as profile 106E of FIG. 5A and pulsing profile 108E of FIG. 5B, each of which may be associated with pulse control level 5. However, as shown in the illustrated examples, the minimum energy factor of these pulsing profiles 106, 108 may be set so that the minimum ultrasonic energy level does not reduce all the way to zero, but instead just above zero. This may be done so that the ultrasonic energy induced in the ultrasonic instrument 14 does not reach a level in which the control console 12 is unable to track the resonant frequency of the ultrasonic instrument 14. In other words, the minimum ultrasonic level defined by these pulsing profiles 106, 108 may be set so that the vibrations induced in the tip 16 have a magnitude sufficient for the control console 12 to detect the vibrations and track the resonant frequency of the ultrasonic instrument 14. For instance, the minimum energy factor for these pulsing profiles 106 may be set so that the peak-to-peak vibrations of the tip head 17 is greater than 5 microns and less than 20 microns, such about 10 microns. Said differently, the minimum energy factor for these pulsing profiles 106 may be set to 3% or greater, and/or so that the minimum mechanical current induced in the ultrasonic instrument 14 is greater than 2 milliamps and less than 10 milliamps, such as approximately 5 milliamps.

Responsive to selection of a given pulsing profile 104, the processor 70 may be configured to cause the control console 12 to generate and source an AC drive signal to the ultrasonic instrument 14 that induces ultrasonic energy in the ultrasonic instrument 14 according to the selected pulsing profile 104. Specifically, referring to FIG. 2, the processor 70 may be configured to communicate one or more control signals to the signal generator 74 that causes the signal generator 74 to generate an AC signal across the primary winding 80 that corresponds to the selected pulsing profile 104, or more particularly, that induces an AC drive signal across the secondary winding 82, which in turn induces ultrasonic energy according to the selected pulsing profile 104 in the ultrasonic instrument 14.

For instance, responsive to receiving selection of a given pulsing profile 104, the processor 70 may be configured to retrieve the pulsing profile 104, or more particularly the pulsing parameter settings for pulsing profile 104, from the console memory 78. The processor 70 may also be configured to generate and store a modulation waveform corresponding to the retrieved pulsing profile 104, such as in a modulation DDS 111 of the signal generator 74. The modulation DDS 111 may include memory device for storing a sample array populated with values forming the modulation waveform. The modulation waveform may extend between zero and one inclusive, and may have a shape and length corresponding of one cycle of the pulsing pattern represented by the selected pulsing profile 104.

Figure 9:
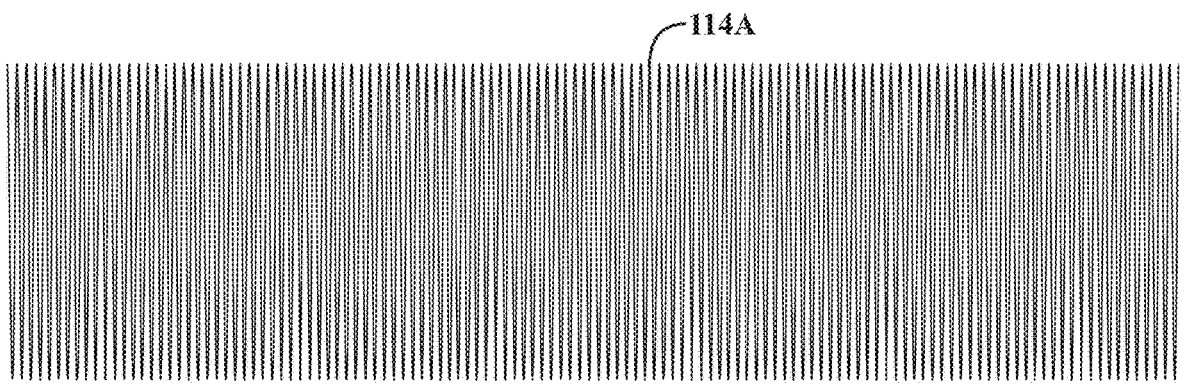
FIG. 9 illustrates a base AC signal that may be generated by the control console of FIG. 1 to induce pulsed ultrasonic energy in the ultrasonic instrument of FIG. 1.

More specifically, the modulation waveform may include an instance of the transition function associated with the pulse shape parameter setting for the selected pulsing profile 104 that extends from zero and peaks at one. If the selected pulsing profile 104 has an 100% duty cycle, then the transition function may extend the entirety of the modulation waveform. If not, then the transition function may extend along a portion of the modulation waveform such that the length of the transition function relative to the length of the modulation waveform corresponds to the duty cycle. In this case, the remaining portion of the modulation waveform may be a constant period maintained at a constant value, such as zero or one. For instance, if the selected pulsing profile 104 is a soft tissue pulsing profile 106 illustrated in FIG. 5A or 6A, then the remaining portion may be set to zero, and if the selected pulsing profile 104 is a hard tissue pulsing profile 108 illustrated in FIG. 5B or 6B, then the remaining portion may be set to one. FIG. 9 illustrates a modulation waveform that may generated and stored by the processor 70 upon selection of soft tissue pulsing profile 106E illustrated in FIG. 5A.

Responsive to actuation of the ultrasonic instrument 14, such as via a depression of the foot pedal 56, the processor 70 may be configured to communicate a target ultrasonic frequency to the signal generator 74, or more particularly to a base DDS 112 of the signal generator 74. The base DDS 112 may store a sample array forming a sinusoidal waveform having a frequency greater than or equal to a maximum ultrasonic frequency that can be sourced to the ultrasonic instrument 14. From this sample array, the base DDS 112 may be configured to generate a base AC signal 114. The base AC signal 114 may be a sinusoidal signal with a frequency equal to the target ultrasonic frequency indicated by the processor 70, and may have a substantially constant amplitude, such as one.

Figure 8:
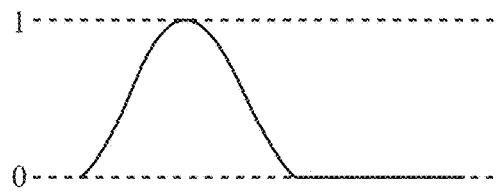
FIG. 8 illustrates a modulation waveform that may be generated by the control console of FIG. 1 to induce pulsed ultrasonic energy in the ultrasonic instrument of FIG. 1.

Initially, the target ultrasonic frequency communicated by the processor 70 may be a predefined target frequency, which may have been read from the ultrasonic instrument 14 as described in more detail below. Thereafter, the processor 70 may be configured to implement a loop for tracking the frequency corresponding to a target vibratory characteristic of the ultrasonic instrument 14 (e.g., resonance), as described above, and communicate a control signal to the base DDS 112 that regulates the frequency of the base AC signal 114 generated by the base DDS 112 according to tracked frequency. FIG. 8 illustrates a base AC signal 114A that may be generated by the base DDS 112.

Further upon actuation of the ultrasonic instrument 14, the processor 70 may be configured to determine the maximum and minimum ultrasonic energy levels for the induced ultrasonic energy, as described above. The processor 70 may then be configured to implement a loop for regulating the magnitude of the ultrasonic energy induced in the ultrasonic instrument 14 according to the selected pulsing profile 104, such as by regulating the mechanical current $i_M$ induced in the ultrasonic instrument 14 according to the selected pulsing profile 104. Iterations of the loop may function to determine a target ultrasonic energy waveform for the induced ultrasonic energy based on the maximum and minimum ultrasonic energy levels, and generate an AC drive signal based on the target ultrasonic energy waveform. Specifically, the processor 70 may be configured to determine a scalar based on the determined maximum ultrasonic energy level and the determined minimum ultrasonic energy level, multiply the modulation waveform by the scalar, and add the determined minimum ultrasonic energy level to the result of multiplication to generate the target ultrasonic energy waveform. The processor 70 may then be configured to compare the target ultrasonic energy waveform to the ultrasonic energy being induced in the ultrasonic instrument 14 to determine an error therebetween between, and adjust the base AC signal 114 with scalars 116 so as to minimize the error, such as using a PID controller.

At a more granular level, for each iteration of the loop, the processor 70 may be configured to determine a target ultrasonic energy level for the ultrasonic instrument 14, such as in the form of a target mechanical current $i_M$ value, based on the maximum and minimum ultrasonic energy levels for the induced ultrasonic energy. In particular, the processor 70 may be configured to determine a scalar based on the maximum and minimum ultrasonic energy level, such as by determining a difference therebetween. The processor 70 may then be configured to retrieve a sample from the sample array of the modulation DDS 111, and multiply the modulation waveform sample by the scalar. Thereafter, the processor 70 may subtract the minimum ultrasonic energy level from the product of the multiplication to generate a target ultrasonic energy level, or more particularly a target mechanical current $i_M$ value, for the ultrasonic instrument 14.

Contemporaneously with determining a target ultrasonic energy level, the processor 70 may be configured to determine the ultrasonic energy level being induced in the ultrasonic instrument 14, such as by calculating a mechanical current $i_M$ value based on feedback data corresponding to the sourced AC drive signal as described above. The processor 70 may then be configured to compare and determine an error between the target ultrasonic energy level and the measured ultrasonic energy level, and generate a voltage scalar that, when multiplied by the base AC signal 114, minimizes the error, such as using PID controller.

For each iteration of the loop, the processor 70 may pull the sample value from the modulation waveform sample array according to the order of the samples within the array. The sample rate in which the processor 70 pulls sample values from the modulation waveform sample array may depend on the size of the modulation waveform array relative to the pulsing frequency and the time of each iteration of the loop (e.g., 400 microseconds). For instance, if the size of the modulation waveform sample array multiplied by the loop time equals the period represented by the pulsing frequency, then for each iteration of the loop, the processor 70 may pull the sample value immediately following the previously pulled sample value with the modulation waveform array. Conversely, if the size of the modulation waveform sample array multiplied by the loop time is greater than the period represented by the pulsing frequency, then the processor 70 may pull samples at a faster sampling rate, such as by skipping samples in the array (e.g., pulling every fifth sample). Similarly, if the size of the modulation waveform sample array multiplied by the loop time is greater than the period represented by the pulsing frequency, then the processor 70 may pull samples at a faster sampling rate, such as by using a given sample for multiple iterations of the loop. As explained below, the processor 70 may be configured to adjust the pulsing rate during a procedure, such as a function of the load being applied to the ultrasonic instrument 14, which in turn may cause the processor 70 to adjust the sampling rate.

As previously mentioned, the maximum ultrasonic energy level, and correspondingly the minimum ultrasonic energy level, for the induced pulsed ultrasonic energy may vary during a procedure, such as a result of the practitioner adjusting the set power level and/or depression level of the foot pedal 56. It should be appreciated that the above algorithm enables the control console 12 to account for such variation without altering the modulation waveform stored in the modulation DDS 111, thereby improving the responsiveness of the system.

The signal generator 74 may further include a multiplier 118 configured to receive and multiply the base AC signal 114 with the generated scalars 116 to generate a modulated AC signal 120. The modulated AC signal 120 may be communicated to a D/A converter 121 and then through the amplifier 73, which may receive a power signal from a power supply 72 regulated by the processor 70. The amplifier 73 may generate a corresponding AC signal across the primary winding 80 of the transformer 76. As one example, the amplifier 73 and power supply 72 may be configured as described in Applicant's U.S. Pat. No. 10,449,570, the contents of which are hereby incorporated by reference herein in their entirety.

Figure 10A:
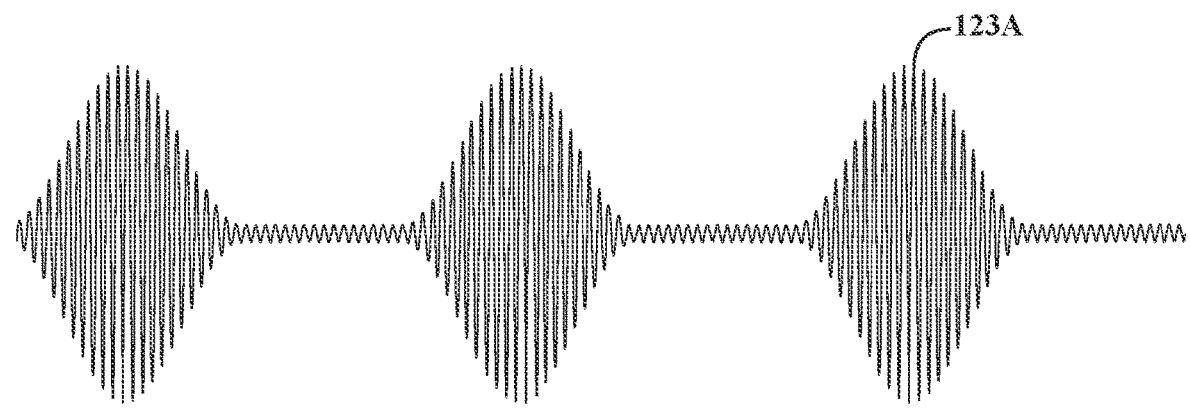
FIGS. 10A and 10B illustrate AC signals that may be generated by the control console of FIG. 1 to induce pulsed ultrasonic energy in the ultrasonic instrument of FIG. 1.
Figure 10B:
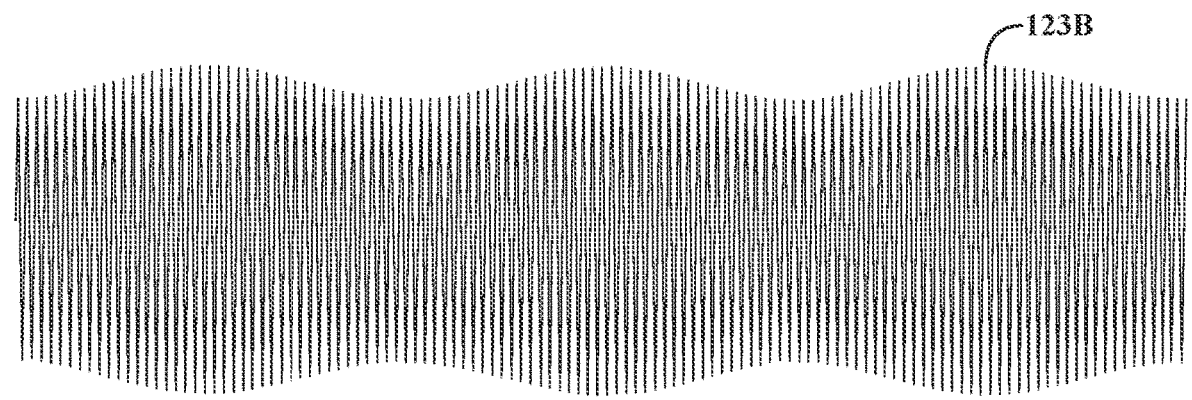

The AC signal across the primary winding 80 may induce an AC drive signal across the secondary winding 64 that in turn induces ultrasonic energy in the ultrasonic instrument 14 according to the selected pulsing profile 104. In other words, the AC signal across the primary winding 80 may induce an AC drive signal across the secondary winding 82 that in turn may induce ultrasonic energy in the ultrasonic instrument 14 including a plurality of ultrasonic pulses, each of the pulses peaking at the maximum ultrasonic energy level determined for the ultrasonic instrument 14 and being interspaced by ultrasonic energy at the minimum ultrasonic energy level defined according to the selected pulsing profile 104. FIG. 10A illustrates an AC signal 123A that may be generated across the primary winding 80 by the signal generator 74, such as upon selection of the soft tissue pulsing profile 90E shown in FIG. 5A. FIG. 10B illustrates another AC signal 123B that may be generated across the primary winding 80 by the signal generator 74, such as upon selection of the soft tissue pulsing profile 106A shown in FIG. 5A.

In alternative implementations, the base DDS 112 may be configured to generate the base AC signal 114 so as to have the tracked ultrasonic frequency indicated by the processor 70 and an amplitude corresponding to the maximum ultrasonic energy level set for the ultrasonic instrument 14. In particular, the processor 70 may be configured to implement a loop of determining an error between the determined maximum ultrasonic energy level and a measured ultrasonic energy level induced in the ultrasonic instrument 14, and provide scalars to the base DDS 112 that minimize the error. In this case, the modulation waveform generated and stored in the modulational DDS 111 may extend between one and the minimum energy factor for the selected pulsing profile 104. The signal generator 74 may then be configured to multiply the base AC signal 114 with the modulation waveform to generate the modulated AC signal 120.

Referring again to FIGS. 2 and 3, the control console 12 may also include a memory reader 122 for communicating with one or more electronic memory storage devices integral with the ultrasonic instrument 14. The ultrasonic instrument 14 may include one or more electronic memory storage devices for storing data that identifies the ultrasonic instrument 14, or more particularly the handpiece 18 and/or tip 16, and defines operational parameters specific to the ultrasonic instrument 14, or more particularly to the handpiece 18 and/or tip 16. Non-limiting examples of operational parameters may include a maximum drive current for the AC drive signal, a maximum current for the mechanical current $i_M$, a maximum drive voltage for the AC drive signal, a maximum drive frequency for the AC drive signal, a minimum drive frequency for the AC drive signal, a capacitance $C_O$ of the drivers 24, PID coefficients, a use history, and whether the ultrasonic instrument 14, or more particularly the tip 16, is pulsing enabled. The one or more memory devices integral with the ultrasonic instrument 14 may also indicate whether the tip 16 coupled to the handpiece 18 configured for ablating soft or hard tissue, and one or more pulsing profiles 104 particular to the tip 16.

For instance, the handpiece 18 of the ultrasonic instrument 14 may include a handpiece (HP) memory 124 disposed therein. As non-limiting examples, the HP memory 124 may be an EPROM, an EEPROM, or an RFID tag. Responsive to connecting the ultrasonic instrument 14 to the control console 12, the processor 70 may be configured to read the data stored in the HP memory 124 using the memory reader 122, and to tailor operation of the control console 12 based on the data. More particularly, the control console 12 may include a communication interface, such as a coil 126, connected to the memory reader 122. The coil 126 may be integral with the socket 34 of the control console 12. The HP memory 124 may similarly be connected to a coil 128, which may be integral with the adapter 32 of the cable 30. When the ultrasonic instrument 14 is connected to the control console 12 via the cable 30, the coils 126, 128 may become aligned and able to inductively exchange signals. The processor 70 may then be configured to read data from and write data to the HP memory 124 over the coils 126, 128.

The memory reader 122 may be configured to convert signals across the coil 126 into data signals readable by the processor 70. The memory reader 122 may also be configured to receive data to be written to the HP memory 124 from the processor 70, and to generate signals across the coil 126 that causes the data to be written to the HP memory 124. The structure of the memory reader 122 may complement that of the HP memory 124. Thus, continuing with the above non-limiting examples, the memory reader 122 may be an assembly capable of reading data from and writing data to an EPROM, EEPROM, or RFID tag.

In addition or alternatively to the HP memory 122, the ultrasonic instrument 14 may include a tip memory 130. As described above, the tip 16 may be removable from the handpiece 18 so the handpiece 18 can be used with interchangeable tips 16, and different tips 16 may have different operational limitations and intended uses. For instance, some tips 16 may be configured for ablating soft tissue, and other tips 16 may be configured for ablating hard tissue such as fibrous tissue and bone. Accordingly, the HP memory 124 may store data identifying the handpiece 18 and operational parameters specific to the handpiece 18, including the capacitance $C_O$ of the drivers 24, and the tip memory 130 may store data identifying the tip 16 currently coupled to the handpiece 18 and operational parameters specific to the tip 16, including whether the tip 16 is configured for ablating soft tissue or cutting hard tissue such as bone, and pulsing parameter settings for pulsing profiles 104 specific to the tip 16. Because the tip 16 and irrigation sleeve 36 may be distributed together as a single package, the tip memory 130 may be disposed in the irrigation sleeve 36, or more particularly the sleeve body 38. The tip memory 130 may be the same type of memory as the HP memory 124 (e.g., an EPROM, an EEPROM, or an RFID tag).

Responsive to connecting the ultrasonic instrument 14 to the control console 12, the processor 70 may be configured to read the data stored in the HP memory 124 and the tip memory 130 using the memory reader 122, and to tailor operation of the control console 12 to the specific handpiece 18 and tip 16 combination coupled to the control console 12. The tip memory 130 may include values for the same operational parameters as the HP memory 124. To the extent the values for a given operational parameter differ between the HP memory 124 and the tip memory 130, the processor 70 may be configured to utilize the more restrictive value to manage operation of the ultrasonic instrument 14. Additionally, or alternatively, to the extent both the HP memory 124 and the tip memory 130 include a value for a same operational parameter, the processor 70 may be configured to manage operation of the ultrasonic instrument 14 relative to the operational parameter based on a combination of the values stored in the memories (e.g., summing the values, averaging the values).

Similar to the HP memory 124, the processor 70 may read data from and write data to the tip memory 130 via the memory reader 122 and coil 126. In particular, the handpiece 18 may include two conductors 132 extending from the proximal end to the distal end of the handpiece 18. The proximal ends of the conductors 132 may be coupled to the coil 128, which may be integral with the adapter 32 of the cable 30. The distal ends of the conductors 132 may be coupled to another coil 134 disposed at the distal end of the handpiece 18. A corresponding coil 136 may be disposed in a proximal end of the irrigation sleeve 36, or more particularly the sleeve body 38. When the irrigation sleeve 36 is disposed around the tip 16 and fitted to the handpiece 18, the coils 134, 136 may become aligned and able to inductively exchange signals. When the handpiece 18 is then connected to the control console 12 via the cable 30, the coils 126, 128 may also become aligned and able to inductively exchange signals. The processor 70 may then read data from and write data to the tip memory 130 over the conductors 132 via inductive communication provided by the coils 126, 128 and the coils 134, 136.

In some implementations, rather than the pulsing profiles 104 being previously stored in the console memory 78, the tip memory 130 may store data indicating pulsing profiles 104 specific to the tip 16. For instance, if the tip 16 is designed for ablating soft tissue, the tip memory 130 may store one or more soft tissue pulsing profiles 106 specific to the tip 16. Alternatively, if the tip 16 is designed for ablating hard tissue, then the tip memory 130 may store one or more hard tissue pulsing profiles 108 specific to the tip 16. In either case, responsive to the ultrasonic instrument 14 being coupled to the control console 12, the processor 70 may be configured to read that pulsing profiles 104 from the tip memory 130 and store the same in the console memory 78 for selection by the user.

The processor 70 may also be coupled and configured to drive the display 54 of the control console 12. Specifically, the processor 70 may be configured to generate information and user interface (UI) components for presentation on the display 54. Such information depicted on display 54 may include information identifying the handpiece 18 and the tip 16, and information describing the operating state of the ultrasonic tool system 10. When the display 54 is a touch screen display, the processor 70 may also be configured to cause the display 54 to depict images of buttons and other practitioner-selectable components. By interacting with the buttons and other practitioner-selectable components, the practitioner may set desired operating parameters for the ultrasonic tool system 10, such as those described herein.

Figure 11:
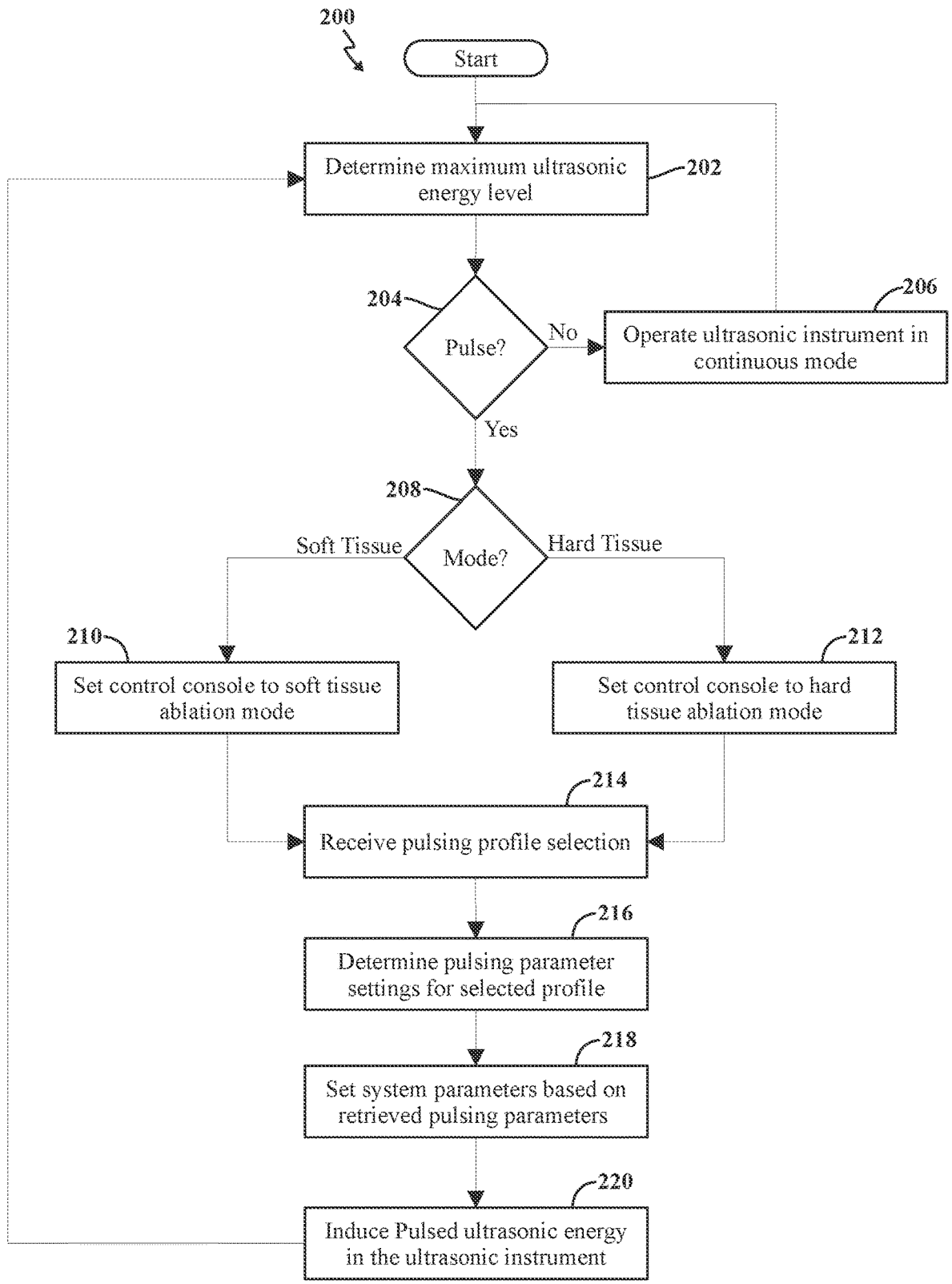
FIG. 11 illustrates a method for inducing pulsed ultrasonic energy in the ultrasonic instrument of FIG. 1.

FIG. 11 illustrates a process 200 for controlling vibrations of the ultrasonic instrument 14 according to a selected pulsing profile 104. The control console 12, or more particularly the processor 70, may be configured to implement the process 200, such as upon execution of computer-executable instructions residing in the console memory 78.

In block 202, a maximum ultrasonic energy level for the induced ultrasonic energy may be determined. The maximum ultrasonic energy level may define a maximum mechanical current $i_M$ for the ultrasonic instrument 14, and correspondingly, may define a maximum amplitude and velocity for the vibrations of the tip 16. The maximum ultrasonic energy level for the ultrasonic instrument 14 may be a based on the maximum ultrasonic energy level in which the ultrasonic instrument 14 is rated to accommodate, also referred to herein as the maximum capable ultrasonic energy level for the ultrasonic instrument 14, which may likewise be defined by a mechanical current $i_M$. The control console 12 may be configured to read the maximum capable ultrasonic energy level for the ultrasonic instrument 14 from the ultrasonic instrument 14, or more particularly, from the HP memory 124 and/or tip memory 130, responsive to the ultrasonic instrument 14 being connected to the control console 12.

The maximum ultrasonic energy level determined in block 202 may also be based on power setting for the ultrasonic instrument 14 input by the practitioner. For instance, the practitioner may interact with the display 54 or remote control 60 of the ultrasonic tool system 10 to input a power setting for the ultrasonic instrument 14, which may indicate a percentage of the maximum capable ultrasonic energy level in which to limit driving the ultrasonic instrument 14. Responsive to receiving the percentage, the processor 70 may be configured to determine the maximum ultrasonic energy level for the ultrasonic instrument 14 by applying the percentage to the maximum capable ultrasonic energy level. In some instances, the processor 70 may further base the maximum ultrasonic energy level based on the depression angle of the foot pedal 56. Specifically, the angle of the foot pedal 56 may indicate to the processor 70 a percentage of the ultrasonic energy level corresponding to the user input power setting to use as the maximum ultrasonic energy level.

The practitioner may set the power setting for the ultrasonic instrument 14 based on the personal preferences of the practitioner and the type of tissue targeted for ablation. As an example, for a given surgical procedure, a practitioner may target certain types of soft tissue for ablation via cavitation while avoiding ablation of other types of soft tissue. In this case, the practitioner may set the control console 12 to limit operation of the ultrasonic instrument 14 to an ultrasonic energy level that causes cavitation of the target tissue types while avoiding cavitation of other tissue types. For instance, relative to a brain procedure, the practitioner may desire to ablate one or more of dura mater, blood vessel walls, arachnoid matter, pia mater, white matter, or grey matter tissue while leaving other types of tissue intact. The ultrasonic instrument 14 may function to cavitate these types of tissue when the ultrasonic energy induced in the ultrasonic instrument 14 is approximately 27% of the maximum capable ultrasonic energy for the ultrasonic instrument 14. Accordingly, the practitioner may set the control console 12 to limit operation of the ultrasonic instrument 14 to 30% of the maximum capable ultrasonic energy for the ultrasonic instrument 14.

Combining a practitioner-selected power setting with one of the pulsing profiles 104 may further help reduce potential trauma to tissue types desired to remain intact. For instance, continuing with the above example and referring to FIG. 5A, when the control console 12 is set to limit operation of the ultrasonic instrument 14 to 30% of the maximum capable ultrasonic energy for the ultrasonic instrument 14, the maximum ultrasonic energy level induced by each soft tissue pulsing profile 106, as indicated by the 100% line, may correspond to 30% of the maximum capable ultrasonic energy for the ultrasonic instrument 14. In this case, each soft tissue pulsing profile 106 may function to cavitate the target tissue when the ultrasonic energy induced by the soft tissue pulsing profile 106 is at or greater than the "cavitation threshold" near the maximum ultrasonic energy level of the soft tissue pulsing profile 106, which as described above may correspond to 27% of the maximum capable ultrasonic energy for the ultrasonic instrument 14. The minimum ultrasonic energy level induced by each soft tissue pulsing profile 106 illustrated in FIG. 5 may be below the cavitation threshold. In this way, each soft tissue pulsing profile 106 may periodically induce ultrasonic energy sufficient to cause cavitation in the target tissue, and may therebetween induce reduced ultrasonic energy levels that function to reduce temperature and ablation of tissue types desired to remain intact.

Referring again to FIG. 11, in block 204, a determination may be made of whether pulsing mode is enabled for the ultrasonic instrument 14. Specifically, a practitioner may interact with the control console 12 to enable and disable pulsing mode, such as using the display 54 or remote control 60, and the processor 70 may be configured to make this determination based on the provided practitioner setting. Responsive to determining that pulsing mode is not enabled ("No" branch of block 204), in block 206, the control console 12 may be set to operate the ultrasonic instrument 14 in a continuous mode, such as according to the constant energy profile 110 described above. Specifically, upon actuation of the ultrasonic instrument 14, the processor 70 may be configured to generate and source an AC drive signal to the ultrasonic instrument that induces ultrasonic energy in the ultrasonic instrument that is maintained at the determined maximum ultrasonic energy level for the ultrasonic instrument 14.

Additionally or alternatively, determining whether pulsing mode is enabled may include determining whether the tip 16 itself is pulsing enabled. In particular, some tips 16 releasably coupleable to the handpiece 18 may be configured for operation only in the continuous mode. Whether a tip 16 is pulsing enabled may be indicated as data specific to the tip 16 stored in in the tip memory 130. Thus, responsive to the ultrasonic instrument 14 being coupled to the control console 12, the processor 70 may be configured to read the data from tip memory 130 and determine whether the tip 16 currently coupled to the handpiece 18 is pulsing enabled. In some instances, the data stored in the tip memory 130 may directly indicate whether the tip 16 is pulsing enabled. In other examples, the tip memory 130 may indicate the type of tip, such as via an identifier specific to the tip 16, and the processor 70 may be configured to query data stored in the console memory 78 corresponding to the tip type to determine whether the tip 16 is pulsing enabled. If not, then the processor 70 may be configured to disable this option from the practitioner, and set the control console 12 to operate the ultrasonic instrument 14 in the continuous mode as described above.

Alternatively, responsive to determining that the tip 16 is pulsing enabled, and/or that pulsing mode has been selected ("Yes" branch of block 204), in block 208, a determination may be made of whether the ultrasonic instrument 14 should be operated in the soft tissue ablation mode or hard tissue ablation mode. As previously described, each mode may be associated with a different set of pulsing profiles 104 specifically designed for the mode. A practitioner may set the control console 12 to either mode using a user interface associated with the control console 12, such as the display 54 or remote control 60, and the processor 70 may be configured to make this determination based on the provided practitioner setting.

Alternatively, the tip memory 130 distributed with the current tip 16 coupled to the handpiece 18 of the ultrasonic instrument 14 may include data indicating whether the tip 16 is configured for soft tissue ablation or hard tissue ablation. The data stored in the tip memory 130 may indicate whether the tip 16 is configured for soft tissue ablation or hard tissue ablation directly, or may indicate a type of the tip 16 that corresponds data stored in the console memory 78 indicative of whether the tip type is for soft or hard tissue ablation. The control console 12 may be configured to read such data from the tip memory 130 when the ultrasonic instrument 14 is connected to the control console 12, as described above, to determine whether the ultrasonic instrument 14 should be operated in the soft tissue ablation mode or hard tissue ablation mode.

Responsive to determining that the ultrasonic instrument 14 is to be operated in the soft tissue ablation mode ("Soft Tissue" branch of block 208), in block 210, the control console 12 may be set to operate in soft tissue ablation mode. For example, the processor 70 may be configured to set a flag in the console memory 78 that corresponds to the control console 12 being set to the soft tissue ablation mode. Responsive to determining that the ultrasonic instrument 14 is to be operated in the hard tissue ablation mode ("Hard Tissue" branch of block 208), in block 212, the control console 12 may be set to operate in hard tissue ablation mode. For example, the processor 70 may be configured to set a flag in the console memory 78 that corresponds to the control console 12 being set to the hard tissue ablation mode.

In block 214, a practitioner-selection of one of the pulsing profiles associated with the currently set ablation mode may be received. As previously described, the console memory 78 may store several soft tissue pulsing profiles 106 associated with the soft tissue ablation mode and several hard tissue pulsing profiles 108 associated with the hard tissue ablation mode. The varying soft tissue pulsing profiles 106 associated with the soft tissue ablation mode may be ordered, such as according to user-selectable pulse control levels assigned to the soft tissue pulsing profiles 106, so that each incremental soft tissue pulsing profile 106 provides increased tissue selectivity and temperature control, and the varying hard tissue pulsing profiles 108 associated with the hard tissue ablation mode may be ordered, such as according to user-selectable pulse control levels assigned to the hard tissue pulsing profiles 108, such that that each incremental hard tissue pulsing profile 108 provides increased haptic feedback regarding the tissue being contacted and how much force the practitioner is applying with the ultrasonic instrument 14. The practitioner may thus select one of the pulsing profiles 104 associated with the currently set ablation mode of the control console 12 by selecting the pulse control level for the pulsing profile 104, such as via the display 54 or remote control 60, based on the ablation characteristics of the ultrasonic instrument 14 desired by the practitioner.

In block 216, responsive to receiving a practitioner-selection of one of the pulsing profiles 104 associated with the set ablation mode of the control console 12, the pulsing parameter settings associated with the selected pulsing profile 104 may be determined, such as by the processor 70 querying the console memory 78 based on the selected pulsing profile 104. Alternatively, the processor 70 may be configured to determine such pulsing parameter settings based on data read from the tip memory 130, which may store pulsing parameter settings for pulsing profiles 104 that are specific to the tip 16 and made selectable to the user upon the ultrasonic instrument 14 being connected to the control console 12.

In block 218, one or more system parameters may be set based on the retrieved pulsing parameter settings and/or the set ablation mode. For instance, the processor 70 may be configured to determine the minimum ultrasonic energy level for the ultrasonic instrument 14 based on the determined pulsing parameter settings, or more particularly the minimum energy factor indicated by the determined parameter settings.

As a further example, because fragmenting soft tissue typically does not require as much fragmentation power as fragmenting hard tissue such as bone, the processor 70 may be configured to reduce available power if the selected pulsing profile 104 corresponds to the soft tissue ablation mode, such as by setting a voltage limit for the AC drive signal to a lower value. Specifically, if the selected pulsing profile 104 corresponds to the soft tissue ablation mode, then the processor 70 may be configured to set the voltage limit for the AC drive signal a relative low value (e.g., 600 volts peak), and if the selected pulsing profile 104 corresponds to the hard tissue ablation mode, then the processor 70 may be configured to set voltage limit for the AC drive signal a relative high value (e.g., 1200 volts peak). Alternatively, each pulsing profile 104 may include a pulsing parameter specific to the pulsing profile 104 that indicates a voltage limit to the use for the pulsing profile 104.

As a further example, the mechanical current $i_M$ rate of change limit for the ultrasonic tool system 10 may regulate how quickly the control console 12 is enabled to induce a new target mechanical current $i_M$ from a previous mechanical current mechanical current $i_M$. The mechanical current $i_M$ rate of change limit utilized when operating in a continuous ultrasonic energy mode may not be fast enough for the pulsing mode, and accordingly, the processor 70 may be configured to set the mechanical current $i_M$ rate of change limit to a higher value responsive to the ultrasonic tool system 10 being set to the pulsing mode and a pulsing profile 104 being selected. The mechanical current $i_M$ rate of change limit set for a given pulsing profile 104 may depend on the pulse shape, pulsing frequency, and duty cycle of the pulsing profile 104. Accordingly, responsive to selection of a given pulsing profile 104, the processor 70 may be configured to set the mechanical current $i_M$ rate of change limit based on these parameters, such as by using a formula or storing data associating varying values of these parameters with varying mechanical current $i_M$ rate of change limits.

As another example, during operation of the ultrasonic instrument 14, the voltage of the power signal supplied by the power supply 72 may vary according to the voltage induced across the primary winding 80 so as to enable the amplifier 73 to generate the desired AC signal across the primary winding 80. To improve responsiveness of the system, the processor 70 may be configured to regulate the voltage of the signal supplied by the power supply 72 to the amplifier 73 based on voltages to be developed across the primary winding 80, as opposed for a PID controller for the power supply 72 waiting for a feedback signal indicating a changed voltage. The regulation of the voltage of the signal supplied by the power supply 72 may be subject to a positive rate of change limit, and the processor 70 may be configured to implement a higher rate of change limit (e.g., two times) for this signal when operating in the pulsing mode rather than the continuous energy mode.

In some examples, such as when the control console 12 is set to operate in the hard tissue ablation mode, rather than the maximum ultrasonic energy level for the ultrasonic instrument 14 being set equal to the level set by the practitioner, such as via the user power setting and foot pedal 56, the processor 70 may be configured to determine the maximum ultrasonic energy level for the ultrasonic instrument 14 such that it is greater than the practitioner set level and the average ultrasonic energy level induced in the ultrasonic instrument 14 according to the selected pulsing profile 104 is substantially equal to the practitioner set level. This technique may result in higher resection rates and higher minimum ultrasonic energy levels for each pulsing profile 104, which may help prevent excessive stalling when treating hard tissue such as bone.

In block 220, an AC drive signal may be generated and sourced to the ultrasonic instrument 14 based on the determined maximum and minimum ultrasonic energy levels and the other pulsing parameter settings of the selected pulsing profile 104 as described above. Specifically, the AC drive signal may set so as to induce ultrasonic energy in the ultrasonic instrument 14 having a plurality of ultrasonic energy pulses peaking at the maximum ultrasonic energy level and interspaced by ultrasonic energy at the minimum ultrasonic energy level according to the duty cycle and pulsing frequency of the selected pulsing profile 104.

As an example, responsive to selection of one of the soft tissue pulsing profiles 106 having a duty cycle of less than 100% (e.g., soft tissue pulsing profiles 106B to 106E and 106G to 106J), the control console 12 may be configured to generate the AC drive signal such that it induces ultrasonic energy in the ultrasonic instrument 14 that includes ultrasonic energy pulses peaking at the set maximum ultrasonic energy level and interspaced by significant periods at the minimum ultrasonic energy level (e.g., period greater than or equal to 2 milliseconds). The duration of each ultrasonic energy pulse relative to the duration of each cycle of the induced ultrasonic energy may correspond to the duty cycle associated with the selected soft tissue pulsing profile 106.

As another example, responsive to selection of a hard tissue pulsing profile 108 associated with a duty cycle of less than 100% (e.g., pulsing profiles 108B to 108E and 108G to 108J), the control console 12 may be configured to generate the AC drive signal such that it induces ultrasonic energy in the ultrasonic instrument 14 that includes ultrasonic energy pulses peaking at the maximum ultrasonic energy level and interspaced by a momentary period (e.g., less than 1 millisecond) of ultrasonic energy at the minimum ultrasonic energy level. The peak of each ultrasonic energy pulse may include a significant period at the maximum ultrasonic energy level (e.g., period greater than or equal to 2 milliseconds). The duration of each pair of adjoining edges of adjacent ultrasonic pulses may correspond to the duty cycle associated with the selected hard tissue pulsing profile 108.

As a further example, responsive to selection of a pulsing profile 104 with an 100% duty cycle (e.g., pulsing profiles 106A, 106F, 106K-106O, 108A, 108F, 108K-108O), the control console 12 may be configured to generate the AC drive signal such that it induces ultrasonic energy in the ultrasonic instrument 14 that includes ultrasonic energy pulses interspaced by a momentary period at the minimum ultrasonic energy level (e.g., less than one millisecond), each of the ultrasonic energy pulses momentarily peaking (e.g., less than one millisecond) at the maximum ultrasonic energy level. In other words, the ultrasonic energy induced in the ultrasonic instrument 14 may be considered to be constantly fluctuating.

In some implementations, while the pulsed ultrasonic energy is being induced in the ultrasonic instrument 14, the control console 12 may display a toggle element that enables the practitioner to quickly switch between inducing pulsed ultrasonic energy according to the currently selected pulsing profile 104 and inducing ultrasonic energy in the ultrasonic instrument 14 according to the continuous ultrasonic energy mode without, for example, having to stop the ultrasonic instrument 14 or traverse through each of the pulse control levels to disable pulsing. This feature may enable the practitioner to temporarily increase fragmentation power, such as if the practitioner encounters tissue difficult to ablate under the current settings, and then quickly return to the pulsed ultrasonic energy.

Figure 12:
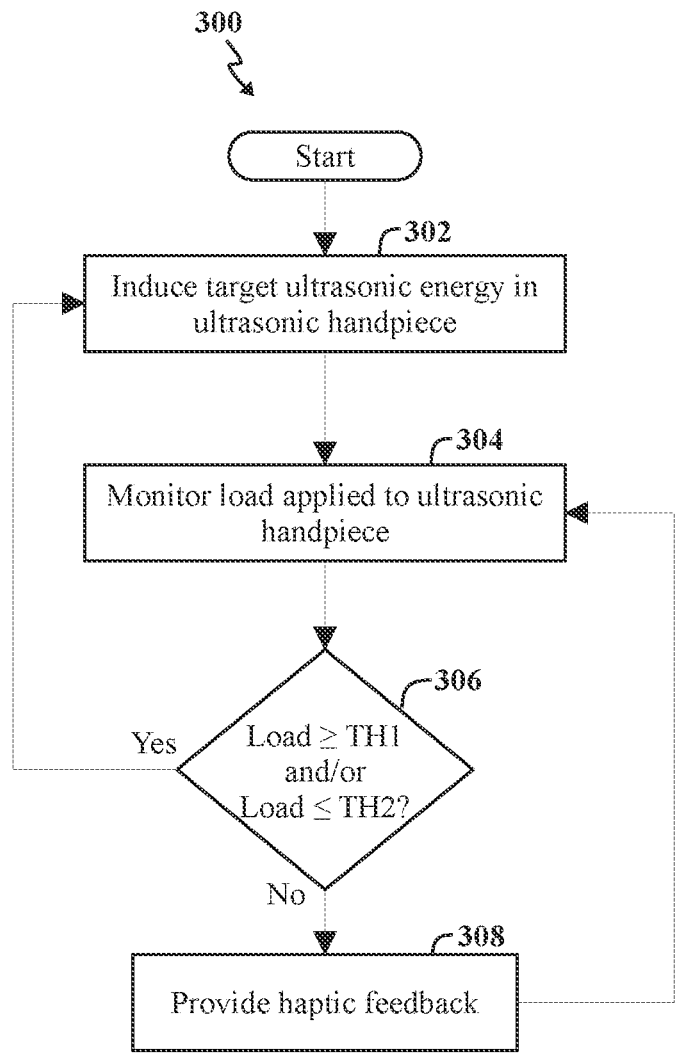
FIG. 12 illustrates a method for providing haptic feedback to a practitioner using pulsed ultrasonic energy induced in the ultrasonic instrument of FIG. 1.

FIG. 12 illustrates a method 300 for providing haptic feedback to a practitioner using ultrasonic energy pulses induced in the ultrasonic instrument 14 to indicate whether the practitioner is providing an optimal amount of the pressure to the ultrasonic instrument 14. When the practitioner applies the vibrating tip 16 of the ultrasonic instrument 14 to tissue such as bone, the pressure that the practitioner applies to the ultrasonic instrument 14 may affect the efficacy of the tip 16 in resecting the tissue. If the practitioner applies too little pressure, then the tip 16 may not efficiently resect the tissue, and if the practitioner applies too much pressure, then the tip 16 may potentially ablate tissue desired to remain intact and/or may stall. The control console 12, or more particularly the processor 70, may be configured to implement the method 300 to provide haptic feedback to the practitioner that indicates whether the pressure being applied by the practitioner is too little, too great, or on target.

In block 302, target ultrasonic energy may be induced in the ultrasonic instrument 14, such as according to an ultrasonic energy profile selected by the practitioner. For instance, if one of the pulsing profiles 104 is selected to be induced in the ultrasonic instrument 14, then the control console 12 may be configured to induce pulsed ultrasonic energy in the ultrasonic instrument 14 according to the selected pulsing profile 104, with the ultrasonic energy pulses occurring at a default pulsing frequency (e.g., 50 Hz), as the target ultrasonic energy. In some examples, each pulsing profile 104 may define a default pulsing frequency specific to the pulsing profile 104. Alternatively, the control console 12 may be configured to use a same default pulsing frequency for each pulsing profile 104. Conversely, if pulsing mode is disabled by the practitioner, then the control console 12 may be configured to induce substantially constant ultrasonic energy in the ultrasonic instrument 14, such as according to the constant energy profile 110, as the target ultrasonic energy.

In block 304, a load applied to the ultrasonic instrument 14, or more particular to the mechanical components of the ultrasonic instrument 14, may be monitored. The magnitude of the load applied to the mechanical components of the ultrasonic instrument 14 may be a function of the physical properties of the tissue being contacted by the tip 16 and the force applied to the ultrasonic instrument 14 by the practitioner in the direction of the contacted tissue. As the practitioner applies increased pressure on the ultrasonic instrument 14, the load applied to the mechanical components may increase, and as the practitioner applies decreased pressure on the ultrasonic instrument 14, the load applied to the mechanical components may decrease.

The control console 12 may be configured to monitor the load applied to the ultrasonic instrument 14 by calculating a load measurement value indicating an extent of the applied load. In some examples, the load measurement value may be the mechanical impedance $Z_M$ or the mechanical resistance $R_M$ exhibited by the ultrasonic instrument 14 during operation, which may increase and decrease with the load applied to the mechanical components of the ultrasonic instrument 14. More specifically, referring back to FIGS. 4A and 4B, when the ultrasonic instrument 14 is operating at resonance (e.g., the base frequency of the AC drive signal substantially equals the resonant frequency of the ultrasonic instrument 14), the inductive component $L_Y$ and the capacitive component $C_M$ of the mechanical impedance $Z_M$ of the ultrasonic instrument 14 may cancel each other out. Accordingly, when the ultrasonic instrument 14 is operating at resonance, the mechanical impedance $Z_M$ of the ultrasonic instrument 14 may equal the mechanical resistance $R_M$ of the ultrasonic instrument 14, which may be calculated using Ohm's law based on the mechanical current $i_M$ and the voltage $v_s$ of the AC drive signal.

The control console 12 may thus be configured to determine a load measurement value for the ultrasonic instrument 14 by calculating the mechanical resistance $R_M$ of the ultrasonic instrument 14 based on the mechanical current $i_M$ of the ultrasonic instrument 14, such as determined using Equation (1) above, and the voltage $v_s$ of the AC drive signal, such as measured using the voltage measuring circuit 90, when the ultrasonic instrument 14 is operating at resonance. By Ohm's law, the mechanical impedance $Z_M$ of the ultrasonic instrument 14 may equal the drive voltage $v_S$ divided by the mechanical current $i_M$. Because the mechanical impedance $Z_M$ may equal the mechanical resistance $R_M$ at resonance, the control console 12 may be configured to calculate the mechanical resistance $R_M$ of the ultrasonic instrument 14 by dividing the drive voltage $v_S$ by the mechanical current $i_M$ when the ultrasonic instrument 14 is operating at resonance.

As another example, the load measurement value may be the voltage $v_S$ of the AC drive signal, such as measured using the voltage measuring circuit 90. As previously described, the control console 12 may be configured to adjust the voltage $v_S$ of the AC drive signal so as to induce a target mechanical current $i_M$ in the ultrasonic instrument 14. The mechanical current $i_M$ of the ultrasonic instrument 14 may vary as a function of the mechanical impedance $Z_M$ or the mechanical resistance $R_M$ of the ultrasonic instrument 14 during operation. The voltage $v_s$ of the AC drive signal may thus vary as a function of the mechanical impedance $Z_M$ or the mechanical resistance $R_M$ exhibited by the ultrasonic instrument 14 during operation, and correspondingly may increase and decrease with the load applied to the mechanical components of the ultrasonic instrument 14.

Referring again to FIG. 12, in block 306, a determination may be made of whether an optimal load is being applied to the ultrasonic instrument 14, or more particularly to the mechanical components of the ultrasonic instrument 14. To this end, the control console 12 may be configured to determine whether the monitored applied load is within a target range defined by a predefined lower load threshold level (TH1) and a predefined upper load threshold level (TH2). More particularly, the control console 12 may be configured to determine whether the monitored applied load is greater than or equal to the lower threshold level (TH1) and/or less than or equal to the upper threshold level (TH2). As previously described, the applied load may be a function of the amount of pressure being applied by the practitioner to the ultrasonic instrument 14. The monitored applied load being less than the lower threshold level TH1 may indicate that the practitioner is providing less than optimal pressure for resecting tissue, and the monitored applied load being greater than the upper threshold level TH2 may indicate that the practitioner is providing greater than optimal pressure for resecting tissue. If the monitored applied load is within the target range, then the control console 12 may be configured to determine that an optimal load is being applied to the ultrasonic instrument 14 ("Yes" branch of block 306).

The control console 12 may be configured to determine if the monitored applied load is within the target range by being configured to determine if the load measurement value defining the monitored applied load is within the target range. The lower threshold level TH1 and upper threshold TH2 may thus be defined in the units of the load measurement value. For instance, if the load measurement value corresponds to the voltage $v_S$ of the AC drive signal, then the lower threshold level TH1 and upper threshold level TH2 may be defined by voltage thresholds in volts. Alternatively, if the load measurement value corresponds to the mechanical impedance $Z_M$ or the mechanical resistance $R_M$ of the ultrasonic instrument 14, then the lower threshold level TH1 and upper threshold level TH2 may be respectively defined by mechanical impedance thresholds or mechanical resistance thresholds in ohms. For example and without limitation, when the load measurement value corresponds to the mechanical resistance $R_M$ of the ultrasonic instrument 14, the lower threshold level TH1 may be 2000 ohms, and the upper threshold level TH2 may be 5000 ohms.

Responsive to determining that the monitored applied is optimal ("Yes" branch of block 306), the method 300 may return to block 302 to continue inducing the target ultrasonic energy in the ultrasonic instrument 14, monitoring the applied load, and determining whether the monitored applied load is optimal. Responsive to determining that the monitored applied load is not optimal (e.g., the monitored applied load is less than the lower threshold level TH1 or greater than the upper threshold level TH2) ("No" branch of block 306), in block 308, haptic feedback may be provided to the practitioner.

For instance, responsive to determining that the monitored applied load is less than the lower threshold level TH1, the control console 12 may be configured to induce pulsed ultrasonic energy in the ultrasonic instrument 14 with a relatively high or low pulsing frequency, and responsive to do determining that the monitored applied load is greater than the upper threshold level TH2, the control console 12 may be configured to induce pulsed ultrasonic energy in the ultrasonic instrument 14 with the other of the relatively high or low pulsing frequency. For example and without limitation, responsive to determining that the monitored applied load is less than the lower threshold level TH1, the control console 12 may be configured to induce pulsed ultrasonic energy in the ultrasonic instrument 14 with a relatively high pulsing frequency of 60 Hz, and responsive to determining that the monitored applied load is greater than the upper threshold level TH2, the control console 12 may be configured to induce pulsed ultrasonic energy in the ultrasonic instrument 14 with a relatively low pulsing frequency of 10 Hz. In this example, when the practitioner is providing too little pressure (e.g., the monitored applied load is less than the lower threshold level TH1), the practitioner may feel relatively fast pulsing in the ultrasonic instrument 14, and when the practitioner is providing too much pressure (e.g., the monitored applied load is greater than the upper threshold level TH2), the practitioner may feel relatively slow pulsing in the ultrasonic instrument 14.

If the target ultrasonic energy induced in block 302 is pulsed ultrasonic energy corresponding to a pulsing profile 104, then in block 308, responsive to determining that the monitored applied load is less than the lower threshold level TH1, the control console 12 may be configured to induce pulsed ultrasonic energy in the ultrasonic instrument 14 according to the selected pulsing profile 104 but with a pulsing frequency greater than (or less than) the default pulsing frequency associated with the selected pulsing profile 104. In other words, the control console 12 may be configured to induce the relatively high (or relatively low) pulsing frequency. Similarly, responsive to determining that the monitored applied load is greater than the upper threshold level TH2, then control console 12 may be configured to induce pulsed ultrasonic energy in the ultrasonic instrument 14 according to the selected pulsing profile 104 but with a pulsing frequency less than (or greater than) the default pulsing frequency associated with the selected pulsing profile 104. In other words, the control console 12 may be configured to induce the relatively low (or relatively high) pulsing frequency.

In alternative implementations, if the target ultrasonic energy induced in block 302 is pulsed ultrasonic energy corresponding to a pulsing profile 104, responsive to determining that the monitored applied load is less than the lower threshold level TH1 or greater than the upper threshold level TH2, the control console 12 may be configured to transition to inducing ultrasonic energy maintained at a substantially constant value, such as the maximum ultrasonic energy level determined of the ultrasonic instrument 14 (e.g., constant energy profile 110, FIG. 5A).

Conversely, if the target ultrasonic energy is substantially constant ultrasonic energy, then in block 308, responsive to determining that the monitored applied load is less than the lower threshold level TH1 or greater than the upper threshold level TH2, the control console 12 may be configured to transition to inducing pulsed ultrasonic energy in the ultrasonic instrument 14, such as according to one of the pulsing profiles 104, with a pulsing frequency equal to the default pulsing frequency associated with the pulsing profile 104, or equal to a relatively high or low pulsing frequency as described above.

More specifically, assuming the target ultrasonic energy is substantially constant ultrasonic energy, responsive to determining that the monitored applied load is less than the lower threshold level TH1 or greater than the upper threshold level TH2 in block 306, in block 308, the control console 12 may be configured to determine whether the currently connected tip 16 is configured for ablating hard or soft tissue, such as based on a user-provided setting or data read from the tip memory 130. The control console 12 may then be configured to induce one of the soft tissue pulsing profiles 106 responsive to determining that the tip 16 is configured for ablating soft tissue, and to induce one of the pulsing profiles 108 responsive to determining that the tip 16 is configured for cutting bone.

The pulsing frequency of the induced pulsed ultrasonic energy may be set to a default pulsing frequency associated with the pulsing profile 104 (e.g., 50 Hz), or may be set based on whether the monitored applied load was determined to be less than the lower threshold level TH1 or greater than the upper threshold level TH2 as described above. For instance, responsive to determining that the monitored applied load is less than the lower threshold level TH1, the control console 12 may be configured to induce a relatively high pulsing frequency (e.g., 60 Hz), and responsive to determining that the monitored applied load is greater than the upper threshold level TH2, the control console 12 may be configured to induce the relatively low pulsing frequency (e.g., 10 Hz).

Following block 308, the method 300 may return to block 304 to continue monitoring and comparing the applied load against the target range to determine if the applied load is optimal. Responsive to determining that the monitored applied load becomes optimal (e.g., becomes greater than or equal to the lower threshold level TH1 and less than or equal to the upper threshold level TH2) ("Yes" branch of block 306), the method 300 may return to block 302 in which the target ultrasonic energy may again be induced in the ultrasonic instrument 14 to indicate to the practitioner that an optimal amount of pressure is being applied. In other words, the control console 12 may induce ultrasonic energy in the ultrasonic instrument 14 that corresponds to the practitioner-selected ultrasonic energy profile and related settings.

For instance, if the practitioner has selected one of the pulsing profiles 104 to be induced in the ultrasonic instrument 14 at the target ultrasonic energy, then the control console 12 may be configured to induce the selected pulsing profile 104 with a pulsing frequency equal to the default pulsing frequency associated with the pulsing profile 104. Alternatively, if the practitioner has selected a constant energy profile 110 to be induced in the ultrasonic instrument 14, then the control console 12 may be configured to induce constant ultrasonic energy in the ultrasonic instrument 14. In either case, the practitioner may be able to feel the resumption of the target ultrasonic energy in the ultrasonic instrument 14, and associate such resumption with an indication that the practitioner is providing optimal pressure to the ultrasonic instrument 14.

In some examples, each pulsing profile 104 may be associated with a range of pulsing frequencies between the relatively high and relative low pulsing frequencies to induce depending on the magnitude of the monitored applied load within the target range. In other words, as the monitored applied load varies within the target range, the control console 12 may be configured to determine and induce a varying pulsing frequency in the ultrasonic instrument 14 as a function of the monitored applied load.

Figure 13:
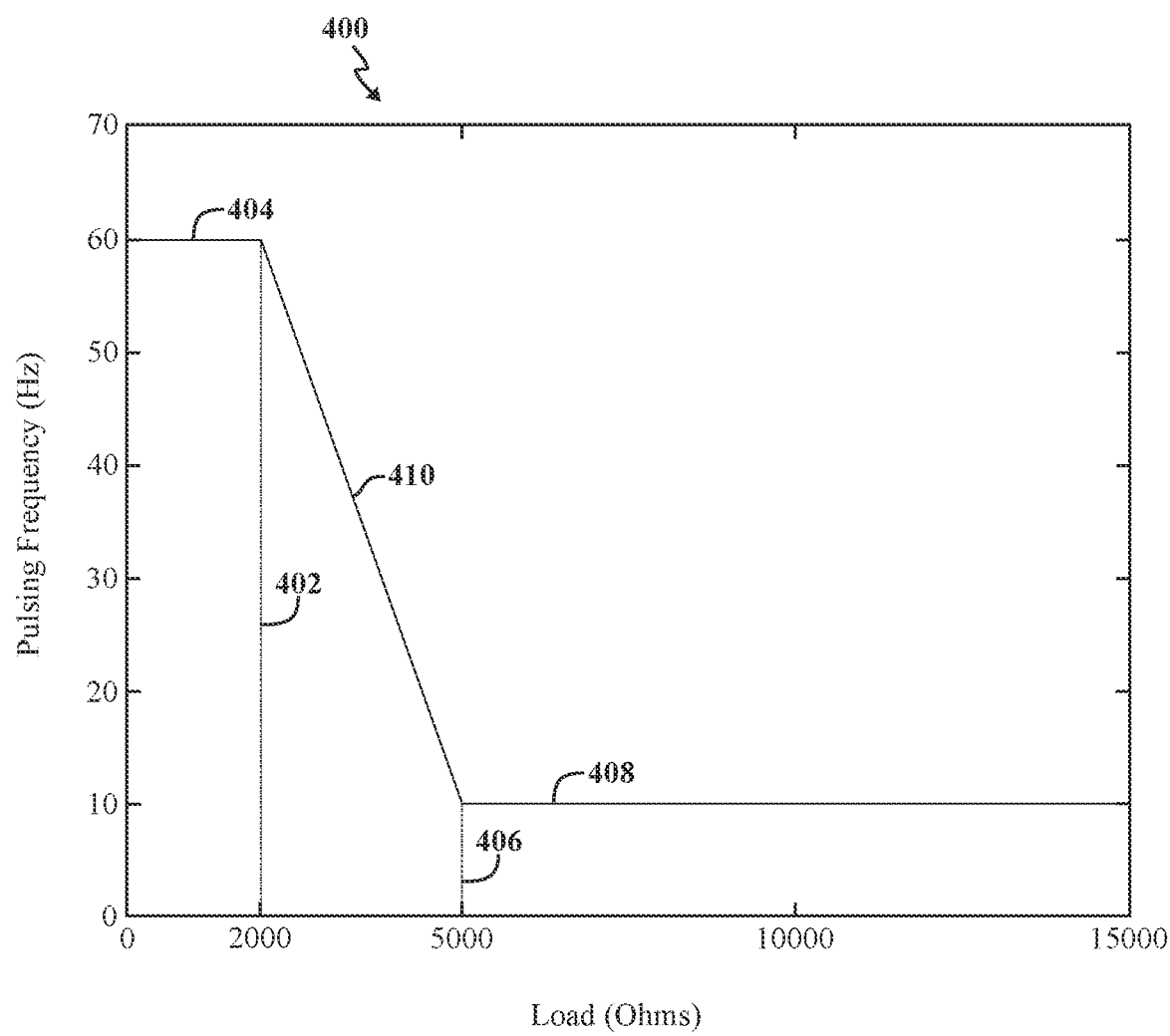
FIG. 13 illustrates providing haptic feedback to a practitioner by varying a pulsing frequency of pulsed ultrasonic energy induced in the ultrasonic instrument of FIG. 1 as a function of applied load.

For instance, referring to FIG. 13, the console memory 78 may store data defining a graph 400 that associates various load measurement values between the lower threshold level TH1 and upper threshold level TH2 each with a unique pulsing frequency to induce in the ultrasonic instrument 14 when the load measurement value occurs. More particularly, the data may indicate a lower threshold level 402, a relatively high pulsing frequency 404 associated with the lower threshold level 402, an upper threshold level 406, a relatively low pulsing frequency 408 associated with the upper threshold level 406, and a transition function 410. In the example illustrated in FIG. 13, the load measurement values are provided in ohms. In alternative examples, the load measurement values may be provided in other units, such as volts as described above.

The transition function 410 may extend from the relatively high pulsing frequency 404 associated with the lower threshold level 402 to the relatively low pulsing frequency 408 associated with the upper threshold level 406 over the load measurement values between lower threshold level 402 and the upper threshold level 406. In other words, the transition function 410 may associate each of the load measurement values greater than or equal to the lower threshold level 402 and less than or equal to the upper threshold level 406 with a unique pulsing frequency. The transition function 410 may be a decreasing function, such as linear function with a negative slope, so that the associated pulsing frequencies decrease as the load measurement values increase.

The control console 12 may be configured to induce pulsed ultrasonic energy in the ultrasonic instrument 14 with a varying pulsing frequency determined based on the above data. In particular, assuming the practitioner has selected one of the pulsing profiles 104 to be induced in the ultrasonic instrument 14, responsive to actuation of the ultrasonic instrument 14, the control console 12 may be configured to induce pulsed ultrasonic energy in the ultrasonic instrument 14 according to the selected pulsing profile 104 and with a pulsing frequency equal to a default pulsing frequency (e.g., 50 Hz) associated with the selected pulsing profile 104. Thereafter, the control console 12 may be configured to repeat cycles of monitoring the load applied to the mechanical components of the ultrasonic instrument 14, determining an updated pulsing frequency to induce in the ultrasonic instrument 14 based the monitored applied load and the graph 400, and generating pulsed ultrasonic energy in the ultrasonic instrument 14 according to the updated pulsing frequency.

For instance, assuming the monitored applied load is defined by the mechanical resistance $R_M$ of the ultrasonic instrument 14, the control console 12 may be configured to determine whether the calculated mechanical resistance $R_M$ is less than or equal to the lower threshold level 402, greater than or equal to the upper threshold level 406, or between the lower threshold level 402 and upper threshold level 406. Responsive to determining that the mechanical resistance $R_M$ is less than or equal to the lower threshold level 402, the control console 12 may be configured to set the pulsing frequency of the pulsed ultrasonic energy induced in the ultrasonic instrument 14 to the relatively high pulsing frequency 404, and responsive to determining that the mechanical resistance $R_M$ is greater than or equal to the upper threshold level 406, the control console 12 may be configured to set the pulsing frequency of the pulsed ultrasonic energy induced in the ultrasonic instrument 14 to the relatively low pulsing frequency 408. Responsive to determining that the mechanical resistance $R_M$ is between the lower threshold level 402 and the upper threshold level 406, the control console 12 may be configured to set the pulsing frequency of the pulsed ultrasonic energy induced in the ultrasonic instrument 14 to the pulsing frequency indicated by the transition function 410 as a function of the mechanical resistance $R_M$.

In this way, as the pressure applied by the practitioner to the ultrasonic instrument 14 deviates from a specified optimal pressure level, which may be indicated by the load measurement value varying from a predefined load measurement value (e.g., 3000 Ohms) between the lower threshold level 402 and the upper threshold level 406, the pulsing frequency of the pulsed ultrasonic energy induced in the ultrasonic instrument 14 may vary immediately and to an extent to which the applied pressure differs from the specified optimal pressure level. As a result, the practitioner may receive haptic feedback indicating the discrepancy from the specified optimal pressure level immediately, and may determine an amount of pressure to add to or remove from the ultrasonic instrument 14 to provide the specified optimal pressure level based on the level of haptic feedback. For example and without limitation, the predefined load measurement value between the lower threshold level 402 and the upper threshold level 406 corresponding to the specified optimal pressure level may be set to the average of the lower threshold level 402 and upper threshold level 406, or may be set to the load measurement value corresponding to the average or median of the range of pulsing frequencies defined by the transition function 410.

In some implementations, rather than or in addition to defining target ultrasonic energy to be induced when the applied load is within the target range, the practitioner may be able to define the target ultrasonic energy to be induced when the applied load is outside of the target range. In this way, responsive to determining that the applied load is outside the target range, indicating that the practitioner may not be applying optimal pressure to the ultrasonic instrument 14, the control console 12 may be configured to induce the outside target ultrasonic energy defined by the practitioner in the ultrasonic instrument 14. Conversely, if the monitored applied load is within the target range, then the practitioner may be applying optimal pressure to the ultrasonic instrument 14, and the control console 12 may be configured to provide haptic feedback indicating such condition, such as by inducing the inside target ultrasonic energy in the ultrasonic instrument 14 that has likewise been defined by the practitioner.

For instance, if the outside target ultrasonic energy induced in the ultrasonic instrument 14 is according to the constant energy profile 110 discussed above, then the control console 12 may be configured to induce pulsed ultrasonic energy in the ultrasonic instrument 14, such as according to one of the pulsing profiles 104 that has been selected by the practitioner, as the inside target ultrasonic energy. In this way, responsive to the monitored applied load corresponding to the target range, the ultrasonic instrument 14 may begin exhibiting vibrations corresponding to the practitioner-selected pulsing profile 104. If the outside target ultrasonic energy induced in the ultrasonic instrument 14 is according to one of the pulsing profiles 104, then the control console 12 may be configured to adjust the pulsing frequency of the pulsed ultrasonic energy, such as by increasing the pulsing frequency or decreasing the pulsing frequency relative to the pulsing frequency of the outside target ultrasonic energy induced in the ultrasonic instrument 14, when the applied load is within the target range.

In some instances, the pulsing frequency of the pulsed ultrasonic energy induced when the monitored applied load is within the target range may be also varied based on a distance between a predefined load value between the upper threshold level TH1 and the lower threshold value TH2 and the load measurement value. For instance, responsive to the load measurement value moving nearer the lower threshold level TH1 or upper threshold level TH2 from the predefined load value, the control console 12 may be configured to induce a higher (or lower) pulsing frequency. Similarly, responsive to the load measurement value moving the lower threshold level TH1 or the upper threshold level TH2 towards the predefined load value, the control console 12 may be configured to induce a lower (or higher) pulsing frequency. The control console 12 may be configured to adjust the pulsing frequency in this manner according to a transition function that defines a specific pulsing frequency for each load measurement value between the lower threshold level TH1 and upper threshold level TH2, such as a bell curve function that takes as inputs the values between the lower threshold level TH1 and upper threshold level TH2 and peaks at the predefined load value. For example and without limitation, the predefined load value may be set to the average of the lower threshold level TH1 and upper threshold level TH2, or to the load measurement value corresponding to the average or median of the pulsing frequencies defined by the transition function.

Figure 14:
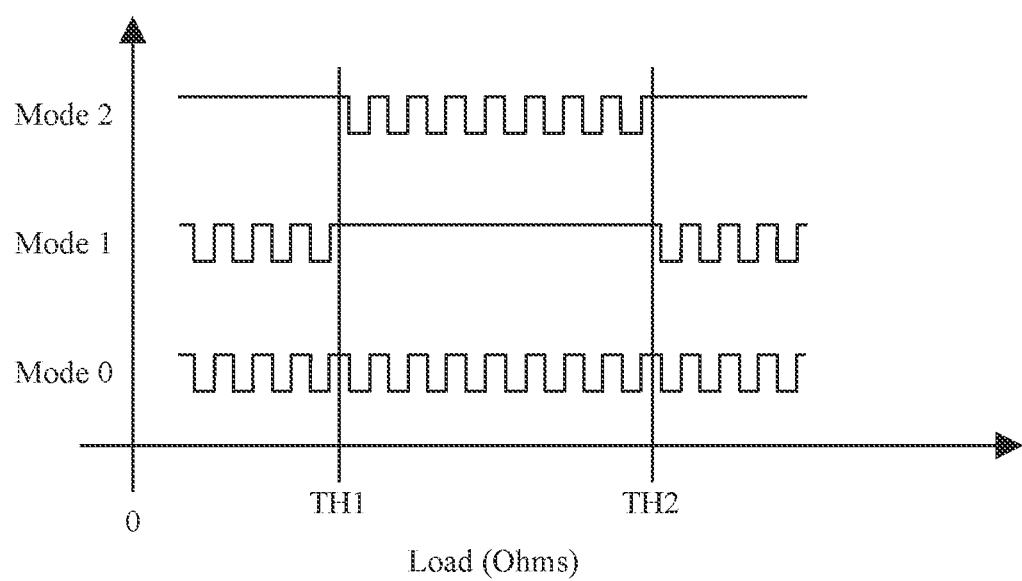
FIG. 14 illustrates providing haptic feedback to a practitioner by enabling and disabling pulsed ultrasonic energy in the ultrasonic instrument of FIG. 1 as a function of applied load.

Referring to FIG. 14, in some implementations, the control console 12 may be configured to operate in varying pulsing activation modes selectable by the practitioner that automatically disable and enable pulsing based on the monitored load relative to the lower threshold level TH1 and the upper threshold level TH2. For instance, in pulsing activation mode 1, the control console 12 may be configured to induce pulsed ultrasonic energy, such as according to one of the pulsing profiles 104 selected by the practitioner, when the monitored load is outside the target range, and to induce substantially constant ultrasonic energy when the monitored load is inside the target range. Conversely, in pulsing activation mode 2, the control console 12 may be configured to induce pulsed ultrasonic energy, such as according to one of the pulsing profiles 104 selected by the practitioner, when the monitored load is inside the target range, and to induce substantially constant ultrasonic energy when the monitored load is outside the target range. Pulsing activation mode 0 may correspond to automatic pulsing activation being disabled.

The pulsing parameters described above, namely the lower threshold TH1 and the upper threshold level TH2, may be predetermined and stored in the console memory 78. In some instances, each pulsing profile 104 may define a lower threshold level TH1 and upper threshold level TH2 specific to the pulsing profile 104. Alternatively, the control console 12 may be configured to use the same lower threshold level TH1 and upper threshold level TH2 for each pulsing profile 104. In further implementations, rather than or in addition to a pulsing activation mode being selectable by the user, each pulsing profile 104 may define a specific pulsing activation mode (e.g., mode 1 or 2) available for the pulsing profile 104, and the practitioner may select between the defined pulsing activation mode or disabling pulsing activation mode when using that pulsing profile 104.

As previously described throughout this disclosure, different tips 16 may be releasably coupled to the handpiece 18 that have different operative characteristics. Because each tip 16 is typically distributed together with an irrigation sleeve 36 specific to the tip 16, to provide further optimization, optimized settings for the pulsing parameters described herein that are specific to each tip 16 removably coupleable to the handpiece 18 may be determined in advanced and stored on the tip memory 130 of the irrigation sleeve 36 distributed to the tip 16. Thereafter, when the ultrasonic instrument 14 including the tip 16 is coupled to the control console 12, the control console 12 may be configured to read the data from the tip memory 130 that indicates the set pulsing parameters specific to the tip 16, and operate the ultrasonic instrument 14 based on the read data as described above.

For instance, the data stored on the tip memory 130 may indicate one or more pulsing profiles 104 specific to the tip 16 that may be selectable by the practitioner. To this end, the data stored on the tip 16 may indicate one or more pulsing puling parameters specific to the tip 16 including one or more of: one or more minimum energy factors specific to the tip 16, each of which may be associated with a different pulsing profile 104 specific to the tip 16; one or more duty cycles specific to the tip 16, each of which may be associated with a different pulsing profile 104 specific to the tip 16; one or more pulsing frequencies specific to the tip 16, each of which may be associated with a different pulsing profile 104 specific to the tip 16; one or more pulse shapes specific to the tip 16, each of which may be associated with a different pulsing profile 104 specific to the tip 16; and one or more voltage limits specific to the tip 16, each of which may be associated with a different pulsing profile 104 specific to the tip 16.

The data stored on the tip memory 130 may also indicate one or more other pulsing parameters specific to the tip 16, such as whether the tip 16 is pulsing enabled, whether the tip 16 is a hard tissue ablation tip or a soft tissue ablation tip, a lower predefined load level TH1 for the tip 16, an upper predefined load level TH2 for tip 16, and a pulse activation mode for the tip 16. Responsive to the ultrasonic instrument 14 including the tip 16 is coupled to the control console 12, the control console 12 may be configured to read this data from the tip memory 130 and utilize the indicated pulsing parameters as described above.

As a further example, the console memory 78 may also be configured to store the above pulsing parameters by tip type. In this case, responsive to the ultrasonic instrument 14 being coupled to the control console 12, the control console 12 may be configured to determine a type of the tip 16, such as from data read from the tip memory 130 indicating the tip type. The control console 12 may then be configured to query the console memory 78 for the pulsing parameters specific to the tip type, and utilize such pulsing parameters as described above.

Several example implementations have been discussed in the foregoing description. However, the examples discussed herein are not intended to be exhaustive or limit the invention to any particular form. The terminology that has been used herein is intended to be in the nature of words of description rather than of limitation. Many modifications and variations are possible in light of the above teachings and the invention may be practiced otherwise than as specifically described.

Examples of the disclosure can be described with reference to the following numbered clauses, with specific features laid out in dependent clauses:

I. A system for controlling vibrations of an ultrasonic handpiece, the system comprising:
an ultrasonic handpiece comprising a tip and a driver coupled to the tip, the driver configured to vibrate the tip responsive to receiving an AC drive signal; and
a control console for generating the AC drive signal supplied to the driver of the ultrasonic handpiece, the control console being configured to:
determine a maximum ultrasonic energy level for the ultrasonic handpiece;
receive a user-selection of a first pulsing ultrasonic energy profile and a second pulsing ultrasonic energy profile, the first pulsing ultrasonic energy profile being configured for ablating more tissue types than the second pulsing ultrasonic energy profile;
responsive to receiving the user-selection of the first pulsing ultrasonic energy profile, set a minimum ultrasonic energy level for the ultrasonic handpiece to a first value;
responsive to receiving the user-selection of the second pulsing ultrasonic energy profile, set the minimum pulsing ultrasonic energy profile, set the minimum ultrasonic energy level for the ultrasonic handpiece to a second value less than the first value; and
generate an AC drive signal sourced to the ultrasonic handpiece that induces ultrasonic energy in the ultrasonic handpiece that comprises a plurality of ultrasonic energy pulses interspaced by significant periods at the set minimum ultrasonic energy level, each of the ultrasonic energy pulses peaking at the maximum ultrasonic energy level.

II. The system of claim I, wherein each of the significant periods at the set minimum ultrasonic energy level is greater than or equal to two milliseconds.

III. The system of claims I or II, wherein each of the ultrasonic energy pulses is defined by a hann function.

IV. The system of any one of claims I-III, wherein the control console is configured to generate the AC drive signal that induces ultrasonic energy in the ultrasonic handpiece that comprises a plurality of ultrasonic pulses interspaced by significant periods at the set minimum ultrasonic energy level, each of the ultrasonic pulses peaking at the maximum ultrasonic energy level, by being configured to:
generate a base AC signal with an ultrasonic frequency and a substantially constant amplitude;
generate a periodic modulation signal including hann waves separated by significant periods at a third value corresponding to the set minimum ultrasonic energy level, each of the hann waves having a minimum at the third value; and
modulate the base AC signal with the modulation signal.

V. The system of any one of claims I-IV, wherein the control console is configured to determine the maximum ultrasonic energy level based on a user-selected ultrasonic energy limit for the ultrasonic handpiece received by the control console.

VI. The system of claim V, wherein the control console is configured to determine the maximum ultrasonic energy level based on a user-selected ultrasonic energy limit for the ultrasonic handpiece received by the control console by being configured to determine the maximum ultrasonic energy level such that the maximum ultrasonic energy level is greater than the user-selected ultrasonic energy limit and an average of the ultrasonic energy induced in the ultrasonic handpiece by the AC drive signal substantially equals the user-selected ultrasonic energy limit.

VII. The system of any one of claims I-VI, wherein the control console is configured to determine the first and second values based on the maximum ultrasonic energy level.

VIII. The system of claim VII, wherein the first and second pulsing ultrasonic energy profiles are associated with first and second percentages within the control console respectively, and the control console is configured to determine the first and second values based on the maximum ultrasonic energy level by being configured to apply the first and second percentages to the maximum ultrasonic energy level respectively.

IX. The system of any one of claims I-VIII, wherein the first and second pulsing ultrasonic energy profiles are associated with first and second duty cycles respectively within the control console, the first duty cycle being greater than the second duty cycle, and the control console is configured to:
responsive to receiving the user-selection of the first pulsing ultrasonic energy profile, generate the AC drive signal such that a duration of each of the ultrasonic energy pulses induced in the ultrasonic handpiece relative to a duration of each of the significant periods at the set minimum ultrasonic energy level induced in the ultrasonic handpiece corresponds to the first duty cycle; and
responsive to receiving the user-selection of the second pulsing ultrasonic energy profile, generate the AC drive signal such that the duration of each of the ultrasonic energy pulses induced in the ultrasonic handpiece relative to the duration of each of the significant periods at the set minimum ultrasonic energy level induced in the ultrasonic handpiece corresponds to the second duty cycle.

X. The system of any one of claims I-IX, wherein the control console is configured to:
generate the AC drive signal such that the ultrasonic energy pulses induced in the ultrasonic handpiece occur at a first frequency;
determine whether a load applied to the ultrasonic handpiece is greater than a predefined level; and
responsive to determining that the applied load is greater than the predefined level, generate the AC drive signal such that the ultrasonic energy pulses induced in the ultrasonic handpiece occur at a second frequency that differs from the first frequency.

XI. The system of any one of claims I-X, wherein the control console is configured to:
generate a second AC drive signal sourced to the ultrasonic handpiece that induces ultrasonic energy in the ultrasonic handpiece that is maintained at the maximum ultrasonic energy level for the ultrasonic handpiece;
determine whether a load applied to the ultrasonic handpiece is greater than a predefined level; and
responsive to determining that the applied load is greater than the predefined level, generate the AC drive signal that induces the ultrasonic energy in the ultrasonic handpiece that comprises the plurality of ultrasonic energy pulses interspaced by significant periods at the set minimum ultrasonic energy level, each of the ultrasonic energy pulses peaking at the maximum ultrasonic energy level.

XII. The system of claims X or XI, wherein the control console is configured to determine whether a load applied to the ultrasonic handpiece is greater than a predefined level by being configured to:
calculate a mechanical resistance of the ultrasonic handpiece;
compare the mechanical resistance of the ultrasonic handpiece to a predefined resistance threshold; and
determine that the load applied to the ultrasonic handpiece is greater than the predefined level responsive to the mechanical resistance of the ultrasonic handpiece being greater than the predefined resistance threshold.

XIII. The system of claims X or XI, wherein the control console is configured to determine whether a load applied to the ultrasonic handpiece is greater than a predefined level by being configured to:
measure a voltage of the AC drive signal sourced to the ultrasonic handpiece;
compare the voltage to a predefined voltage threshold; and
determine that the load applied to the ultrasonic handpiece is greater than the predefined level responsive to the measured voltage being greater than the predefined voltage threshold.

XIV. The system of any one of claims I-XIII, wherein the control console is configured to:
determine whether the ultrasonic handpiece is set to operate in a soft tissue ablation mode or a bone cutting mode;
responsive to determining that the ultrasonic handpiece is set to operate in the soft tissue ablation mode, generate the AC drive signal that induces ultrasonic energy in the ultrasonic handpiece that comprises the ultrasonic energy pulses interspaced by significant periods at the set minimum ultrasonic energy level, each of the ultrasonic energy pulses peaking at the maximum ultrasonic energy level; and
responsive to determining that the ultrasonic handpiece is set to operate in the bone cutting mode, generate a second AC drive signal sourced to the ultrasonic handpiece that induces ultrasonic energy in the ultrasonic handpiece that comprises a plurality of ultrasonic energy pulses interspaced by ultrasonic energy at the set minimum ultrasonic energy level, each of the ultrasonic energy pulses peaking and including a significant period at the maximum ultrasonic energy level.

XV. The system of claim XIV, wherein the significant periods at the maximum ultrasonic energy level of the ultrasonic energy pulses induced in the ultrasonic handpiece by the second AC drive signal are interspaced by transitional ultrasonic energy periods defined by an inverse hann wave having a minimum corresponding to the set minimum ultrasonic energy level.

XVI. A system for controlling vibrations of an ultrasonic handpiece, the system comprising:
an ultrasonic handpiece comprising a tip and a driver coupled to the tip, the driver configured to vibrate the tip responsive to receiving an AC drive signal; and
a control console for generating the AC drive signal supplied to the driver of the ultrasonic handpiece, the control console being configured to:
receive a user-selected ultrasonic energy limit for the ultrasonic handpiece;
determine a maximum ultrasonic energy level for the ultrasonic handpiece based on the user-selected ultrasonic energy limit;
determine a minimum ultrasonic energy level for the ultrasonic handpiece based on the maximum ultrasonic energy level; and generate an AC drive signal sourced to the ultrasonic handpiece that induces ultrasonic energy in the ultrasonic handpiece that comprises a plurality of ultrasonic energy pulses interspaced by significant periods of constant ultrasonic energy at the minimum ultrasonic energy level, each of the ultrasonic energy pulses peaking at the maximum ultrasonic energy level.

XVII. A system for controlling vibrations of an ultrasonic handpiece, the system comprising:
an ultrasonic handpiece comprising a tip and a driver coupled to the tip, the driver configured to vibrate the tip responsive to receiving an AC drive signal; and
a control console for generating the AC drive signal supplied to the driver of the ultrasonic handpiece, the control console being configured to:
  determine maximum and minimum ultrasonic energy levels for the ultrasonic handpiece;
  generate a base AC signal having an ultrasonic frequency and substantially constant amplitude;
  generate a periodic modulation signal including hann waves separated by significant periods at a constant value corresponding to the maximum or minimum ultrasonic energy level;
  modulate the base AC signal with the modulation signal; and
  generate the AC drive signal based on the modulated base AC signal.

XVIII. A system for controlling vibrations of an ultrasonic handpiece, the system comprising:
an ultrasonic handpiece comprising a tip and a driver coupled to the tip, the driver configured to vibrate the tip responsive to receiving an AC drive signal; and
a control console for generating the AC drive signal supplied to the driver of the ultrasonic handpiece, the control console being configured to:
  determine a maximum ultrasonic energy level for the ultrasonic handpiece;
  receive a user-selection of a first pulsing ultrasonic energy profile and a second pulsing ultrasonic energy profile;
  responsive to receiving the user-selection of the first pulsing ultrasonic energy profile, set a minimum ultrasonic energy level for the ultrasonic handpiece to a first value;
  responsive to receiving the user-selection of the second pulsing ultrasonic energy profile, set the minimum ultrasonic energy level for the ultrasonic handpiece to a second value less than the first value; and
  generate an AC drive signal sourced to the ultrasonic handpiece that induces ultrasonic energy in the ultrasonic handpiece that comprises a plurality of ultrasonic energy pulses interspaced by ultrasonic energy at the set minimum ultrasonic energy level, each of the ultrasonic energy pulses peaking and including a significant period at the maximum ultrasonic energy level.

XIX. A method for controlling vibrations of an ultrasonic handpiece, the method comprising:
determining a maximum ultrasonic energy level for the ultrasonic handpiece;
receiving a user-selection of a first pulsing ultrasonic energy profile and a second pulsing ultrasonic energy profile, the first pulsing ultrasonic energy profile being configured for ablating more tissue types than the second pulsing ultrasonic energy profile;
responsive to receiving the user-selection of the first pulsing ultrasonic energy profile, setting a minimum ultrasonic energy level for the ultrasonic handpiece to a first value;
responsive to receiving the user-selection of the second pulsing ultrasonic energy profile, setting the minimum ultrasonic energy level for the ultrasonic handpiece to a second value less than the first value; and
generating an AC drive signal sourced to the ultrasonic handpiece that induces ultrasonic energy in the ultrasonic handpiece that comprises a plurality of ultrasonic energy pulses interspaced by significant periods at the set minimum ultrasonic energy level, each of the ultrasonic energy pulses peaking at the maximum ultrasonic energy level.

XX. The method of claim XIX, wherein each of the significant periods at the set minimum ultrasonic energy level is greater than or equal to two milliseconds.

XXI. The method of claims XIX or XX, wherein each of the ultrasonic energy pulses is defined by a hann function.

XXII. The method of any one of claims XIX-XXI, wherein generating the AC drive signal that induces ultrasonic energy in the ultrasonic handpiece that comprises a plurality of ultrasonic energy pulses interspaced by significant periods at the set minimum ultrasonic energy level, each of the ultrasonic energy pulses peaking at the maximum ultrasonic energy level, comprises:
generating a base AC signal with an ultrasonic frequency and a substantially constant amplitude;
generating a periodic modulation signal including hann waves separated by significant periods at a third value corresponding to the set minimum ultrasonic energy level, each of the hann waves having a minimum at the third value; and
modulating the base AC signal with the modulation signal.

XXIII. The method of any one of claims XIX-XXII, further comprising determining the maximum ultrasonic energy level based on a user-selected ultrasonic energy limit for the ultrasonic handpiece.

XXIV. The method of claim XXIII, wherein determining the maximum ultrasonic energy level based on a user-selected ultrasonic energy limit for the ultrasonic handpiece comprises:
receiving the user-selected ultrasonic energy limit for the ultrasonic handpiece; and
determining the maximum ultrasonic energy level such that the maximum ultrasonic energy level is greater than the user-selected ultrasonic energy limit and an average of the ultrasonic energy induced in the ultrasonic handpiece by the AC drive signal substantially equals the user-selected ultrasonic energy limit.

XXV. The method of any one of claims XIX-XXIV, further comprising determining the first and second values based on the maximum ultrasonic energy level.

XXVI. The method of claim XXV, wherein the ultrasonic handpiece is coupled to a control console that generates the AC drive signal sourced to the ultrasonic handpiece, and determining the first and second values based on the maximum ultrasonic energy level comprises:
reading first and second percentages associated with the first and second pulsing ultrasonic energy profiles from a memory integral with control console; and applying the first and second percentages to the maximum ultrasonic energy level to determine the first and second values respectively.

XXVII. The method of any one of claims XIX-XXVI, wherein the ultrasonic handpiece is coupled to a control console that generates the AC drive signal sourced to the ultrasonic handpiece, and further comprising:
reading first and second duty cycles associated with the first and second pulsing ultrasonic energy profiles from a memory integral with the control console, the first duty cycle being greater than the second duty cycle;
responsive to receiving the user-selection of the first pulsing ultrasonic energy profile, generating the AC drive signal such that a duration of each of the ultrasonic energy pulses induced in the ultrasonic handpiece relative to a duration of each of the significant periods at the minimum ultrasonic energy level induced in the ultrasonic handpiece corresponds to the first duty cycle; and
responsive to receiving the user-selection of the second pulsing ultrasonic energy profile, generating the AC drive signal such that the duration of each of the ultrasonic energy pulses induced in the ultrasonic handpiece relative to the duration of each of the significant periods at the minimum ultrasonic energy level induced in the ultrasonic handpiece corresponds to the second duty cycle.

XXVIII. The method of any one of claims XIX-XXVII, further comprising:
generating the AC drive signal such that the ultrasonic energy pulses induced in the ultrasonic handpiece occur at a first frequency;
determining whether a load applied to the ultrasonic handpiece is greater than a predefined level; and
responsive to determining that the applied load is greater than the predefined level, generating the AC drive signal such that the ultrasonic energy pulses induced in the ultrasonic handpiece occur at a second frequency less than the first frequency.

XXIX. The method of any one of claims XIX-XXVIII, further comprising:
generating a second AC drive signal sourced to the ultrasonic handpiece that induces ultrasonic energy in the ultrasonic handpiece that is maintained at the maximum ultrasonic energy level for the ultrasonic handpiece;
determining whether a load applied to the ultrasonic handpiece is greater than a predefined level; and
responsive to determining that the applied load is greater than the predefined level, generating the AC drive signal that induces the ultrasonic energy in the ultrasonic handpiece that comprises the plurality of ultrasonic energy pulses interspaced by significant periods at the set minimum ultrasonic energy level, each of the ultrasonic energy pulses peaking at the maximum ultrasonic energy level.

XXX. The method of claims XXVIII or XXIX, wherein determining whether a load applied to the ultrasonic handpiece is greater than a predefined level comprises:
calculating a mechanical resistance of the ultrasonic handpiece;
comparing the mechanical resistance of the ultrasonic handpiece to a predefined resistance threshold; and
determining that the load applied to the ultrasonic handpiece is greater than the predefined level responsive to the mechanical resistance of the ultrasonic handpiece being greater than the predefined resistance threshold.

XXXI. The method of claims XXVIII or XXIX, wherein determining whether a load applied to the ultrasonic handpiece is greater than a predefined level comprises:
measuring a voltage of the AC drive signal sourced to the ultrasonic handpiece;
comparing the voltage to a predefined voltage threshold; and
determining that the load applied to the ultrasonic handpiece is greater than the predefined level responsive to the measured voltage being greater than the predefined voltage threshold.

XXXII. The method of any one of claims XIX-XXXI, further comprising:
determining whether the ultrasonic handpiece is set to operate in a soft tissue ablation mode or a bone cutting mode;
responsive to determining that the ultrasonic handpiece is set to operate in the soft tissue ablation mode, generating the AC drive signal that induces ultrasonic energy in the ultrasonic handpiece that comprises the ultrasonic energy pulses interspaced by significant periods at the set minimum ultrasonic energy level, each of the ultrasonic energy pulses peaking at the maximum ultrasonic energy level; and
responsive to determining that the ultrasonic handpiece is set to operate in the bone cutting mode, generating a second AC drive signal source to the ultrasonic handpiece that induces ultrasonic energy in the ultrasonic handpiece that comprises a plurality of ultrasonic energy pulses interspaced by ultrasonic energy at the set minimum ultrasonic energy level, each of the ultrasonic energy pulses peaking and including a significant period at the maximum ultrasonic energy level.

XXXIII. The method of claim XXXII, wherein the significant periods at the maximum ultrasonic energy level of the ultrasonic energy pulses induced in the ultrasonic handpiece by the second AC drive signal are interspaced by transitional ultrasonic energy periods defined by an inverse hann wave having a minimum corresponding to the set minimum ultrasonic energy level.

XXXIV. A method for controlling vibrations of an ultrasonic handpiece, the method comprising:
receiving a user-selected ultrasonic energy limit for the ultrasonic handpiece;
determining a maximum ultrasonic energy level for the ultrasonic handpiece based on the user-selected ultrasonic energy limit;
determining a minimum ultrasonic energy level for the ultrasonic handpiece based on the maximum ultrasonic energy level; and
generating an AC drive signal sourced to the ultrasonic handpiece that induces ultrasonic energy in the ultrasonic handpiece that comprises a plurality of ultrasonic pulses interspaced by significant periods of constant ultrasonic energy at the minimum ultrasonic energy level, each of the ultrasonic pulses peaking at the maximum ultrasonic energy level.

XXXV. A method for controlling vibrations of an ultrasonic handpiece, the method comprising:
determining maximum and minimum ultrasonic energy levels for the ultrasonic handpiece;
generating a base AC signal having an ultrasonic frequency and substantially constant amplitude;
generating a periodic modulation signal including hann waves separated by significant periods at a constant value corresponding to the maximum or minimum ultrasonic energy level;

modulating the base AC signal with the modulation signal; and generating an AC drive signal sourced to the ultrasonic handpiece based on the modulated base AC signal.

XXXVI. A method for controlling vibrations of an ultrasonic handpiece, the method comprising:

determining a maximum ultrasonic energy level for the ultrasonic handpiece;

receiving a user-selection of a first pulsing ultrasonic energy profile and a second pulsing ultrasonic energy profile;

responsive to receiving the user-selection of the first pulsing ultrasonic energy profile, setting a minimum ultrasonic energy level for the ultrasonic handpiece to a first value;

responsive to receiving the user-selection of the second pulsing ultrasonic energy profile, setting the minimum ultrasonic energy level for the ultrasonic handpiece to a second value less than the first value; and generating an AC drive signal sourced to the ultrasonic handpiece that induces ultrasonic energy in the ultrasonic handpiece that comprises a plurality of ultrasonic energy pulses interspaced by ultrasonic energy at the set minimum ultrasonic energy level, each of the ultrasonic energy pulses peaking and including a significant period at the maximum ultrasonic energy level.

XXXVII. A system for controlling vibrations of a tip of an ultrasonic instrument, the system comprising:

a control console for generating an AC drive signal supplied to a driver of the ultrasonic instrument to vibrate the tip of the ultrasonic instrument, the control console being configured to:

determine a maximum ultrasonic energy level for the ultrasonic instrument;

determine a minimum ultrasonic energy level for the ultrasonic instrument based on the maximum ultrasonic energy level; and generate an AC drive signal sourced to the ultrasonic instrument that induces ultrasonic energy in the tip of the ultrasonic instrument that comprises a plurality of ultrasonic energy pulses interspaced by significant periods at the determined minimum ultrasonic energy level, each of the ultrasonic energy pulses being defined by a hann wave and peaking at the maximum ultrasonic energy level.

XXXVIII. A system for controlling vibrations of a tip of an ultrasonic instrument, the system comprising:

a control console for generating an AC drive signal supplied to a driver of the ultrasonic instrument to vibrate the tip of the ultrasonic instrument, the control console being configured to:

determine a maximum ultrasonic energy level for the ultrasonic instrument;

determine whether the system is set to operate in a soft tissue ablation mode or a hard tissue ablation mode;

responsive to determining that the system is set to operate in the soft tissue ablation mode, generate a first AC drive signal that induces first ultrasonic energy in the ultrasonic instrument, the first ultrasonic energy comprising a plurality of first ultrasonic energy pulses interspaced by first periods of ultrasonic energy at a first minimum ultrasonic energy level set for the ultrasonic instrument and corresponding to the soft tissue ablation mode, and each of the first ultrasonic energy pulses peaking at the maximum ultrasonic energy level for a second period that is less than each of the first periods; and responsive to determining that the system is set to operate in the hard tissue ablation mode, generate a second AC drive signal that induces second ultrasonic energy in the ultrasonic instrument, the second ultrasonic energy comprising a plurality of second ultrasonic energy pulses interspaced by third periods of ultrasonic energy at a second minimum ultrasonic energy level set for the ultrasonic instrument and corresponding to the hard tissue ablation mode, and each of the second ultrasonic energy pulses peaking at the maximum ultrasonic energy level for a fourth period that is greater than or equal to each of the third periods.

XXXIX. A system for controlling vibrations of a tip of an ultrasonic instrument, the system comprising:

a control console for generating an AC drive signal supplied to a driver of the ultrasonic instrument to vibrate the tip, the control console being configured to:

determine a type of the tip;

determine one or more pulsing parameters for the ultrasonic instrument based on the determined type of the tip; and generate an AC drive signal sourced to the ultrasonic instrument that induces ultrasonic energy in the tip of the ultrasonic instrument that comprises a plurality of ultrasonic energy pulses corresponding to the determined pulsing parameters.

XL. A control console for controlling vibrations of a tip of an ultrasonic instrument, the control comprising:

a signal generator for generating an AC drive signal supplied to a driver of the ultrasonic instrument to vibrate the tip of the ultrasonic instrument; and at least one processor coupled to the signal generator and configured to:

determine a maximum ultrasonic energy level for the ultrasonic instrument;

determine a minimum ultrasonic energy level for the ultrasonic instrument based on the maximum ultrasonic energy level; and regulate the AC drive signal generated by the signal generator and sourced to the ultrasonic instrument to induce ultrasonic energy in the tip of the ultrasonic instrument that comprises a plurality of ultrasonic energy pulses interspaced by significant periods at the determined minimum ultrasonic energy level, each of the ultrasonic energy pulses being defined by a hann wave and peaking at the maximum ultrasonic energy level.

XLI. A control console for controlling vibrations of a tip of an ultrasonic instrument, the system comprising:

a signal generator for generating an AC drive signal supplied to a driver of the ultrasonic instrument to vibrate the tip of the ultrasonic instrument; and at least one processor coupled to the signal generator and configured to:

determine a maximum ultrasonic energy level for the ultrasonic instrument;

determine whether the system is set to operate in a soft tissue ablation mode or a hard tissue ablation mode;

responsive to determining that the system is set to operate in the soft tissue ablation mode, set the AC drive signal generated by the signal generator and sourced to the ultrasonic instrument to a first AC drive signal that induces first ultrasonic energy in the ultrasonic instrument, the first ultrasonic energy comprising a plurality of first ultrasonic energy pulses interspaced by first periods of ultrasonic energy at a first minimum ultrasonic energy level set for the ultrasonic instrument and corresponding to the soft tissue ablation mode, and each of the first ultrasonic energy pulses peaking at the maximum ultrasonic energy level for a second period that is less than each of the first periods; and responsive to determining that the system is set to operate in the hard tissue ablation mode, set the AC drive signal generated by the signal generator and sourced to the ultrasonic instrument to a second AC drive signal that induces second ultrasonic energy in the ultrasonic instrument, the second ultrasonic energy comprising a plurality of second ultrasonic energy pulses interspaced by third periods of ultrasonic energy at a second minimum ultrasonic energy level set for the ultrasonic instrument and corresponding to the hard tissue ablation mode, and each of the second ultrasonic energy pulses peaking at the maximum ultrasonic energy level for a fourth period that is greater than or equal to each of the third periods.

XLII. A control console for controlling vibrations of a tip of an ultrasonic instrument, the system comprising:

a signal generator for generating an AC drive signal supplied to a driver of the ultrasonic instrument to vibrate the tip of the ultrasonic instrument; and at least one processor coupled to the signal generator and configured to:
   determine a type of the tip;
   determine one or more pulsing parameters for the ultrasonic instrument based on the determined type of the tip; and
   regulate the AC drive signal generated by the signal generator and sourced to the ultrasonic instrument to induce ultrasonic energy in the tip of the ultrasonic instrument that comprises a plurality of ultrasonic energy pulses corresponding to the determined pulsing parameters.

XLIII. A method for controlling vibrations of a tip of an ultrasonic instrument by at least one processor, the method comprising:

determining, by the control console, a maximum ultrasonic energy level for the ultrasonic instrument;

determining, by the control console, a minimum ultrasonic energy level for the ultrasonic instrument based on the maximum ultrasonic energy level; and generating, by the control console, an AC drive signal sourced to the ultrasonic instrument that induces ultrasonic energy in the tip of the ultrasonic instrument that comprises a plurality of ultrasonic energy pulses interspaced by significant periods at the determined minimum ultrasonic energy level, each of the ultrasonic energy pulses being defined by a hann wave and peaking at the maximum ultrasonic energy level.

XLIV. A method for controlling vibrations of a tip of an ultrasonic instrument by a control console, the method comprising:

determining, by the control console, a maximum ultrasonic energy level for the ultrasonic instrument;

determining, by the control console, that the ultrasonic instrument is set to be operated in a soft tissue ablation mode;

responsive to determining that the system is set to operate in the soft tissue ablation mode, generating, by the control console, a first AC drive signal that induces first ultrasonic energy in the ultrasonic instrument, the first ultrasonic energy comprising a plurality of first ultrasonic energy pulses interspaced by first periods of ultrasonic energy at a first minimum ultrasonic energy level set for the ultrasonic instrument and corresponding to the soft tissue ablation mode, and each of the first ultrasonic energy pulses peaking at the maximum ultrasonic energy level for a second period that is less than each of the first periods;

determining, by the control console that the ultrasonic instrument is set to be operated in a hard tissue ablation mode and responsive to determining that the system is set to operate in the hard tissue ablation mode, generating, by the control console, a second AC drive signal that induces second ultrasonic energy in the ultrasonic instrument, the second ultrasonic energy comprising a plurality of second ultrasonic energy pulses interspaced by third periods of ultrasonic energy at a second minimum ultrasonic energy level set for the ultrasonic instrument and corresponding to the hard tissue ablation mode, and each of the second ultrasonic energy pulses peaking at the maximum ultrasonic energy level for a fourth period that is greater than or equal to each of the third periods.

XLV. A method for manufacturing a sleeve for an ultrasonic instrument comprising a tip and a handpiece including a driver to which the tip is coupled and to which an AC drive signal is sourced from a control console to induce ultrasonic energy in the tip including a plurality of ultrasonic energy pulses, the method comprising:

providing a sleeve body having open proximal and distal ends and defining a lumen extending between the open proximal and distal ends, the sleeve body being adapted to be removably coupled to handpiece such that the tip extends through the lumen and out the open distal end of the sleeve body;

placing an irrigation conduit in fluid communication with the lumen for supplying irrigating fluid to the tip; and storing data specific to the tip for being read by the control console when the ultrasonic instrument is coupled to the control console in the tip memory, the data indicating at least one pulsing parameter for regulating the ultrasonic energy pulses induced in the tip of the ultrasonic instrument; and disposing the tip memory into the sleeve body.

XLVI. A method for controlling vibrations of a tip of an ultrasonic instrument by a control console, the method comprising:

determining, by the control console, a type of the tip;

determining, by the control console, one or more pulsing parameters for the ultrasonic instrument based on the determined type of the tip; and generating, by the control console, an AC drive signal sourced to the ultrasonic instrument that induces ultrasonic energy in the tip of the ultrasonic instrument that comprises a plurality of ultrasonic energy pulses corresponding to the determined pulsing parameters.

What is claimed is:

1. A system for controlling vibrations of a tip of an ultrasonic instrument, the system comprising:
   an ultrasonic instrument comprising a tip, a handpiece including a driver configured to vibrate the tip responsive to receiving an AC drive signal, and a sleeve disposed around the tip and coupled to the handpiece, the sleeve defining a first pathway for supplying irrigating fluid to a distal region of the tip, and the tip defining a second pathway for providing suction at the distal region of the tip; and
a control console for generating the AC drive signal supplied to the driver of the ultrasonic instrument, the control console being configured to:
determine a maximum ultrasonic energy level for the ultrasonic instrument;
determine a minimum ultrasonic energy level for the ultrasonic instrument based on the maximum ultrasonic energy level; and
generate an AC drive signal sourced to the ultrasonic instrument that induces ultrasonic energy in the tip of the ultrasonic instrument that comprises a plurality of ultrasonic energy pulses interspaced by significant periods at the determined minimum ultrasonic energy level, each of the ultrasonic energy pulses being defined by a hann wave and peaking at the maximum ultrasonic energy level.

2. The system of claim 1, wherein each of the significant periods is greater than or equal to two milliseconds.

3. The system of claim 1, wherein the determined minimum ultrasonic energy level corresponds to vibrations in the tip having a magnitude that are insufficient to ablate patient tissue and sufficient for the control console to track a resonant frequency of the ultrasonic instrument.

4. The system of claim 1, wherein the determined minimum ultrasonic energy level corresponds to vibrations induced the tip having a peak-to-peak displacement greater than zero and less than 20 microns.

5. The system of claim 1, wherein the determined minimum ultrasonic energy level corresponds to a mechanical current induced in in the ultrasonic instrument that is greater than zero and less than 10 milliamps.

6. The system of claim 1, wherein the sleeve comprises a tip memory storing data specific to the tip that indicates a factor for determining the minimum ultrasonic energy level for the ultrasonic instrument, and the control console is configured to:
read the data from the tip memory when the ultrasonic instrument is coupled to the control console; and
determine the minimum ultrasonic energy level for the ultrasonic instrument by applying the factor indicated in the read data to the determined maximum ultrasonic energy level.

7. The system of claim 6, wherein the data specific to the tip that is stored in the tip memory and read by the control console indicates a duty cycle, and the control console is configured to generate the AC drive signal such that a duration of each of the ultrasonic energy pulses relative to a duration of each cycle of the induced ultrasonic energy corresponds to the duty cycle indicated in the read data.

8. The system of claim 6, wherein the data specific to the tip that is stored in the tip memory and read by the control console indicates a pulsing frequency, and the control console is configured to generate the AC drive signal such that a frequency of the ultrasonic energy pulses induced in the ultrasonic instrument corresponds to the pulsing frequency indicated in the read data.

9. The system of claim 6, wherein the AC drive signal is defined as a first AC drive signal, the data specific to the tip that is stored in the tip memory and read by the control console indicates whether the tip is pulsing enabled, and the control console is configured to:
determine whether the tip is pulsing enabled based on the read data;
responsive to determining that the tip is pulsing enabled, generate and source the first AC drive signal to the ultrasonic instrument; and
responsive to determining that the tip is not pulsing enabled, generate and source a second AC drive signal to the ultrasonic instrument that induces ultrasonic energy in the ultrasonic instrument that is maintained at the determined maximum ultrasonic energy level.

10. The system of claim 1, wherein the control console is configured to:
receive a user-selection of a first pulse control level and a second pulse control level, the first pulse control level for ablating firmer tissue than the second pulse control level;
responsive to receiving the user-selection of the first pulse control level, set the minimum ultrasonic energy level for the ultrasonic instrument to a first value corresponding to the first pulse control level; and
responsive to receiving the user-selection of the second pulse control level, set the minimum ultrasonic energy level for the ultrasonic instrument to a second value corresponding to the second pulse control level that is less than the first value.

11. The system of claim 10, wherein the control console is configured to:
responsive to receiving the user-selection of the first pulse control level, generate the AC drive signal such that the ultrasonic energy pulses induced in the ultrasonic instrument occur at a first frequency; and
responsive to receiving the user-selection of the second pulse control level, generate the AC drive signal such that the ultrasonic energy pulses induced in the ultrasonic instrument occur at a second frequency greater than the first frequency.

12. The system of claim 10, wherein the control console is configured to:
responsive to receiving the user-selection of the first pulse control level, generate the AC drive signal such that a duration of each of the ultrasonic energy pulses induced in the ultrasonic instrument relative to a duration of each cycle of the induced ultrasonic energy corresponds to a first duty cycle; and
responsive to receiving the user-selection of the second pulse control level, generate the AC drive signal such that the duration of each of the ultrasonic energy pulses induced in the ultrasonic instrument relative to the duration of each cycle of the induced ultrasonic energy corresponds to a second duty cycle less than the first duty cycle.

13. A system for controlling vibrations of a tip of an ultrasonic instrument, the system comprising:
an ultrasonic instrument comprising a tip, a handpiece including a driver configured to vibrate the tip responsive to receiving an AC drive signal, and a sleeve disposed around the tip and coupled to the handpiece, the sleeve defining a first pathway for supplying irrigating fluid to a distal region of the tip, and the tip defining second pathway for providing suction at the distal region of the tip; and
a control console for generating the AC drive signal supplied to the driver of the ultrasonic instrument, the control console being configured to:
determine a maximum ultrasonic energy level for the ultrasonic instrument;
determine whether the system is set to operate in a soft tissue ablation mode or a hard tissue ablation mode;

responsive to determining that the system is set to operate in the soft tissue ablation mode, generate a first AC drive signal that induces first ultrasonic energy in the ultrasonic instrument, the first ultrasonic energy comprising a plurality of first ultrasonic energy pulses interspaced by first periods of ultrasonic energy at a first minimum ultrasonic energy level set for the ultrasonic instrument and corresponding to the soft tissue ablation mode, and each of the first ultrasonic energy pulses peaking at the maximum ultrasonic energy level for a second period that is less than each of the first periods; and responsive to determining that the system is set to operate in the hard tissue ablation mode, generate a second AC drive signal that induces second ultrasonic energy in the ultrasonic instrument, the second ultrasonic energy comprising a plurality of second ultrasonic energy pulses interspaced by third periods of ultrasonic energy at a second minimum ultrasonic energy level set for the ultrasonic instrument and corresponding to the hard tissue ablation mode, and each of the second ultrasonic energy pulses peaking at the maximum ultrasonic energy level for a fourth period that is greater than or equal to each of the third periods.

14. The system of claim 13, wherein the first minimum ultrasonic energy level corresponding to the soft tissue ablation mode differs from the second minimum ultrasonic energy level corresponding to the hard tissue ablation mode.

15. The system of claim 13, wherein the control console is configured to:
responsive to determining that the system is set to operate in the soft tissue ablation mode, determine the first minimum ultrasonic energy level based on the maximum ultrasonic energy level; and
responsive to determining that the system is set to operate in the hard tissue ablation mode, determine the second minimum ultrasonic energy level based on the maximum ultrasonic energy level.

16. The system of claim 13, wherein the control console is configured to:
responsive to determining that the system is set to operate in the soft tissue ablation mode, set a voltage limit for the ultrasonic instrument to a first voltage; and
responsive to determining that the system is set to operate in the hard tissue ablation mode, set a voltage limit for the ultrasonic instrument to a second voltage greater than the first voltage.

17. The system of claim 13, wherein the control console is configured to:
determine a type of the tip; and
determine whether the system is set to operate in the soft tissue ablation mode of the hard tissue ablation mode based on the determined type of the tip.

18. The system of claim 17, wherein the sleeve comprises a tip memory storing data specific to the tip that indicates the type of the tip, and the control console is configured to:
read the data from the tip memory when the ultrasonic instrument is coupled to the control console; and
determine the type of the tip based on the read data.

19. The system of claim 13, wherein the sleeve comprises a tip memory storing data specific to the tip that indicates whether the tip is configured for soft tissue ablation or hard tissue ablation, the control console is configured to:
read the data from the tip memory when the ultrasonic instrument is coupled to the control console; and
determine whether the system is set to operate in the soft tissue ablation mode or the hard tissue ablation mode based on the indication of whether the tip is configured for soft tissue ablation or hard tissue ablation in the read data.

* * * * *